US011773535B2

(12) United States Patent
Dale et al.

(10) Patent No.: US 11,773,535 B2
(45) Date of Patent: *Oct. 3, 2023

(54) PAPERMAKING ADDITIVE COMPOSITIONS AND METHODS AND USES THEREOF

(71) Applicant: Neozyme International, Inc., Costa Mesa, CA (US)

(72) Inventors: Parker Dale, Newport Beach, CA (US); Parker David Dale, Newport Beach, CA (US)

(73) Assignee: Neozyme International, Inc., Costa Mesa, CA (US)

( * ) Notice: Subject to any disclaimer, the term of this patent is extended or adjusted under 35 U.S.C. 154(b) by 710 days.

This patent is subject to a terminal disclaimer.

(21) Appl. No.: 16/729,236

(22) Filed: Dec. 27, 2019

(65) Prior Publication Data

US 2020/0131701 A1   Apr. 30, 2020

Related U.S. Application Data

(63) Continuation of application No. 15/243,958, filed on Aug. 22, 2016, now Pat. No. 10,557,234, which is a continuation-in-part of application No. 14/404,917, filed as application No. PCT/US2013/000140 on May 24, 2013, now Pat. No. 9,617,178.

(60) Provisional application No. 62/208,662, filed on Aug. 22, 2015, provisional application No. 61/689,077, filed on May 29, 2012.

(51) Int. Cl.
| | |
|---|---|
| *D21C 5/00* | (2006.01) |
| *D21C 5/02* | (2006.01) |
| *D21H 21/24* | (2006.01) |
| *D21H 21/36* | (2006.01) |
| *D21H 17/00* | (2006.01) |

(52) U.S. Cl.
CPC ............ *D21C 5/005* (2013.01); *D21C 5/025* (2013.01); *D21H 17/005* (2013.01); *D21H 21/24* (2013.01); *D21H 21/36* (2013.01); *Y02W 30/64* (2015.05)

(58) Field of Classification Search
CPC ...... D21C 5/005; D21C 5/025; D21H 17/005; D21H 21/24; D21H 21/36; Y02W 30/64; A01N 63/30; A01N 63/20; A01N 63/32; C12N 1/16; C12N 1/165; C12N 1/18; C12N 1/185; C12N 2500/74; C12R 2001/645; C12R 2001/72; C12R 2001/85; C12R 2001/86; C12R 2001/865; C12R 2001/87

See application file for complete search history.

(56) References Cited

U.S. PATENT DOCUMENTS

| | | | |
|---|---|---|---|
| 3,635,797 A | 1/1972 | Battistoni et al. |
| 4,052,858 A | 10/1977 | Jeppson |
| 4,541,986 A | 9/1985 | Schwab et al. |
| 4,666,606 A | 5/1987 | Heinicke |
| 4,758,353 A | 7/1988 | Spence et al. |
| 4,804,478 A | 2/1989 | Tamir |
| 5,071,765 A | 12/1991 | Wiatr |
| 5,075,008 A | 12/1991 | Chigusa et al. |
| 5,139,945 A | 8/1992 | Liu |
| 5,179,003 A | 1/1993 | Wolf et al. |
| 5,227,067 A | 7/1993 | Runyon |
| 5,284,844 A | 2/1994 | Lorenz et al. |
| 5,308,449 A | 5/1994 | Fuentes et al. |
| 5,326,477 A | 7/1994 | Fuqua et al. |
| 5,369,031 A | 11/1994 | Middleditch et al. |
| 5,407,577 A | 4/1995 | Nghiem |
| 5,462,868 A | 10/1995 | Britt et al. |
| 5,500,306 A | 3/1996 | Hsu et al. |
| 5,616,479 A | 4/1997 | Marchal et al. |
| 5,654,192 A | 8/1997 | Ducreux et al. |
| 5,736,209 A | 4/1998 | Andersen et al. |
| 5,807,464 A | 9/1998 | Jobbins et al. |
| 5,820,758 A | 10/1998 | Dale et al. |
| 5,849,566 A | 12/1998 | Dale et al. |
| 5,866,376 A | 2/1999 | Rocha et al. |
| 5,879,913 A | 3/1999 | Marchal et al. |
| 5,879,928 A | 3/1999 | Dale et al. |
| 5,885,590 A | 3/1999 | Hunter et al. |
| 5,885,950 A | 3/1999 | Dale et al. |
| 6,001,218 A | 12/1999 | Hsu et al. |

(Continued)

FOREIGN PATENT DOCUMENTS

| | | |
|---|---|---|
| CA | 1124459 A | 6/1982 |
| CN | 101557249 A | 10/2009 |

(Continued)

OTHER PUBLICATIONS

Popa, P et al. Study of physico-chemical characteristics of wastewater in an urban agglomeration in Romania. The Scientific World Journal. 2012. Article ID 549028. 10 pages. (Year: 2012).*
CNIPA, Second Office Action for Chinese Patent Application Serial No. 201680061816.2, pp. 9 (dated Mar. 15, 2021).
FSIP, Decision on Grant for Russian Patent Application Serial No. 2018109947, pp. 19 (dated Jun. 22, 2022).
Haruhiko, Recent Yeast Taxonomy, Journal of the Brewing Society of Japan, 1985, vol. 80, No. 8, pp. 519-529, ISSN 2186-4004.
JPO, Decision of Rejection for Japanese Patent Application Serial No. 2018-528938, pp. 7 (Apr. 5, 2022).

(Continued)

*Primary Examiner* — Renee Claytor
*Assistant Examiner* — Susan E. Fernandez
(74) *Attorney, Agent, or Firm* — UltimatEdge IP Law Group, P.C.; Dean G. Stathakis

(57) ABSTRACT

The present specification discloses papermaking additive compositions, articles of manufacture, containers or kits comprising such compositions, and methods and uses to increase separation of cellulose fibers from a pulp, to remove one or more impurities and/or one or more contaminates from a pulp and/or a paper material and to remove an ink from a pulp and/or a paper material.

19 Claims, 1 Drawing Sheet

(56) References Cited

U.S. PATENT DOCUMENTS

| | | | |
|---|---|---|---|
| 6,699,391 | B2 | 3/2004 | Baldridge et al. |
| 6,783,679 | B1 | 8/2004 | Rozich |
| 6,841,572 | B2 | 1/2005 | Horst et al. |
| 6,884,351 | B1 | 4/2005 | Lytal |
| 7,165,561 | B2 | 1/2007 | Baldridge et al. |
| 7,476,529 | B2 | 1/2009 | Podella et al. |
| 7,645,730 | B2 | 1/2010 | Baldridge et al. |
| 7,658,848 | B2 | 2/2010 | Baldridge et al. |
| 7,659,237 | B2 | 2/2010 | Baldridge et al. |
| 7,759,301 | B2 | 7/2010 | Baldridge et al. |
| 7,922,906 | B2 | 4/2011 | Baldridge et al. |
| 8,188,028 | B2 | 5/2012 | Baldridge et al. |
| 8,389,459 | B2 | 3/2013 | Baldridge et al. |
| 8,735,338 | B2 | 5/2014 | Baldridge et al. |
| 8,821,646 | B1 | 9/2014 | Miller et al. |
| 8,835,152 | B2 | 9/2014 | Podella |
| 8,871,682 | B2 | 10/2014 | Podella et al. |
| 8,871,698 | B2 | 10/2014 | Podella et al. |
| 8,894,861 | B2 | 11/2014 | Podella et al. |
| 9,051,535 | B2 | 6/2015 | Goldfeld et al. |
| 9,617,178 | B2 | 4/2017 | Dale |
| 10,334,856 | B2 | 7/2019 | Dale et al. |
| 11,116,224 | B2 * | 9/2021 | Dale ................. A01N 63/32 |
| 2002/0187220 | A1 | 12/2002 | Luhadiya |
| 2003/0121868 | A1 | 7/2003 | Barak |
| 2004/0180411 | A1 | 9/2004 | Podella et al. |
| 2005/0164355 | A1 | 7/2005 | Vlasenko et al. |
| 2005/0171275 | A1 | 8/2005 | De et al. |
| 2005/0266036 | A1 | 12/2005 | Awada et al. |
| 2006/0151387 | A1 | 7/2006 | Yost et al. |
| 2006/0205042 | A1 | 9/2006 | Aehle et al. |
| 2007/0029264 | A1 | 2/2007 | Bowe |
| 2007/0224249 | A1 | 9/2007 | Kelly et al. |
| 2007/0257127 | A1 | 11/2007 | Iverson |
| 2008/0138327 | A1 | 6/2008 | Kelly |
| 2008/0293813 | A1 | 11/2008 | Agvald et al. |
| 2009/0152196 | A1 | 6/2009 | Podella |
| 2009/0186761 | A1 | 7/2009 | Arbogast et al. |
| 2010/0078307 | A1 | 4/2010 | Dale et al. |
| 2010/0273495 | A1 | 10/2010 | Onggosanusi et al. |
| 2011/0052514 | A1 | 3/2011 | Juesten et al. |
| 2012/0100236 | A1 | 4/2012 | Asolkar et al. |
| 2012/0172219 | A1 | 7/2012 | Podella et al. |
| 2013/0104264 | A1 | 4/2013 | Schoonneveld-Bergmans et al. |
| 2013/0195826 | A1 | 8/2013 | Alessandri et al. |
| 2013/0281328 | A1 | 10/2013 | Podella et al. |
| 2013/0344554 | A1 | 12/2013 | Bleyer et al. |
| 2014/0056853 | A1 | 2/2014 | Marrone et al. |
| 2014/0128256 | A1 | 5/2014 | Asolkar et al. |
| 2014/0248373 | A1 | 9/2014 | Michalow et al. |
| 2015/0045220 | A1 | 2/2015 | Michalow et al. |
| 2015/0072917 | A1 | 3/2015 | Baldridge et al. |
| 2015/0141311 | A1 | 5/2015 | Podella et al. |
| 2015/0191748 | A1 | 7/2015 | Dale |
| 2015/0267151 | A1 | 9/2015 | Goldfeld et al. |
| 2016/0100587 | A1 | 4/2016 | Bywater-Ekegard et al. |
| 2016/0298056 | A1 | 10/2016 | Baldridge et al. |
| 2016/0353746 | A1 | 12/2016 | Dale |
| 2016/0362834 | A1 | 12/2016 | Dale |
| 2017/0156343 | A1 | 6/2017 | Michalow et al. |

FOREIGN PATENT DOCUMENTS

| | | |
|---|---|---|
| CN | 101951686 A | 1/2011 |
| CN | 104452385 A | 3/2015 |
| EP | 375615 A1 | 6/1990 |
| EP | 375615 A2 | 6/1990 |
| EP | 1721966 A1 | 11/2006 |
| KR | 20100088758 A | 8/2010 |
| RU | 2143199 C1 | 12/1999 |
| WO | 1992011381 A1 | 7/1992 |
| WO | 1994012718 A1 | 6/1994 |
| WO | 1996000811 A1 | 1/1996 |
| WO | 1997016381 A1 | 5/1997 |
| WO | 1997028092 A1 | 8/1997 |
| WO | 1998005212 A1 | 2/1998 |
| WO | 1998023813 A1 | 6/1998 |
| WO | 00/024879 A1 | 4/2000 |
| WO | 2001079450 A1 | 10/2001 |
| WO | 02/26041 A2 | 4/2002 |
| WO | 2003031536 A1 | 4/2003 |
| WO | 03/035972 A1 | 5/2003 |
| WO | 2003037066 A2 | 5/2003 |
| WO | 2005019527 A1 | 3/2005 |
| WO | 2005054475 A1 | 6/2005 |
| WO | 2005067531 A2 | 7/2005 |
| WO | 2005069849 A2 | 8/2005 |
| WO | 2006119052 A2 | 11/2006 |
| WO | 2008111613 A1 | 9/2008 |
| WO | 2010115021 A2 | 10/2010 |
| WO | 2010148535 A1 | 12/2010 |
| WO | 2011016008 A1 | 2/2011 |
| WO | 2012040908 A1 | 4/2012 |
| WO | 2013180756 A1 | 12/2013 |
| WO | 2017035099 A1 | 3/2017 |
| WO | 2017035100 A1 | 3/2017 |
| WO | 2017035101 A1 | 3/2017 |

OTHER PUBLICATIONS

JPO, Office Action for Japanese Patent Application Serial No. 2018-528937, (dated Jul. 13, 2021), 4 pages.
JPO, Office Action for Japanese Patent Application Serial No. 2018-528938, (dated Aug. 17, 2021), 8 pages.
Chaichi, et al., "Surfactant Application on Yield and Irrigation Water Use Efficiency in Corn under Limited Irrigation", Crop Sci. 55(1): 386(2015).
Desai, et al., "Microbial Production of Surfactants and Their Commercial Potential", Microbiol. Mol. Biol. Rev., 1997, 61(1): 47-64.
EPO, Extended Search Report for European Patent Application Serial No. EP13796699.0, pp. 12 (dated Jul. 12, 2016).
EPO, Extended Search Report for European Patent Application Serial No. EP16839956.6, pp. 12 (dated Jan. 14, 2019).
EPO, Extended Search Report for European Patent Application Serial No. EP16839957.4, pp. 11 (dated Apr. 17, 2019).
EPO, Extended Search Report for European Patent Application Serial No. EP16839958.2, (dated Sep. 30, 2019), 16 pages.
EPO, Extended Search Report for European Patent Application Serial No. EP19160826.4, pp. 5 (dated Apr. 3, 2019).
Frolund, et al., "Enzymatic Activity in the Activated-Sludge Floc Matrix", Appl. Microbiol. Biotechnol., 1995, 43(3): 755-561.
Goel, "Enzyme Activities under Anaerobic and Aerobic Conditions in Activated Sludge Sequencing Batch Reactor", Water Research, 1998, 32(7): 2081-2088.
Ito, et al., "Sophorolipids from Torulopsis bombicola: Possible Relation to Alkane Update", Appl. Environ, Micobiol., 1982, 43(6): 1278-1283.
Kastner, "Formation of Bound Residues during Microbial Degradation of [14C]Anthracene in Soil", Appl. Environ. Microbiol., 1999, 65(5): 1834-1842.
Sensient Flavors LLC, "Tastone 154, Technical Information", 2010.
Sukumaran, et al., "Microbial Celluloses—Production, Applications, and Challenges", J. Sci. Indus. Res., 2005, 64: 832-844.
WIPO, PCT Form IB373, International Preliminary Report on Patentability for International Patent Application Serial No. PCT/US2013/000140, pp. 12 (dated Dec. 2, 2014).
WIPO, PCT Form IB373, International Preliminary Report on Patentability for International Patent Application Serial No. PCT/US2016/048092, pp. 6 (dated Mar. 8, 2018).
WIPO, PCT Form IB373, International Preliminary Report on Patentability for International Patent Application Serial No. PCT/US2016/048093, pp. 5 (dated Mar. 8, 2018).
WIPO, PCT Form IB373, International Preliminary Report on Patentability for International Patent Application Serial No. PCT/US2016/048094, pp. 5 (dated Mar. 8, 2018).
WIPO, PCT Form ISA210, International Search Report for International Patent Application Serial No. PCT/US2013/000140, pp. 2 (dated Jul. 22, 2013).

(56) References Cited

OTHER PUBLICATIONS

WIPO, PCT Form ISA210, International Search Report for International Patent Application Serial No. PCT/US2016/048092, pp. 10 (dated Nov. 15, 2016).
WIPO, PCT Form ISA210, International Search Report for International Patent Application Serial No. PCT/US2016/048093, pp. 8 (dated Oct. 24, 2016).
WIPO, PCT Form ISA210, International Search Report for International Patent Application Serial No. PCT/US2016/048094, pp. 7 (dated Nov. 4, 2016).
WIPO, PCT Form ISA237, Written Opinion for International Patent Application Serial No. PCT/US2013/000140, pp. 11 (dated Jul. 22, 2013).
WIPO, PCT Form ISA237, Written Opinion for International Patent Application Serial No. PCT/US2016/0048093, pp. 4 (dated Oct. 24, 2016).
WIPO, PCT Form ISA237, Written Opinion for International Patent Application Serial No. PCT/US2016/048092. pp. 5 (dated Nov. 15, 2016).
WIPO, PCT Form ISA237, Written Opinion for International Patent Application Serial No. PCT/US2016/048094, pp. 4 (dated Nov. 4, 2016).
Witek-Krowiak, et al., "Ultrafiltrative Separation of Rhamnolipid from Culture Medium", World J. Microbiol. Biotechnol., 2011, 27: 1961-1964.
Xu, et al., "Biosurfactants for Microbubble Preparation and Application", Int. J. Mol. Sci., 2011, 12: 462-475.
Xu, et al., "Research Review of Wastewater Treatment Technology with Hydrolytic Enzymes", J. Chongqing Univ. Sci. Technol. 12(6), 2010, 156-161.
U.S. Appl. No. 15/243,958, filed Aug. 22, 2016, US 2016/0362834, U.S. Pat. No. 10,557,234.
U.S. Appl. No. 14/404,917, filed May 24, 2013, US 2015/0191748, U.S. Pat. No. 9,617,178.
U.S. Appl. No. 15/243,957, filed Aug. 22, 2016, US 2016/0360758, U.S. Pat. No. 10,334,856.
U.S. Appl. No. 15/243,961, filed Aug. 22, 2016, US 2016/0353746.
U.S. Appl. No. 15/444,093, filed Feb. 27, 2017, US 2017/0166467.
U.S. Appl. No. 16/446,583, filed Jun. 19, 2019, US 2019/0307130.
U.S. Appl. No. 16/729,240, filed Dec. 27, 2019.
U.S. Appl. No. 16/729,243, filed Dec. 27, 2019.

\* cited by examiner

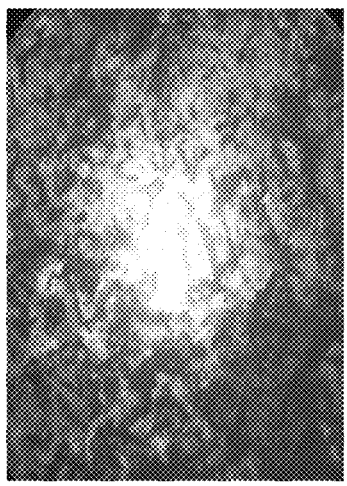 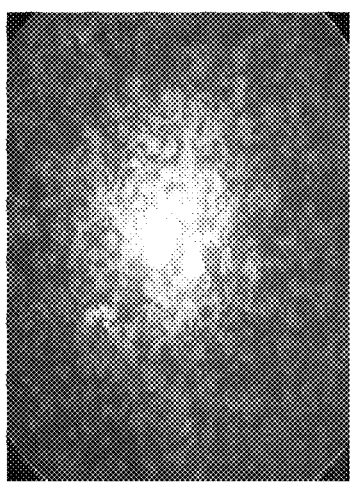 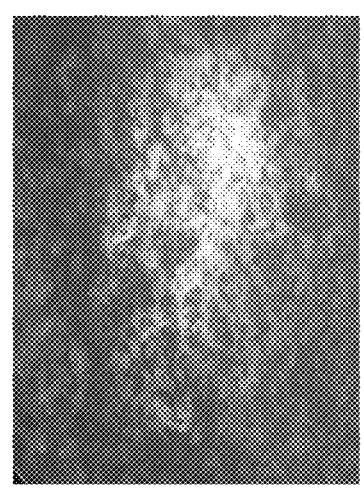
FIG. 1A   FIG. 1B   FIG. 1C
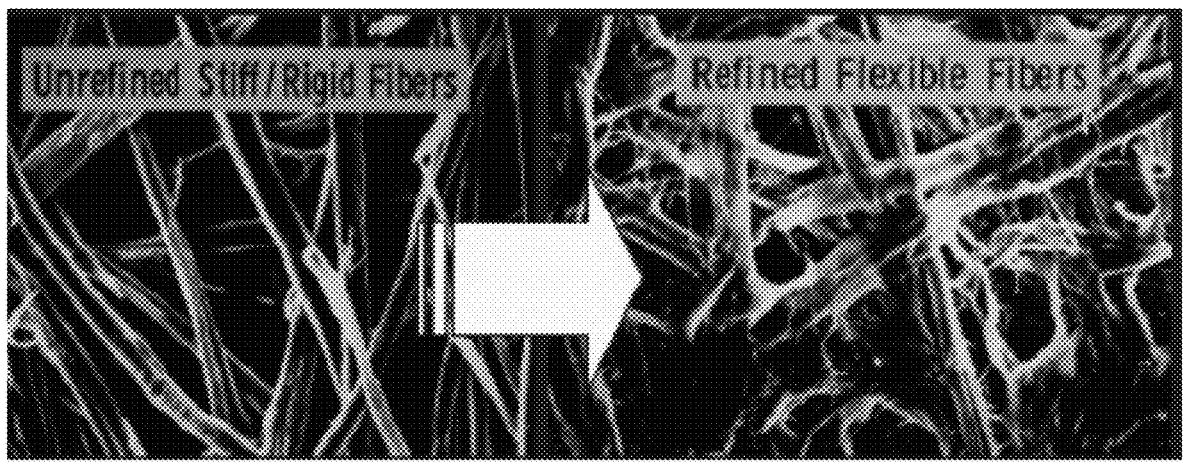
FIG. 2

PAPERMAKING ADDITIVE COMPOSITIONS AND METHODS AND USES THEREOF

This application is a continuation that claims the benefit of priority and the filing date pursuant to 35 U.S.C. § 120 of U.S. patent application Ser. No. 15/243,958, filed on Aug. 22, 2016, a continuation in part that claims the benefit of priority and the filing date of U.S. patent application Ser. No. 14/404,917, filed on Dec. 1, 2014, a US national stage filing of PCT Patent Application PCT/US2013/000140, filed on May 24, 2013, which claims the benefit of priority and the filing date of U.S. Provisional Patent Application 61/689,077, filed on May 29, 2012; and also claims the benefit of priority and the filing date of U.S. Provisional Patent Application 62/208,662, filed on Aug. 22, 2015, the content of each of which is hereby incorporated by reference in its entirety.

Paper is an incredibly important, practical and versatile substance with tens of thousands of different paper-based products being produced yearly. Paper may be impregnated, enamelled, crêped, waterproofed, waxed, glazed, sensitised, bent, folded, crumpled, cut, dissolved, macerated, moulded or embossed. Likewise, paper may be laminated with fabrics, plastics and metals. In an effort to organize, the vast array of products that can be made from paper can be classified into five broad categories: 1) newsprint and magazine; 2) printing and writing paper; 3) sanitary and household; 4) packaging material and products; and 5) specialized papers. Being such a natural part of our daily lives, we can sometimes forget just how much we rely upon this essential, renewable and evolving resource.

The usefulness of paper products has made a significant impact of the global economy. In 2015, worldwide production of paper-based products was over 300 million tons and was valued at $500 billion. Corrugated and paperboard containers account for about 30% of industry revenue. Other major products include paperboard (15%), bags and coated and treated paper (10%) and sanitary paper products (5%). The global pulp and paper industry is a multi-billion dollar industry that is largely dominated by the United States and China, both accounting for over 40% of the world's total production. However, Japan, Germany, Canada, South Korea, Sweden, Finland, Brazil and Indonesia also have significant pulp and paper enterprises. Leading exporting and importing countries include the United States and Germany.

In addition to being one of the dominating forces in the industry, the United States also consumes more paper-based products than any other country in the world, using a third, or about 100 million tons, of a paper-based products produced in 2015. This high use and consumption of paper-based products is important to the United States economy. In the United States, 450 manufacturing facilities produced products valued at nearly $2 billion. Around 150,000 persons are directly employed by the industry, creating a payroll approaching $10 billion. It is estimated that the pulp and paper industry is the tenth largest employer in the United States.

The manufacturing of paper is a mature industry. The fundamental components and processes currently being used by the pulp and paper industry have been in place for almost a century. In addition, pulp processing and paper making is a high production volume that also uses huge amounts of natural resources such as water and wood, chemicals and energy to produce pulp and paper. As such, the maturity of the industry, the high production volume, the extensive use of material and energy resources as well as environmental regulations puts a severe economic strain on manufacturers. However, innovations improving or optimizing the productivity and/or efficiency of paper production are still significant and valuable. For example, due to the high volume of paper productions, innovation enhancing productivity and/or efficiency would translate into tens, if not hundreds, of millions of dollars in savings and/or increased profits. In addition, innovations reducing the large amounts of energy consumption as well as the generation of large amounts of waste water effluent and waste by-products, would address important environmental concerns which would also lead to reduced environmental impact and economic relief. As such, there is a great need to improve the process of making paper.

Accordingly, there is a great need for papermaking additives that are non-toxic, biodegradable and effective in improving or optimizing the productivity and/or efficiency of paper production.

SUMMARY

Aspects of the present specification disclose papermaking additive compositions. The disclosed papermaking additive compositions comprises a treated fermented microbial supernatant and one or more nonionic surfactants. The disclosed papermaking additive compositions may further comprise one or more anionic surfactants. In addition, the disclosed papermaking additive compositions may optionally further comprise a cellulose digesting enzyme. The disclosed papermaking additive compositions are biodegradable and substantially non-toxic to humans, mammals, plants and the environment.

Aspects of the present specification disclose a papermaking additive kit. The disclosed papermaking additive kit comprises a papermaking additive composition disclosed herein and instructions for how to use the compositions to improve or optimize the productivity and/or efficiency of paper production.

Aspects of the present specification disclose methods of separating fibers from a pulp slurry. The disclosed methods comprises applying an effective amount of a composition disclosed herein to the pulp slurry during pulping and/or paper production phases. The application results in increased separation of fibers from raw materials present in the pulp slurry.

Aspects of the present specification disclose methods of removing impurities and/or contaminates from pulp and/or paper material. The disclosed methods comprises applying an effective amount of a papermaking additive composition disclosed herein to a pulping and/or a paper production phase. The application results in the removal of impurities and/or contaminates from the pulp and/or paper material.

Aspects of the present specification disclose methods of deinking pulp and/or paper material. The disclosed methods comprise applying an effective amount of a composition disclosed herein to a pulping and/or paper production phases. The application results in the removal of ink from the pulp and/or paper material.

Aspects of the present specification disclose uses of a papermaking additive composition disclosed herein for separating fibers from a pulp slurry. The disclosed uses comprises applying an effective amount of the papermaking additive composition to the pulp slurry during pulping and/or paper production phases in order to increase separation of fibers from raw materials present in the pulp slurry.

Aspects of the present specification disclose uses of a papermaking additive composition disclosed herein for removing impurities and/or contaminates from pulp and/or paper material. The disclosed uses comprises applying an effective amount of the papermaking additive composition to the pulp slurry during pulping and/or paper production phases in order to remove ink from the pulp and/or paper material.

Aspects of the present specification disclose uses of a papermaking additive composition disclosed herein for deinking pulp and/or paper material. The disclosed uses comprises applying an effective amount of the papermaking additive composition to the pulp slurry during pulping and/or paper production phases in order to remove ink from the pulp and/or paper material.

BRIEF DESCRIPTION OF DRAWINGS

FIGS. 1A-C show time-dependent improvement of homogenization of fibers treated with a papermaking additive composition disclosed herein in pulping process with FIG. 1A showing freeness of fibers at 10 minutes; FIG. 1B showing freeness of fibers at 20 minutes; and FIG. 1C showing freeness of fibers at 30 minutes.

FIG. 2 shows refined fibers after treatment with a papermaking additive composition disclosed herein.

DETAILED DESCRIPTION

Paper is made from cellulosic fibers obtained from plant materials, such as, e.g., wood from hardwood or softwood trees, rags, flax, cotton linters and/or bagasse. Reclaimed paper can be recycled to produce new paper products, where is often blended with virgin fibers. Synthetic materials may be used to impart special qualities to a finished paper product. Other products made from cellulosic fibers include diapers, rayon, cellulose acetate, and cellulose esters, which are used for cloth, packaging films, and explosives.

Typical woods are comprised of about 40%-50% cellulose, 25%-35% hemicellulose, 15%-30% lignin and 2%-10% extractives. In making paper, one major step is to extract the cellulose from the remainder of the other components. In general, the higher amount of hemicellulose, lignin and extractives present in a paper product, the lower the quality.

Many modern papermaking mills are roughly divided into five distinct operational phases: 1) the pulping phase; 2) the forming phase; 3) the pressing phase; 4) the drying phase; and 5) the calendering phase. The last four phases can be collectively referred to as the paper production phase. Raw materials are processed and refined in the pulping phase to isolate cellulose fibers from lignin, extractives and other raw material impurities and produce a wet slurry or pulp having about 99% water content called the furnish. In the forming phase, also known as the wet end, the furnish is dispersed onto a moving screen known as a fourdrinier wire in order to drain water from the furnish (by gravity or under vacuum) to form a continuous mesh of fibers. In the pressing phase, the fiber mesh then passes between large rolls loaded under high pressure to squeeze out as much water as possible to form a pressed sheet. The pressed sheet then enter drying phase where it passes through a series of steam heated drying cylinders which reduces the water content down to a level of about 6%. Lastly, in the calendering phase the dried paper is smoothed and flattened under high loading and pressure using steel rollers to produce the finished untrimmed paper product. The untrimmed paper is wound into rolls for use on web-fed presses, such as newspaper presses, or slit and cut into lengths to make sheets of paper for sheet-fed presses.

During the pulping phase, useful fibers are separated from lignin, extractives (e.g., oleoresins and waxes) and other raw material waste products using chemical and/or mechanical procedures. For example, in chemical procedures, raw material is processed into smaller particles, put into a pressurized kettle, called a digester, along with chemicals (white liquor) and water, and cooked with steam under high pressure. Cooking breaks down the lignin binding material which separates the cellulose fibers from the rest of the raw material. The separated raw material and spent cooking chemicals are then sent to a recovery process, where the pulping chemicals and energy are recovered via multiple evaporation steps for concentration of pulping waste liquid (black liquor) which can then be burned as fuel.

In mechanical procedures, raw material passes through a grinder where it is ground against a water lubricated rotating stone or the heat generated by grinding softens the lignin binding the fibers and the mechanized forces separate the fibers to form groundwood. Alternatively, raw material passes through a refiner where it is subjected to intensive shearing forces between a rotating steel disc and a fixed plate. The discs have raised bars on their faces and pass each other with narrow clearance. This action separates the fibers from the rest of the raw material. The shearing action also unravels the fibers, causing the fibrils of the fibers to partially detach and bloom outward. Raw material can also be softened by heating (thermo-mechanical) or impregnated with a chemical treatment before entering the digester or refiner to facilitate fibrillation (chemical thermos-mechanical).

Whether fiber separation occurs by chemical, mechanical, or a combination of both procedures, the processed pulp is pumped through a sequence of holding tanks commonly called chests for further processing. For example, the pulp can be washed to cleanse the fibers and remove residual lignin and other impurities as well as screened to remove any remaining fiber bundles and achieve a more uniform quality and consistency. The processed pulp can also be mixed in a blending chest with other processed pulp obtained from different raw material sources or recycled paper products in order to create a blended processed pulp. Depending on the type of final paper product being made, the processed pulp can also pass through a series of chests were various fillers are added to the processed pulp to improve, e.g., opacity, brightness, mechanical strength, smoothness, ink receptivity, as well as other properties. For example, bleach or other whitening agents may be added to whiten the fibers and increase brightness, dyes and pigments may be added to produce colored papers, opacity agents like calcium carbonate, clay and titanium dioxide increase opacity to enable printing on the both sides, a sizing agent may be added to increase moisture resistance. The processed pulp can also be treated to remove ink (deinking) and other contaminants, which typically is needed if the raw material was reclaimed paper products that are being recycled. Lastly, the processed pulp can have its pH adjusted and be diluted with water to form a consistent furnish for subsequent processing.

A major goal of the pulping phase is to remove as much lignin, extractives and other waste materials from the pulp in order to increase the amount of separated cellulose fibers present in the pulp, without sacrificing fiber integrity and strength in order to achieve a high fiber purity and quality. Another major goal of the pulping phase is to increasing the surface area of fibers to promoting bonding by, e.g., causing the fibrils of the fibers to partially detach and bloom outward. Additionally, particularly with respect to recycled paper, another goal is the removal of inks and adhesive contaminants, which can affect the purity and quality of the final paper product.

Without wishing to be limited by its theory, the presently disclosed papermaking additive compositions dissolve, disperse, or otherwise disrupt one or more components of the raw materials used to make pulp. This mechanism of action appears, in part, to be tied to the ability of the papermaking additive compositions disclosed herein to break down lignin and/or facilitate the separation of individual cellulose and hemicellulose fibers from fiber bundles. The end result is improved separation of cellulose and hemicellulose fibers from fiber bundles which ultimately leads to the production of higher quality paper products in a more efficient and cost-effective manner. This mechanism of action also appears, in part, to be tied to the ability of the papermaking additive compositions disclosed herein to break down ink and other organic compounds considered impurities in raw materials obtained from reclaimed paper products.

Regardless of the theory of operation, the disclosed papermaking additive compositions, methods and uses offer an alternative means of paper making that does not rely on chemicals toxic to humans or the environment. In addition, the disclosed papermaking additive compositions, methods and uses results in a better breakdown of lignin and other impurities that facilitates easier recycling of waste water for reuse in the pulping or paper production phases which also benefits humans and the environment. Further, the disclosed papermaking additive compositions, methods and uses to not require extensive energy input, thereby enabling a reduction of overall energy usage which further benefits humans and the environment. Rather the papermaking additive compositions, methods and uses disclosed herein appear to increase cellulose fiber separation, increase the surface area of fibers as well as, remove ink, adhesive and other contaminants, without sacrificing fiber integrity and strength in order to achieve a high fiber purity and quality. In addition, the disclosed papermaking additive compositions been proven to be substantially non-toxic to man and domestic animals and which have minimal adverse effects on wildlife and the environment.

Aspects of the present specification disclose, in part, a papermaking additive composition. A papermaking additive composition disclosed herein comprises a treated fermented microbial supernatant and one or more non-ionic surfactants. The treated fermented microbial supernatant lacks any live microorganisms such as yeast or bacteria, and additionally, lacks any active enzymes, activatable pro-enzymes, or any enzymatic activity. Additionally, the papermaking additive composition itself lacks any live microorganisms such as yeast or bacteria, and additionally, lacks any active enzymes, activatable pro-enzymes, or any enzymatic activity. A papermaking additive composition disclosed herein may be used in any personal or commercial papermaking processes.

In an aspect of this embodiment, a papermaking additive composition disclosed herein comprises, e.g., about 75% to about 99% of treated fermented microbial supernatant and about 1%-25% of one or more non-ionic surfactants. In another aspect of this embodiment, a papermaking additive composition disclosed herein comprises, e.g., about 80% to about 97% of treated fermented microbial supernatant and about 3%-20% of one or more non-ionic surfactants. In yet another aspect of this embodiment, a papermaking additive composition disclosed herein comprises, e.g., about 85% to about 95% of treated fermented microbial supernatant and about 5%-15% of one or more non-ionic surfactants. In still another aspect of this embodiment, a papermaking additive composition disclosed herein comprises, e.g., about 87% to about 93% of treated fermented microbial supernatant and about 7%-13% of one or more non-ionic surfactants. In another aspect of this embodiment, a papermaking additive composition disclosed herein comprises, e.g., about 88% to about 92% of treated fermented microbial supernatant and about 8%-12% of one or more non-ionic surfactants. In another aspect of this embodiment, a papermaking additive composition disclosed herein comprises, e.g., about 89% to about 91% of treated fermented microbial supernatant and about 9%-11% of one or more non-ionic surfactants.

Aspects of the present specification disclose, in part, a fermented microbial supernatant. A fermented microbial supernatant disclosed herein can be prepared by culturing a yeast strain, a bacterial strain, or a combination of both a yeast strain and a bacterial strain in a fermenting medium comprising a sugar source, a malt and a magnesium salt. In an aspect of this embodiment, only a single yeast strain is used in a fermenting medium. In another aspect of this embodiment, two or more different yeast strains are used in a fermenting medium. In yet another aspect of this embodiment, only a single bacterial strain is used in a fermenting medium. In still another aspect of this embodiment, two or more different bacterial strains are used in a fermenting medium. In another aspect of this embodiment, one or more different yeast strains are used in conjunction with one or more different bacteria in a fermenting medium. In yet another aspect of this embodiment, two, three, four, five or more different yeast strains are used in conjunction with two, three, four, five or more different bacteria in a fermenting medium.

A sugar source includes, without limitation, sucrose from molasses, raw cane sugar, soybeans or mixtures thereof. Molasses generally contains up to about 50% sucrose in addition to reducing sugars such as glucose and maltase as well as ash, organic nonsugars and some water. The presence of the sugars of the type found in the molasses is important in encouraging the activity of the enzymes and the yeast bacteria by which they are produced. Although the untreated cane blackstrap molasses is preferred, other molasses such as beet molasses, barrel molasses and the like may also be used as a natural source of the materials required for the enzymatic fermentation. The amount of molasses useful in preparing a fermenting medium disclosed herein is between 40% and about 80% by weight, and preferably between about 55% and about 75% by weight. It will be appreciated that specific amounts of the molasses utilized may be varied to yield optimum compositions desired.

Raw cane sugar is a sugar product which has not been refined and which contains residual molasses as well as other natural impurities. Although it is not clearly understood, it has been found that the presence of raw sugar in the fermentation reaction yields significantly improved properties as compared to the use of refined sugars which contain residual chemicals used in the decolorization and final purification and refinement which may have some deleterious effect on the yeast and malt enzymes. It has been found that optimum biological and enzymatic properties of the disclosed fermenting medium are improved where a portion of the fermentable materials present in the mixture comprises raw sugar. The amount of raw cane sugar useful in preparing a fermenting medium disclosed herein may be about 10% and about 40% by weight, and preferably between about 10% and about 30% by weight. It will be appreciated that specific amounts of the raw cane sugar utilized may be varied to yield optimum compositions desired.

The essential enzymes which advantageously contribute to the fermentation reaction are provided by the malt and the yeast and/or bacteria. The specific malt utilized is preferably a diastatic malt which contains enzymes including diastase, maltase and amylase. The malt also is believed to improve the activity of the yeast and/or bacteria in addition to contributing to the overall potency and activity of the enzymatic composition within the final product mixture. The amount of malt useful in preparing a fermenting medium disclosed herein may be between about 3% and about 15% by weight, and preferably between about 7% and about 12% by weight. It will be appreciated that specific amounts of the malt utilized may be varied to yield optimum compositions desired.

Fermentation is a metabolic process that results in the breakdown of carbohydrates and other complex organic substances into simpler substances like sugars, acids, gases or alcohol. Fermentation can occurs in yeast, bacteria and mold. Fermentation includes ethanol fermentation and lactic acid fermentation. Lactic acid fermentation includes homolactic fermentation and heterolactic fermentation.

A yeast refers to any fermentation fungi that can be produce the needed enzymes for a fermentation reaction that results in, for example the conversion of carbohydrates into carbon dioxide and alcohols. A number of enzymes are produced by the active yeast during the fermentation reaction and include both hydrolytic and oxidative enzymes such as invertase, catalase, lactase, maltase, carboxylase and others. Yeast include yeast strains useful in food processing fermentation, such as, e.g., bean-based fermentation, dough-based fermentation, grain-based fermentation, vegetable-based fermentation, fruit-based fermentation, honey-based fermentation, dairy-based fermentation, fish-based fermentation, meat-based fermentation and tea-based fermentation. A non-exhaustive list of particular yeast genera useful in a fermentation reaction disclosed herein include, but is not limited, *Brettanomyces, Candida, Cyberlindnera, Cystofilobasidium, Debaryomyces, Dekkera, Fusarium, Geotrichum, Issatchenkia, Kazachstania, Kloeckera, Kluyveromyces, Lecanicillium, Mucor, Neurospora, Pediococcus, Penicillium, Pichia, Rhizopus, Rhodosporidium, Rhodotorula, Saccharomyces, Schizosaccharomyces, Thrichosporon, Torulaspora, Torulopsis, Verticillium, Yarrowia, Zygosaccharomyces and Zygotorulaspora*. Species of yeast useful in a fermentation reaction disclosed herein belong to, without limitation A non-exhaustive list of particular yeast species useful in a fermentation reaction disclosed herein includes, but is not limited, *B. anomalus, B. bruxellensis, B. claussenii, B. custersianus, B. naardenensis, B. nanus, C. colliculosa, C. exiguous, C. humicola, C. kefyr, C. krusei, C. milleri, C. mycoderma, C. pelliculosa, C. rugose, C. stellate, C. tropicalis, C. utilis, C. valida, C. vini, C. zey/anoides, Cb. mrakii, Cs, infirmominiatum, D. hansenii, D. kloeckeri, Dk. anomala, Dk. bruxellensis, F. domesticum, G. candidum, I. orientalis, K. exigua, K. unispora, Kl. africana, Kl. apis, Kl. javanica, Ku. lactis, Ku. marxianus, Ku. marxianus, L. lecanfi, M. hiemalis, M. plumbeus, M. racemosus, M. racemosus, N. intermedia, P. cerevisiae, Pn. album, Pn. camemberti, Pn. caseifulvum, Pn. chrysogenum, Pn. commune, Pn. nalgiovense, Pn. roqueforti, Pn. solitum, Pi. fermentans, R. microspores, Rs. infirmominiatum, Rt. glutinis, Rt. minuta, Rt. rubra, S. bayanus, S. boulardii, S. carlsbergensis, S. cerevisiae, S. eubayanus, S. paradoxus, S. pastorianus, S. rouzii, S. uvarum, Sc. pombe, Th. beigelii, T. delbrueckii, T. franciscae, T. pretoriensis, T. microellipsoides, T. globosa, T. indica, T. maleeae, T. quercuum, To. versatilis, V. lecanfi, Y. lipolytica, Z. bailii, Z. bisporus, Z. cidri, Z. fermentati, Z. florentinus, Z. kombuchaensis, Z. lentus, Z. mellis, Z. microellipsoides, Z. mrakii, Z. pseudorouxii and Z. rouxii and Zt. florentina*. A preferred yeast is *Saccharomyces cerevisiae* commonly available as baker's yeast.

Bacteria refer to any fermentation bacteria that can be produce the needed enzymes for a fermentation reaction that results in, for example the production of alcohols like ethanol or acids like acetic acid, lactic acid and/or succinic acid. A non-exhaustive list of particular bacterial genera useful in a fermentation reaction disclosed herein include, but is not limited, *Acetobacter, Arthrobacter, Aerococcus, Bacillus, Bifidobacterium, Brachybacterium, Brevibacterium, Barnobacterium, Carnobacterium, Corynebacterium, Enterococcus, Escherichia, Gluconacetobacter, Gluconobacter, Hafnia, Halomonas, Kocuria, Lactobacillus, Lactococcus, Leuconostoc, Macrococcus, Microbacterium, Micrococcus, Neisseria, Oenococcus, Pediococcus, Propionibacterium, Proteus, Pseudomonas, Psychrobacter, Salmonella, Sporolactobacillus, Staphylococcus, Streptococcus, Streptomyces, Tetragenococcus, Vagococcus, Weissells and Zymomonas*. A non-exhaustive list of particular bacterial species useful in a fermentation reaction disclosed herein includes, but is not limited, *A. aceti, A. fabarum, A. lovaniensis, A. malorum, A. orientalis, A. pasteurianus, A. pasteurianus, A. pomorum, A. syzygii, A. tropicalis, Ar. arilaitensis, Ar. Bergerei, Ar. Globiformis, Ar. nicotianae, Ar. variabilis, B. cereus, B. coagulans, B. licheniformis, B. pumilus, B. sphaericus, B. stearothermophilus, B. subtilis, B. adolescentis, B. animalis, B. bifidum, B. breve, B. infantis, B. lactis, B. longum, B. pseudolongum, B. thermophilum, Br. alimentarium, Br. alimentarium, Br. tyrofermentans, Br. tyrofermentans, By. aurantiacum, By. casei, By. linens, C. divergens, C. maltaromaticum, C. piscicola, C. ammoniagenes, Co. casei, Co. flavescens, Co. mooreparkense, Co. variabile, E. faecalis, E. faecium, G. azotocaptans, G. diazotrophicus, G. entanii, G. europaeus, G. hansenii, G. johannae, G. oboediens, G. xylinus, Gl. oxydans, H. alvei, Hl. elongate, K. rhizophila, K. rhizophila, K. varians, K. varians, L. acetotolerans, L. acidifarinae, L. acidipiscis, L. alimentarius, L. brevis, L. bucheri, L. cacaonum, L. casei, L. cellobiosus, L. collinoides, L. composti, L. coryniformis, L. crispatus, L. curvatus, L. delbrueckii, L. dextrinicus, L. dioliverans, L. fabifermentans, L. farciminis, L. fermentum, L. gasseri, L. ghanensis, L. hammesii, L. harbinensis, L. helveticus, L. hilgardii, L. homohiochfi, L. jensenii, L. johnsonii, L. kefiranofaciens, L. kefiri, L. kimchi, L. kisonensis, L. kunkeei, L. mall, L. manihotivorans, L. mindensis, L. mucosae, L. nagelii, L. namuresis, L. nantesis, L. nodensis, L. oeni, L. otakiensis, L. panis, L. parabrevis, L. parabuchneri, L. paracasei, L. parakefiri, L. paralimentarius, L. paraplantarum, L. pentosus, L. perolens, L. plantarum, L. pobuzihii, L. pontis, L. rapi, L. reuteri, L. rhamnosus, L. rossiae, L. sakei, L. salivarius, L. sanfranciscensis, L. satsumensis, L. secaliphilus, L. senmaizukei, L. siliginis, L. similis, L. spicheri, L. suebicus, L. sunkii, L. tucceti, L. vaccinostercus, L. versmoldesis, L. yamanashiensis, Lc. lactis, Lc. raffinolactis, Le. carnosum, Le. citreum, Le. fallax, Le. holzapfelii, Le. inhae, Le. kimchi, Le. lactis, Le. mesenteroides, Le. palmae, Le. Pseudomesenteroides, M. caseo/yticus, Mb. foliorum, Mb gubbeenense, Mc. luteus, Mc. lylae, P. acidilactici, P. pentosaceus, P. acidipropionici, P. freudenreichii, P. jensenii, P. thoenii, Pr. vulgaris, Ps. fluorescens, Py. celer, S. carnosus, S. condiment, S. equo-* rum, *S. fleurettii*, *S. piscifermentans*, *S. saphrophyticus*, *S. sciuri*, *S. simulans*, *S. succinus*, *S. vitulinus*, *S. warneri*, *S. xylosus*, *St. cremoris*, *St. gallolyticus*, *St. salivarius*, *St. thermophiles*, *St. griseus*, *T. halophilus*, *T. koreensis*, *W. beninensis*, *W. cibaria*, *W. fabaria*, *W. ghanesis*, *W. koreensis*, *W. paramesenteroides*, *W. thailandensis*, and *Z. mobilis*.

Mold refer to any fermentation mold that can be produce the needed enzymes for a fermentation reaction that results in, for example the production of alcohols like ethanol or acids like acetic acid, lactic acid and/or succinic acid. A non-exhaustive list of particular mold genera useful in a fermentation reaction disclosed herein include, but is not limited, *Aspergillus*. A non-exhaustive list of particular mold species useful in a fermentation reaction disclosed herein includes, but is not limited, *A. acidus*, *A. fumigatus*, *A. niger*, *A. oryzae*, and *A. sojae*.

It will be appreciated that actual amounts of the various types of enzymes produced will be dependent on a number of factors including the types of molasses and sugar used in preparing the fermentation mixture. However, again it is believed that, in utilizing the molasses and raw sugar, optimum enzyme yields and activity are obtained. In an embodiment, the amount of yeast useful in preparing a fermenting medium disclosed herein may be between about 0.2% and about 5% by weight, and preferably between about 1% and about 3% by weight. It will be appreciated that specific amounts of the yeast utilized may be varied to yield optimum compositions desired.

The presence of a small amount of inorganic catalyst such as a magnesium salt enhances the activity of the enzymes not only during the fermentation reaction but thereafter in the product composition in attacking and decomposing the organic waste materials. A preferred magnesium salt is magnesium sulfate. The amount of magnesium salt useful in preparing a fermenting medium disclosed herein may be between about 0.1% and about 5% by weight, and preferably between about 1% and about 3% by weight. It will be appreciated that specific amounts of the magnesium salt utilized may be varied to yield optimum compositions desired.

To prepare a fermented microbial supernatant, the molasses, sucrose and magnesium salt are added to a suitable amount of warm water. Although the specific amount of water used is not particularly critical, typically suitable amounts of water are from about 2 to about 20 times the total weight of the other ingredients of the fermenting medium used in the fermentation reaction. This amount of water is sufficient to facilitate easy admixture as well as to activate the yeast, bacterial and/or mold and dissolve the other materials. In addition, the temperature of the water cannot be too hot such that the heat inactivates the malt and yeast enzymes needed for fermentation. Thus, for example, water temperatures greater than about 65° C. must be avoided and preferred temperatures are between about 25° C. to about 45° C. The use of cold water may result in unduly slow fermentation reaction rates and, thus, should also be avoided where increased reaction rates are desired. After the molasses, sugar and magnesium salt are effectively mixed and dissolved, the malt and the yeast are added, the mixture stirred and allowed to set until fermentation is essentially complete. The reaction time may be between about 2 and about 5 days at temperatures between about 20° C. and about 45° C. Completion may be readily ascertained by noting that the effervescence of the reacting mixture has substantially subsided. At the end of the fermentation reaction, the fermented microbial culture is centrifuged to remove the "sludge" formed during the fermentation. The resulting fermentation supernatant (typically about 90% to about 98% by weight) is collected for subsequent treatment.

A fermented microbial supernatant contains bio-nutrients, minerals and amino acids. Bio-nutrients are typically present in an amount of from about 0.01% to about 1% of the total weight of fermented microbial supernatant. Each individual bio-nutrient is typically present in an amount of from about 0.00001% to about 0.01% of the total weight of fermented microbial supernatant. Examples of bio-nutrients include, without limitation, biotin, folic acid, glucans like α-glucan and β-glucan, niacin, insotil, pantothenic acid, pyridoxine, riboflavin and thiamine. In aspects of this embodiment, a fermented microbial supernatant disclosed herein comprises, e.g., about 0.00001% to about 0.0011% of biotin, about 0.0006% to about 0.016% of folic acid, about 0.005% to about 15% of niacin, about 0.01% to about 1% of insotil, about 0.00017% to about 0.017% of pantothenic acid, about 0.0006% to about 0.016% of pyrodoxine, about 0.002% to about 0.023% of riboflavin and about 0.001% to about 0.02% of thiamine. In other aspects of this embodiment, a fermented microbial supernatant disclosed herein comprises, e.g., about 0.00006% to about 0.0006% of biotin, about 0.001% to about 0.011% of folic acid, about 0.01% to about 0.1% of niacin, about 0.08% to about 0.18% of insotil, about 0.002% to about 0.012% of pantothenic acid, about 0.001% to about 0.011% of pyrodoxine, about 0.007% to about 0.017% of riboflavin, about 0.003% to about 0.013% of thiamine. In yet other aspects of this embodiment, a fermented microbial supernatant disclosed herein comprises, e.g., about 0.00012% to about 0.0006% of biotin, about 0.001% to about 0.011% of folic acid, about 0.01% to about 0.1% of niacin, about 0.08% to about 0.18% of insotil, about 0.003% to about 0.013% of pantothenic acid, about 0.001% to about 0.011% of pyrodoxine, about 0.008% to about 0.017% of riboflavin, about 0.003% to about 0.013% of thiamine. In still other aspects of this embodiment, a fermented microbial supernatant disclosed herein comprises, e.g., about 0.00009% to about 0.0003% of biotin, about 0.004% to about 0.008% of folic acid, about 0.03% to about 0.07% of niacin, about 0.11% to about 0.15% of insotil, about 0.006% to about 0.01% of pantothenic acid, about 0.004% to about 0.008% of pyrodoxine, about 0.01% to about 0.014% of riboflavin, about 0.006% to about 0.010% of thiamine.

Minerals are typically present in an amount of from about 0.1% to about 20% of the total weight of fermented microbial supernatant. Each individual mineral is typically present in an amount of from about 0.0001% to about 5% of the total weight of fermented microbial supernatant. Examples of minerals include, without limitation, calcium, chromium, copper, iron, magnesium, phosphate, potassium, sodium and zinc. In aspects of this embodiment, a fermented microbial supernatant disclosed herein comprises, e.g., about 0.02% to about 0.3% of calcium, about 0.000002% to about 0.0016% of chromium, about 0.000009% to about 0.0014% of copper, about 0.00005% to about 0.02% of iron, about 0.001% to about 1.3% of magnesium, about 0.2% to about 14% of phosphate, about 0.4% to about 16% of potassium, about 0.2% to about 15% of sodium and about 0.08% to about 13% of zinc. In other aspects of this embodiment, a fermented microbial supernatant disclosed herein comprises, e.g., about 0.07% to about 0.21% of calcium, about 0.000007% to about 0.0011% of chromium, about 0.00004% to about 0.0009% of copper, about 0.0001% to about 0.015% of iron, about 0.005% to about 0.9% of magnesium, about 0.7% to about 9% of phosphate, about 0.9% to about 11% of potassium, about 0.7% to about 10% of sodium and about 0.3% to about 8% of zinc. In yet other aspects of this embodiment, a fermented microbial supernatant disclosed herein comprises, e.g., about 0.05% to about 1% of calcium, about 0.0001% to about 0.0009% of chromium, about 0.00006% to about 0.0007% of copper, about 0.0001% to about 0.013% of iron, about 0.005% to about 1% of magnesium, about 0.1% to about 7% of phosphate, about 0.5% to about 9% of potassium, about 0.5% to about 8% of sodium and about 0.5% to about 6% of zinc. In still other aspects of this embodiment, a fermented microbial supernatant disclosed herein comprises, e.g., about 0.12% to about 0.16% of calcium, about 0.0002% to about 0.0006% of chromium, about 0.00009% to about 0.0004% of copper, about 0.0006% to about 0.01% of iron, about 0.01% to about 0.4% of magnesium, about 1% to about 4% of phosphate, about 2% to about 6% of potassium, about 1% to about 5% of sodium and about 0.8% to about 3% of zinc.

Amino acids are typically present in an amount of from about 20% to about 60% of the total weight of fermented microbial supernatant. Each individual amino acid is typically present in an amount of from about 0.1% to about 15% of the total weight of fermented microbial supernatant. Examples of minerals include, without limitation, alanine, arginine, aspartic acid, cysteine, glutamic acid, glycine, lysine, methionine, phenylalanine, proline, serine, and threonine. In aspects of this embodiment, a fermented microbial supernatant disclosed herein comprises, e.g., about 0.2% to about 16% of alanine, about 0.09% to about 15% of arginine, about 0.4% to about 18% of aspartic acid, about 0.003% to about 5% of cysteine, about 0.5% to about 20% of glutamic acid, about 0.09% to about 15% of glycine, about 0.09% to about 15% of lysine, about 0.002% to about 5% of methionine, about 0.09% to about 15% of phenylalanine, about 0.09% to about 15% of proline, about 0.09% to about 15% of serine and about 0.09% to about 15% of threonine. In other aspects of this embodiment, a fermented microbial supernatant disclosed herein comprises, e.g., about 0.7% to about 11% of alanine, about 0.5% to about 10% of arginine, about 0.9% to about 13% of aspartic acid, about 0.008% to about 1.2% of cysteine, about 1% to about 15% of glutamic acid, about 0.5% to about 10% of glycine, about 0.8% to about 12% of lysine, about 0.2% to about 1.6% of methionine, about 0.5% to about 10% of phenylalanine, about 0.5% to about 10% of proline, about 0.5% to about 10% of serine and about 0.5% to about 10% of threonine. In yet other aspects of this embodiment, a fermented microbial supernatant disclosed herein comprises, e.g., about 0.5% to about 9% of alanine, about 0.5% to about 8% of arginine, about 1% to about 11% of aspartic acid, about 0.01% to about 2% of cysteine, about 3% to about 13% of glutamic acid, about 0.5% to about 8% of glycine, about 1% to about 10% of lysine, about 0.3% to about 3% of methionine, about 0.5% to about 7% of phenylalanine, about 0.5% to about 7% of proline, about 0.5% to about 7% of serine and about 0.5% to about 7% of threonine. In sill other aspects of this embodiment, a fermented microbial supernatant disclosed herein comprises, e.g., about 2% to about 6% of alanine, about 1% to about 5% of arginine, about 4% to about 8% of aspartic acid, about 0.03% to about 0.7% of cysteine, about 6% to about 10% of glutamic acid, about 1% to about 5% of glycine, about 3% to about 7% of lysine, about 0.7% to about 1.1% of methionine, about 1% to about 5% of phenylalanine, about 1% to about 5% of proline, about 1% to about 5% of serine and about 1% to about 5% of threonine.

Aspects of the present specification disclose, in part, a treated fermented microbial supernatant. A treated fermented microbial supernatant is one that is processed in a manner that denatures, kills or otherwise destroys any remaining live yeast, active enzymes contributed by the yeast and malt as well as any other microorganism or enzymes contributed by another source present in a fermented microbial supernatant disclosed herein. Non-limiting examples, of useful treatment procedures include a boiling process using high temperatures, an autoclaving process using high temperatures and high pressure or an irradiation process by exposing the supernatant to ionizing radiation, or any other sterilization process that denatures, kills or otherwise destroys any remaining live yeast, active enzymes contributed by the yeast and malt as well as any other microorganism or enzymes contributed by another source present in a fermented microbial supernatant disclosed herein. Furthermore, the above treatment processes could be used alone, in combination with one another, or in combination with a pasteurization process, a chemical sterilization process and a sterile filtration process to denature, kill or otherwise destroys proteins such as enzymes and microorganisms such as yeast, bacteria and/or mold present the fermentation supernatant disclosed herein. All the methods discussed above are processes known to a person of ordinary skilled in the art as these are routinely used in the food preparation and/or sterilization arts.

The treated fermented microbial supernatant can then be stored in liquid form for subsequent use. Alternatively, the treated fermented microbial supernatant can be spray dried by methods known in the art to produce a dry powder. The dry powder form can also be stored for subsequent use.

Any amount of treated fermented microbial supernatant disclosed herein may be used in a disclosed papermaking additive composition, with the proviso that the amount is useful to practice the methods and uses disclosed herein. Factor used in determining an appropriate amount include, e.g., whether the treated fermented microbial supernatant is in liquid or powder form, the particular commercial source of the treated fermented microbial supernatant, the particular method used to produce the treated fermented microbial supernatant, whether the papermaking additive composition is produced as a concentrate or as a ready as is product, and the dilution factor desired when preparing papermaking additive composition from a concentrate. Typically, a larger amount of a liquid form of the treated fermented microbial supernatant will be required relative to a dry powder form.

In aspects of this embodiment, the amount of treated fermented microbial supernatant used is, e.g., about 0.5% by weight, about 1.0% by weight, about 1.5% by weight, about 2.0% by weight, about 2.5% by weight, about 3.0% by weight, about 3.5% by weight, about 4.0% by weight, about 4.5% by weight, about 5.0% by weight, about 6.0% by weight, about 7.0% by weight, about 7.5% by weight, about 8.0% by weight, about 9.0% by weight or about 10.0% by weight. In other aspects of this embodiment, the amount of treated fermented microbial supernatant used is, e.g., at least 0.5% by weight, at least 1.0% by weight, at least 1.5% by weight, at least 2.0% by weight, at least 2.5% by weight, at least 3.0% by weight, at least 3.5% by weight, at least 4.0% by weight, at least 4.5% by weight, at least 5.0% by weight, at least 6.0% by weight, at least 7.0% by weight, at least 7.5% by weight, at least 8.0% by weight, at least 9.0% by weight or at least 10.0% by weight. In yet other aspects of this embodiment, the amount of treated fermented microbial supernatant used is, e.g., at most 0.5% by weight, at most 1.0% by weight, at most 1.5% by weight, at most 2.0% by weight, at most 2.5% by weight, at most 3.0% by weight, at most 3.5% by weight, at most 4.0% by weight, at most 4.5% by weight, at most 5.0% by weight, at most 6.0% by weight, at most 7.0% by weight, at most 7.5% by weight, at most 8.0% by weight, at most 9.0% by weight or at most 10.0% by weight. In still other aspects of this embodiment, the amount of treated fermented microbial supernatant used is between, e.g., about 0.1% to about 2.5% by weight, about 0.1% to about 3.0% by weight, about 0.1% to about 3.5% by weight, about 0.1% to about 4.0% by weight, about 0.1% to about 5.0% by weight, about 0.5% to about 2.5% by weight, about 0.5% to about 3.0% by weight, about 0.5% to about 3.5% by weight, about 0.5% to about 4.0% by weight, about 0.5% to about 5.0% by weight, about 1% to about 2.5% by weight, about 1% to about 3.0% by weight, about 1% to about 3.5% by weight, about 1% to about 4.0% by weight, about 1% to about 5.0% by weight, about 1% to about 6.0% by weight, about 1% to about 7.0% by weight, about 1% to about 8.0% by weight, about 1% to about 9.0% by weight or about 1% to about 10.0% by weight.

In other aspects of this embodiment, the amount of treated fermented microbial supernatant used is, e.g., about 15.0% by weight, about 20.0% by weight, about 25.0% by weight, about 30.0% by weight, about 35.0% by weight, about 40.0% by weight, about 45.0% by weight, about 50.0% by weight, about 55.0% by weight, about 60.0% by weight, about 65.0% by weight, about 70.0% by weight, about 75.0% by weight, about 80.0% by weight, about 85.0% by weight or about 90.0% by weight. In yet other aspects of this embodiment, the amount of treated fermented microbial supernatant used is, e.g., at least 15.0% by weight, at least 20.0% by weight, at least 25.0% by weight, at least 30.0% by weight, at least 35.0% by weight, at least 40.0% by weight, at least 45.0% by weight, at least 50.0% by weight, at least 55.0% by weight, at least 60.0% by weight, at least 65.0% by weight, at least 70.0% by weight, at least 75.0% by weight, at least 80.0% by weight, at least 85.0% by weight or at least 90.0% by weight. In still other aspects of this embodiment, the amount of treated fermented microbial supernatant used is, e.g., at most 15.0% by weight, at most 20.0% by weight, at most 25.0% by weight, at most 30.0% by weight, at most 35.0% by weight, at most 40.0% by weight, at most 45.0% by weight, at most 50.0% by weight, at most 55.0% by weight, at most 60.0% by weight, at most 65.0% by weight, at most 70.0% by weight, at most 75.0% by weight, at most 80.0% by weight, at most 85.0% by weight or at most 90.0% by weight.

In other aspects of this embodiment, the amount of treated fermented microbial supernatant used is between, e.g., about 5% to about 7.5% by weight, about 5% to about 10% by weight, about 5% to about 15% by weight, about 5% to about 20% by weight, about 5% to about 25% by weight, about 5% to about 30% by weight, about 5% to about 35% by weight, about 5% to about 40% by weight, about 5% to about 45% by weight, about 5% to about 50% by weight, about 5% to about 55% by weight, about 5% to about 60% by weight, about 5% to about 65% by weight, about 5% to about 70% by weight, about 5% to about 75% by weight, about 5% to about 80% by weight, about 5% to about 85% by weight, about 5% to about 90% by weight, about 5% to about 95% by weight, about 10% to about 15% by weight, about 10% to about 20% by weight, about 10% to about 25% by weight, about 10% to about 30% by weight, about 10% to about 35% by weight, about 10% to about 40% by weight, about 10% to about 45% by weight, about 10% to about 50% by weight, about 10% to about 55% by weight, about 10% to about 60% by weight, about 10% to about 65% by weight, about 10% to about 70% by weight, about 10% to about 75% by weight, about 10% to about 80% by weight, about 10% to about 85% by weight, about 10% to about 90% by weight, about 10% to about 95% by weight, about 15% to about 20% by weight, about 15% to about 25% by weight, about 15% to about 30% by weight, about 15% to about 35% by weight, about 15% to about 40% by weight, about 15% to about 45% by weight, about 15% to about 50% by weight, about 15% to about 55% by weight, about 15% to about 60% by weight, about 15% to about 65% by weight, about 15% to about 70% by weight, about 15% to about 75% by weight, about 15% to about 80% by weight, about 15% to about 85% by weight, about 15% to about 90% by weight, about 15% to about 95% by weight, about 25% to about 25% by weight, about 25% to about 30% by weight, about 25% to about 35% by weight, about 25% to about 40% by weight, about 25% to about 45% by weight, about 25% to about 50% by weight, about 25% to about 55% by weight, about 25% to about 60% by weight, about 25% to about 65% by weight, about 25% to about 70% by weight, about 25% to about 75% by weight, about 25% to about 80% by weight, about 25% to about 85% by weight, about 25% to about 90% by weight, about 25% to about 95% by weight, about 25% to about 30% by weight, about 25% to about 35% by weight, about 25% to about 40% by weight, about 25% to about 45% by weight, about 25% to about 50% by weight, about 25% to about 55% by weight, about 25% to about 60% by weight, about 25% to about 65% by weight, about 25% to about 70% by weight, about 25% to about 75% by weight, about 25% to about 80% by weight, about 25% to about 85% by weight, about 25% to about 90% by weight, about 25% to about 95% by weight, about 30% to about 35% by weight, about 30% to about 40% by weight, about 30% to about 45% by weight, about 30% to about 50% by weight, about 30% to about 55% by weight, about 30% to about 60% by weight, about 30% to about 65% by weight, about 30% to about 70% by weight, about 30% to about 75% by weight, about 30% to about 80% by weight, about 30% to about 85% by weight, about 30% to about 90% by weight, about 30% to about 95% by weight, about 35% to about 40% by weight, about 35% to about 45% by weight, about 35% to about 50% by weight, about 35% to about 55% by weight, about 35% to about 60% by weight, about 35% to about 65% by weight, about 35% to about 70% by weight, about 35% to about 75% by weight, about 35% to about 80% by weight, about 35% to about 85% by weight, about 35% to about 90% by weight, about 35% to about 95% by weight, about 40% to about 45% by weight, about 40% to about 50% by weight, about 40% to about 55% by weight, about 40% to about 60% by weight, about 40% to about 65% by weight, about 40% to about 70% by weight, about 40% to about 75% by weight, about 40% to about 80% by weight, about 40% to about 85% by weight, about 40% to about 90% by weight, about 40% to about 95% by weight, about 45% to about 50% by weight, about 45% to about 55% by weight, about 45% to about 60% by weight, about 45% to about 65% by weight, about 45% to about 70% by weight, about 45% to about 75% by weight, about 45% to about 80% by weight, about 45% to about 85% by weight, about 45% to about 90% by weight, about 45% to about 95% by weight, about 50% to about 55% by weight, about 50% to about 60% by weight, about 50% to about 65% by weight, about 50% to about 70% by weight, about 50% to about 75% by weight, about 50% to about 80% by weight, about 50% to about 85% by weight, about 50% to about 90% by weight, about 50% to about 95% by weight, about 55% to about 60% by weight, about 55% to about 65% by weight, about 55% to about 70% by weight, about 55% to about 75% by weight, about 55% to about 80% by weight, about 55% to about 85% by weight, about 55% to about 90% by weight, about 55% to about 95% by weight, about 60% to about 65% by weight, about 60% to about 70% by weight, about 60% to about 75% by weight, about 60% to about 80% by weight, about 60% to about 85% by weight, about 60% to about 90% by weight, about 60% to about 95% by weight, about 65% to about 70% by weight, about 65% to about 75% by weight, about 65% to about 80% by weight, about 65% to about 85% by weight, about 65% to about 90% by weight, about 65% to about 95% by weight, about 70% to about 75% by weight, about 70% to about 80% by weight, about 70% to about 85% by weight, about 70% to about 90% by weight, about 70% to about 95% by weight, about 75% to about 80% by weight, about 75% to about 85% by weight, about 75% to about 90% by weight, about 75% to about 95% by weight, about 80% to about 85% by weight, about 80% to about 90% by weight, about 80% to about 95% by weight, about 85% to about 90% by weight, about 85% to about 95% by weight or about 90% to about 95% by weight.

Aspects of the present specification disclose, in part, a surfactant. Surfactants are compounds that lower the surface tension of a liquid, allowing easier spreading, and lowering of the interfacial tension between two liquids, or between a liquid and a solid. Either a single surfactant may be mixed with the buffered solution disclosed herein, or a plurality of surfactants may be mixed with the buffered solution disclosed herein. Useful surfactants, include, without limitation, ionic surfactants, zwitterionic (amphoteric) surfactants, non-ionic surfactants, or any combination therein. The surfactant used in a method disclosed herein can be varied as appropriate by one skilled in the art and generally depends, in part, on the particular buffer being used, the protein being eluted, and the conductivity values being employed.

Ionic surfactants include anionic surfactants. Anionic surfactants include ones based on permanent functional groups attached to the head, such as, e.g., sulfate, sulfonate, phosphate carboxylates) or pH dependent anionic surfactants. Anionic surfactants include, without limitation, alkyl sulfates like ammonium lauryl sulfate and sodium lauryl sulfate (SDS); alkyl ether sulfates like sodium laureth sulfate and sodium myreth sulfate; docusates like dioctyl sodium sulfosuccinate; sulfonate fluorosurfactants like perfluorooctanesulfonate (PFOS) and perfluorobutanesulfonate; alkyl-diphenyloxide Disulfonates like DOWFAX™ 2A1 (Disodium Lauryl Phenyl Ether Disulfonate), DOWFAX™ 3B2 (Disodium Decyl Phenyl Ether Disulfonate), DOWFAX™ C10L (Disodium Decyl Phenyl Ether Disulfonate), DOWFAX™ 2EP, and DOWFAX™ 8390 (Disodium Cetyl Phenyl Ether Disulfonate); potassium phosphate polyether esters like TRITON™ H-55 and TRITON™ H-66; alkyl benzene sulfonates; alkyl aryl ether phosphates; alkyl ether phosphates; alkyl carboxylates like fatty acid salts and sodium stearate; sodium lauroyl sarcosinate; carboxylate fluorosurfactants like perfluorononanoate and perfluorooctanoate; and Sodium Hexyldiphenyl Ether Sulfonate (DOWFAX™ C6L).

Ionic surfactants also include cationic surfactants. Cationic surfactants include ones based on permanent or pH dependent cationic surfactants, such as, e.g., primary, secondary or tertiary amines. Cationic surfactants include, without limitation, alkyltrimethylammonium salts like cetyl trimethylammonium bromide (CTAB) and cetyl trimethylammonium chloride (CTAC); cetylpyridinium chloride (CPC); polyethoxylated tallow amine (POEA); benzalkonium chloride (BAC); benzethonium chloride (BZT); 5-Bromo-5-nitro-1,3-dioxane; dimethyldioctadecylammonium chloride; and dioctadecyldimethylammonium bromide (DODAB), as well as pH-dependent primary, secondary or tertiary amines like surfactants where the primary amines become positively charged at pH greater than 10, or the secondary amines become charged at pH less than 4, like octenidine dihydrochloride. Other useful anionic surfactants include bio-based anionic surfactants, including, without limitation, STEPONOL® AM 30-KE, an ammonium lauryl sulfate, and STEPONOL® EHS, a sodium 2-ethyl hexyl sulfate. Such bio-based surfactants are not synthetic molecules, but instead are anionic biosurfactants derived from organic matter such as plants.

Zwitterionic surfactants are based on primary, secondary or tertiary amines or quaternary ammonium cation with a sulfonate, a carboxylate, or a phosphate. Zwitterionic surfactants include, without limitation, 3-[(3-Cholamidopropyl)dimethylammonio]-1-propanesulfonate (CHAPS); sultaines like cocamidopropyl hydroxysultaine; betaines like cocamidopropyl betaine; or lecithins.

Non-ionic surfactants are less denaturing and as such are useful to solubilize membrane proteins and lipids while retaining protein-protein interactions. Nonionic surfactant include polyether nonionic surfactants, polyhydroxyl non-ionic surfactants and biosurfactants. Nonionic surfactant include alcohol ethoxylates, alkylphenol ethoxylates, phenol ethoxylates, amide ethoxylates, glyceride ethoxylates, fatty acid ethoxylates, and fatty amine ethoxylates. A nonionic surfactant disclosed herein may have the general formula of $H(OCH_2CH_2)_xOC_6H_4R^1$, $H(OCH_2CH_2)_xOR^2$, or $H(OCH_2CH_2)_xOC(O)R^2$, wherein x represents the number of moles of ethylene oxide added to an alkyl phenol and/or a fatty alcohol or a fatty acid, $R^1$ represents a long chain alkyl group and, $R^2$ represents a long chain aliphatic group. In aspects of this embodiment, $R^1$ is a $C_7$-$C_{10}$ alkyl group and/or $R^2$ is a $C_{12}$-$C_{20}$ aliphatic group. Other useful non-ionic surfactants include bio-based non-ionic surfactants, including, without limitation, STEPOSOL® MET-10U, a metathesis-derived, nonionic surfactant that is an unsaturated, short chain amide. Such bio-based surfactants are not synthetic molecules, but instead are non-ionic biosurfactants derived from organic matter such as plants.

Non-limiting examples of surfactants include polyoxyethylene glycol sorbitan alkyl esters (or ethoxylated sorbital esters) like polysorbate 20 sorbitan monooleate (TWEEN® 20), polysorbate 40 sorbitan monooleate (TWEEN® 40), polysorbate 60 sorbitan monooleate (TWEEN® 60), polysorbate 61 sorbitan monooleate (TWEEN® 61), polysorbate 65 sorbitan monooleate (TWEEN® 65), polysorbate 80 sorbitan monooleate (TWEEN® 80), polysorbate 81 sorbitan monooleate (TWEEN® 81) and polysorbate 85 sorbitan monooleate (TWEEN® 85); sorbital esters like sorbitan monooleate, sorbitan monolaurate, sorbitan monopalmitate, sorbitan monostearate and sorbitan tristearate; polyglycerol esters like glycerol monooleate, glycerol monolaurate, glycerol monopalmitate, glycerol monostearate, glycerol trioleate, glycerol ricinoleate, glycerol tristearate, mono diglycerides and glycerol triacetate; ethoxylated polyglycerol esters; alkyl glucosides like arachidyl glucoside, $C_{12}$-$C_{20}$ alkyl glucoside, caprylyl/capryl glucoside, cetearyl glucoside, coco-glucoside, ethyl glucoside and lauryl glucoside. decyl glucoside; ethoxylated alkyl glucosides; sucrose esters like sucrose monooleate, sucrose monolaurate, sucrose monopalmitate, sucrose monostearate, sucrose trioleate, sucrose ricinoleate, sucrose tristearate, sucrose diglycerides and sucrose triacetate; ethoxylated sucrose ester; amine oxides; ethoxylated alcohols; ethoxylated aliphatic alcohols; alkylamines; ethoxylated alkylamines; ethoxylated alkyl phenols like ethoxylated nonyl phenol and ethoxylated octyl phenol; alkyl polysaccharides; ethoxylated alkyl polysaccharides; ethoxylated fatty acids like ethoxylated castor oil; ethoxylated fatty alcohols like ethoxylated ceto-oleyl alcohol, ethoxylated ceto-stearyl alcohol, ethoxylated decyl alcohol, ethoxylated dodecyl alcohol and ethoxylated tridecyl alcohol; ethoxylated fatty amines; poloxamers (polyethylene-polypropylene copolymers), like Poloxamer 124 (PLURONIC® L44), Poloxamer 181 (PLURONIC® L61), Poloxamer 182 (PLURONIC® L62), Poloxamer 184 (PLURONIC® L64), Poloxamer 188 (PLURONIC® F68), Poloxamer 237 (PLURONIC® F87), Poloxamer 338 (PLURONIC® L108), and Poloxamer 407 (PLURONIC® F127); linear secondary alcohol ethoxylates like TERGITOL™ 15-S-5, TERGITOL™ 15-S-7, TERGITOL™ 15-S-9, TERGITOL™ 15-S-12, TERGITOL™ 15-S-15, TERGITOL™ 15-S-20, TERGITOL™ 15-S-30 and TERGITOL™ 15-S-40; alkyl phenol polyglycol ethers; polyethylene glycol alkyl aryl ethers; polyoxyethylene glycol alkyl ethers, like octaethylene glycol monododecyl ether, pentaethylene glycol monododecyl ether, BRIJ® 30, and BRIJ® 35; 2-dodecoxyethanol (LUBROL®-PX); polyoxyethylene glycol octylphenol ethers like polyoxyethylene (4-5) p-t-octyl phenol (TRITON® X-45) and polyoxyethylene octyl phenyl ether (TRITON® X-100); polyoxyethylene glycol alkylphenol ethers like Nonoxynol-9; phenoxypolyethoxylethanols like nonylphenoxypolyethoxylethanol and octylphenoxypolyethoxylethanol (IGEPAL® CA-630 or NONIDET™ P-40); glucoside alkyl ethers like octyl glucopyranoside; maltoside alkyl ethers like dodecyl maltopyranoside; thioglucoside alkyl ethers like heptyl thioglucopyranoside; digitonins; glycerol alkyl esters like glyceryl laurate; alkyl aryl polyether sulfates; alcohol sulfonates; sorbitan alkyl esters; cocamide ethanolamines like cocamide monoethanolamine and cocamide diethanolamine; sucrose monolaurate; dodecyl dimethylamine oxide, and sodium cholate. Other non-limiting examples of surfactants useful in the methods disclosed herein can be found in, e.g., Winslow, et al., *Methods and Compositions for Simultaneously Isolating Hemoglobin from Red Blood Cells and Inactivating Viruses*, U.S. 2008/0138790; Pharmaceutical Dosage Forms and Drug Delivery Systems (Howard C. Ansel et al., eds., Lippincott Williams & Wilkins Publishers, 7$^{th}$ ed. 1999); Remington: The Science and Practice of Pharmacy (Alfonso R. Gennaro ed., Lippincott, Williams & Wilkins, 20$^{th}$ ed. 2000); Goodman & Gilman's The Pharmacological Basis of Therapeutics (Joel G. Hardman et al., eds., McGraw-Hill Professional, 10$^{th}$ ed. 2001); and Handbook of Pharmaceutical Excipients (Raymond C. Rowe et al., APhA Publications, 4$^{th}$ edition 2003), each of which is hereby incorporated by reference in its entirety.

Non-ionic surfactants act synergistically to enhance the action of the fermentated microbial supernatant. In addition, it has been established that the non-ionic surfactants used in the papermaking additive compositions disclosed herein are compatible with enhance chemical reactions. Thus, in an embodiment, a papermaking additive composition disclosed herein contains only one or more nonionic surfactants. In another embodiment, a papermaking additive composition disclosed herein contains only one or more nonionic surfactants and one or more anionic surfactants. In another embodiment, a papermaking additive composition disclosed herein does not contain any cationic surfactants. In another embodiment, a papermaking additive composition disclosed herein does not contain any cationic surfactants or zwitterionic surfactants. In another embodiment, a papermaking additive composition disclosed herein does not contain any ionic surfactants. In another embodiment, a papermaking additive composition disclosed herein does not contain any ionic surfactants or zwitterionic surfactants.

Any amount of surfactant disclosed herein may be used, with the proviso that the amount is useful to practice the methods and uses disclosed herein. In aspects of this embodiment, the amount of surfactant used is, e.g., about 0.01% by weight, about 0.05% by weight, about 0.075% by weight, about 0.1% by weight, about 0.2% by weight, about 0.3% by weight, about 0.4% by weight, about 0.5% by weight, about 0.6% by weight, about 0.7% by weight, about 0.8% by weight, about 0.9% by weight, about 1.0% by weight, about 1.5% by weight, about 2.0% by weight, about 2.5% by weight, about 3.0% by weight, about 4.0% by weight, about 5.0% by weight, about 6.0% by weight, about 7.0% by weight, about 7.5% by weight, about 8.0% by weight, about 9.0% by weight or about 10.0% by weight. In other aspects of this embodiment, the amount of surfactant used is, e.g., at least 0.01% by weight, at least 0.05% by weight, at least 0.075% by weight, at least 0.1% by weight, at least 0.25% by weight, at least 0.5% by weight, at least 0.75% by weight, at least 1.0% by weight, at least 1.5% by weight, at least 2.0% by weight, at least 2.5% by weight, at least 3.0% by weight, at least 4.0% by weight, at least 5.0% by weight, at least 6.0% by weight, at least 7.0% by weight, at least 7.5% by weight, at least 8.0% by weight, at least 9.0% by weight, or at least 10.0% by weight. In yet other aspects of this embodiment, the amount of surfactant used is, e.g., at most 0.01% by weight, at most 0.05% by weight, at most 0.075% by weight, at most 0.1% by weight, at most 0.25% by weight, at most 0.5% by weight, at most 0.75% by weight, at most 1.0% by weight, at most 1.5% by weight, at most 2.0% by weight, at most 2.5% by weight, at most 3.0% by weight, at most 4.0% by weight, at most 5.0% by weight, at most 6.0% by weight, at most 7.5% by weight, at most 8.0% by weight, at most 9.0% by weight or at most 10.0% by weight.

In still other aspects of this embodiment, the amount of surfactant used is between, e.g., about 0.1% by weight to about 0.5% by weight, about 0.1% by weight to about 0.75% by weight, about 0.1% by weight to about 1.0% by weight, about 0.1% by weight to about 1.5% by weight, about 0.1% by weight to about 2.0% by weight, about 0.1% by weight to about 2.5% by weight, about 0.2% by weight to about 0.5% by weight, about 0.2% by weight to about 0.75% by weight, about 0.2% by weight to about 1.0% by weight, about 0.2% by weight to about 1.5% by weight, about 0.2% by weight to about 2.0% by weight, about 0.2% by weight to about 2.5% by weight, about 0.5% by weight to about 1.0% by weight, about 0.5% by weight to about 1.5% by weight, about 0.5% by weight to about 2.0% by weight, about 0.5% by weight to about 2.5% by weight, about 0.5% by weight to about 3.0% by weight, about 0.5% by weight to about 4.0% by weight, about 0.5% by weight to about 5.0% by weight, about 1.0% by weight to about 2.5% by weight, about 1.0% by weight to about 3.0% by weight, about 1.0% by weight to about 4.0% by weight, about 1.0% by weight to about 5.0% by weight, about 1.0% by weight to about 6.0% by weight, about 1.0% by weight to about 7.0% by weight, about 1.0% by weight to about 7.5% by weight, about 1.0% by weight to about 8.0% by weight, about 1.0% by weight to about 9.0% by weight, about 1.0% by weight to about 10.0% by weight, about 2.0% by weight to about 2.5% by weight, about 2.0% by weight to about 3.0% by weight, about 2.0% by weight to about 4.0% by weight, about 2.0% by weight to about 5.0% by weight, about 2.0% by weight to about 6.0% by weight, about 2.0% by weight to about 7.0% by weight, about 2.0% by weight to about 7.5% by weight, about 2.0% by weight to about 8.0% by weight, about 2.0% by weight to about 9.0% by weight, about 2.0% by weight to about 10.0% by weight, about 5.0% by weight to about 6.0% by weight, about 5.0% by weight to about 7.0% by weight, about 5.0% by weight to about 7.5% by weight, about 5.0% by weight to about 8.0% by weight, about 5.0% by weight to about 9.0% by weight, about 5.0% by weight to about 10.0% by weight, about 5.0% by weight to about 11.0% by weight, about 5.0% by weight to about 12.0% by weight, about 5.0% by weight to about 13.0% by weight, about 5.0% by weight to about 14.0% by weight or about 5.0% by weight to about 15.0% by weight.

Aspects of the present specification disclose, in part, a pH of a papermaking additive composition disclosed herein. The final pH of a papermaking additive composition is typically acidic as this contributes to a longer shelf-life of the composition. In aspects of this embodiment, the pH of a papermaking additive composition disclosed herein is, e.g., about 2, about 2.5, about 3, about 3.5, about 4, about 4.5, about 5, about 5.5 or about 6. In other aspects of this embodiment, the pH of a papermaking additive composition disclosed herein is, e.g., at least 2, at least 2.5, at least 3, at least 3.5, at least 4, at least 4.5, at least 5, at least 5.5 or at least 6. In yet other aspects of this embodiment, the pH of a papermaking additive composition disclosed herein is, e.g., at most 2, at most 2.5, at most 3, at most 3.5, at most 4, at most 4.5, at most 5, at most 5.5 or at most 6. In still other aspects of this embodiment, the pH of a papermaking additive composition disclosed herein is between, e.g., about 2 to about 3, about 2 to about 3.5, about 2 to about 4, about 2 to about 4.5, about 2 to about 5, about 2 to about 5.5, about 2 to about 6, about 2.5 to about 3, about 2.5 to about 3.5, about 2.5 to about 4, about 2.5 to about 4.5, about 2.5 to about 5, about 2.5 to about 5.5, about 2.5 to about 6, about 3 to about 3.5, about 3 to about 4, about 3 to about 4.2, about 3 to about 4.5, about 3 to about 4.7, about 3 to about 5, about 3 to about 5.2, about 3 to about 5.5, about 3 to about 6, about 3.5 to about 4, about 3.5 to about 4.2, about 3.5 to about 4.5, about 3.5 to about 4.7, about 3.5 to about 5, about 3.5 to about 5.2, about 3.5 to about 5.5, about 3.5 to about 6, about 3.7 to about 4.0, about 3.7 to about 4.2, about 3.7 to about 4.5, about 3.7 to about 5.2, about 3.7 to about 5.5 or about 3.7 to about 6.0.

Aspects of the present specification disclose, in part, an enzyme. A papermaking additive composition disclosed herein may optionally further comprise an enzyme. Enzymes useful in pulp and paper production. Include enzymes that boosting bleaching, increase deinking, modify fiber structure, increase effluent control, remove pitch and stickies (adhesives) and modify starch all of which lead to enhance productivity, reduce environmental damage and lower energy requirements. For example, amylases are used to cleave starch molecules to reduce viscosity. Xylanases (hemicellulases) are used to cleave hemicellulose, making the bleaching process more effective and increase brightness. Lipases cleave bonds of triglycerides to produce fatty acids and are used to control pitch in pulping phase. Cellulases and Xylanases hydrolyze microfibrils causing fiber swelling which make fibers more flexible as well as facilitate removal of inks and adhesives. Esterases breakdown ester bonds in ink particles and polymers used in toner and adhesives. Non-limiting examples of an enzymes useful in pulp and paper production include a cellulase, a xylanase, a lipase, an esterase, an amylase, a pectinase, a catalase, a laccase, a peroxidase, a pulpase DI, a pulpase RF and a pulpase BL.

Aspects of the present specification disclose, in part, a papermaking additive composition that is biodegradable. A biodegradable papermaking additive composition disclosed herein is one that is prone to degrading, eroding, resorbing, decomposing, or breaking down to a substantial or significant degree once applied according to the methods and uses disclosed herein. In aspects of this embodiment, at least 75%, at least 80%, at least 85%, at least 90%, at least 95%, at least 99% of a papermaking additive composition disclosed herein biodegrades in, e.g., about 1 day, about 2 days, about 3 days, about 4 days, about 5 days, about 6 days or about 7 days. In other aspects of this embodiment, at least 75%, at least 80%, at least 85%, at least 90%, at least 95%, at least 99% of a papermaking additive composition disclosed herein biodegrades in, e.g., about 1 to about 2 days, about 1 to about 3 days, about 1 to about 4 days, about 1 to about 5 days, about 1 to about 6 days, about 1 to about 7 days, about 2 to about 3 days, about 2 to about 4 days, about 2 to about 5 days, about 2 to about 6 days, about 2 to about 7 days, about 3 to about 4 days, about 3 to about 5 days, about 3 to about 6 days, about 3 to about 7 days, about 4 to about 5 days, about 4 to about 6 days, about 4 to about 7 days, about 5 to about 6 days, about 5 to about 7 days or about 6 to about 7 days.

In aspects of this embodiment, at least 75%, at least 80%, at least 85%, at least 90%, at least 95%, at least 99% of a papermaking additive composition disclosed herein biodegrades in, e.g., about 7 day, about 8 days, about 9 days, about 10 days, about 11 days, about 12 days, about 13 days or about 14 days. In other aspects of this embodiment, at least 75%, at least 80%, at least 85%, at least 90%, at least 95%, at least 99% of a papermaking additive composition disclosed herein biodegrades in, e.g., about 7 to about 8 days, about 7 to about 9 days, about 7 to about 10 days, about 7 to about 11 days, about 7 to about 12 days, about 7 to about 13 days, about 7 to about 14 days, about 8 to about 9 days, about 8 to about 10 days, about 8 to about 11 days, about 8 to about 12 days, about 8 to about 13 days, about 8 to about 14 days, about 9 to about 10 days, about 9 to about 11 days, about 9 to about 12 days, about 9 to about 13 days, about 9 to about 14 days, about 9 to about 11 days, about 9 to about 12 days, about 9 to about 13 days, about 9 to about 14 days, about 10 to about 11 days, about 10 to about 12 days, about 10 to about 13 days, about 10 to about 14 days, about 11 to about 12 days, about 11 to about 13 days, about 11 to about 14 days, about 12 to about 13 days, about 12 to about 14 days or about 13 to about 14 days.

In aspects of this embodiment, at least 75%, at least 80%, at least 85%, at least 90%, at least 95%, at least 99% of a papermaking additive composition disclosed herein biodegrades in, e.g., about 15 day, about 16 days, about 17 days, about 18 days, about 19 days, about 20 days or about 21 days. In other aspects of this embodiment, at least 75%, at least 80%, at least 85%, at least 90%, at least 95%, at least 99% of a papermaking additive composition disclosed herein biodegrades in, e.g., about 15 to about 16 days, about 15 to about 17 days, about 15 to about 18 days, about 15 to about 19 days, about 15 to about 20 days, about 15 to about 21 days, about 16 to about 17 days, about 16 to about 18 days, about 16 to about 19 days, about 16 to about 20 days, about 16 to about 21 days, about 17 to about 18 days, about 17 to about 19 days, about 17 to about 20 days, about 17 to about 21 days, about 18 to about 19 days, about 18 to about 20 days, about 18 to about 21 days, about 19 to about 20 days, about 19 to about 21 days or about 20 to about 21 days.

Aspects of the present specification disclose, in part, kits comprising one or more components useful to practice a method or use disclosed herein. Kits provide a convenient enclosure of components useful to practice a method or use disclosed herein to facilitate or enhance a commercial sale. For example, a kit may comprises a papermaking additive composition disclosed herein and one or more other reagents useful to practice a method or use disclosed herein, such as, e.g., one or more dilutants and/or one or more carriers.

Kits typically provide a suitable container, e.g., a box or other enclosed carrier that contain the one or more components useful to practice a method or use disclosed herein. In addition, kits disclosed herein will typically include separate containers, e.g., a bottle, a vial, a flask or other enclosed carrier that contains the one or more components. For example, a container for a papermaking additive composition disclosed herein, and a separate container for the one or more other reagents included in the kit. Kits can be portable, for example, able to be transported and used in remote areas such as commercial or industrial installations or agricultural fields. Other kits may be of use in a residential building.

A kit disclosed herein may include labels or inserts. Labels or inserts include "printed matter" that can be provided as separate material, a packing material (e.g., a box), or attached or affixed to a container containing a kit component. Labels or inserts can additionally include a computer readable medium, such as a disk (e.g., hard disk, flash memory), optical disk such as CD- or DVD-ROM/RAM, DVD, MP3, magnetic tape, or an electrical storage media such as RAM and ROM or hybrids of these such as magnetic/optical storage media, FLASH media or memory type cards. Labels or inserts may include identifying information of one or more components therein, dose amounts, does frequency or timing, information on the individual components. Labels or inserts can include information identifying manufacturer information, lot numbers, manufacturer location and date. Labels or inserts can include information on a condition or situation for which a kit component may be used. Labels or inserts can include instructions for using one or more of the kit components in a method, or use as disclosed herein. Instructions can include dosage amounts, frequency or duration, and instructions for practicing any of the methods or uses, or treatment protocols described herein as well as warnings on potential hazards or situations where it would not be appropriate to use the components of the kit.

Aspects of the present specification disclose, in part, a method of separating fibers from a pulp slurry. A method of separating fibers from a pulp slurry disclosed herein comprises applying an effective amount of a papermaking additive composition disclosed herein to the pulp slurry during a pulping and/or a paper production phase. The application resulting in increased separation of fibers from raw materials present in the pulp slurry.

Aspects of the present specification disclose, in part, methods of removing impurities and/or contaminates from pulp and/or paper material. A method of removing impurities and/or contaminates from pulp and/or paper material during paper production disclosed herein comprises applying an effective amount of a papermaking additive composition disclosed herein to a pulping and/or a paper production phase. The application results in the removal of impurities and/or contaminates from the pulp and/or paper material produced by the pulping and/or the paper production phases.

Aspects of the present specification disclose, in part, methods of removing ink from pulp and/or paper material. A method of removing ink from pulp and/or paper material disclosed herein comprises applying an effective amount of a papermaking additive composition disclosed herein to a pulping and/or a paper production phase. The application results in the removal of ink from the pulp and/or paper material produced by the pulping and/or the paper production phases.

Aspects of the present specification disclose uses of a papermaking additive composition disclosed herein for separating fibers from a pulp slurry. Use of a papermaking additive for separating fibers from a pulp slurry disclosed herein comprises applying an effective amount of a papermaking additive composition to the pulp slurry during a pulping and/or a paper production phase in order to increase separation of fibers from raw materials present in the pulp slurry.

Aspects of the present specification disclose uses of a papermaking additive composition disclosed herein for removing impurities and/or contaminates from pulp and/or paper material. The disclosed uses comprises applying an effective amount of the papermaking additive composition to the pulp slurry during a pulping and/or a paper production phase in order to remove impurities and/or contaminates from pulp and/or paper material produced by the pulping and/or the paper production phases.

Aspects of the present specification disclose uses of a papermaking additive composition disclosed herein for removing ink from pulp and/or paper material. The disclosed uses comprises applying an effective amount of the papermaking additive composition to the pulp slurry during a pulping and/or a paper production phase in order to remove ink from pulp and/or paper material produced by the pulping and/or the paper production phases.

An impurity and/or contaminate typically comprise resins, waxes, fats, fatty acids and their esters, and unsaponifiable substances, photosterols, salts and other water-soluble substances and non-volatile hydrocarbons as well as inks, adhesives, plastics and other additives. Such impurities and/or contaminates are generally referred to as extractives. Inks are made up of pigment, pigment carrier and additives formulated to reduce smudging, picking and other printing problems associated with ink.

The combination of the nonionic surfactant and the treated fermented microbial supernatant in the papermaking additive compositions disclosed herein results in an accelerated in situ chemical reactions of the molecular structures, particularly chemical bonds present in polysaccharide and lipid-based components, present in the raw materials used to make pulp and paper material, particularly chemical bonds and lipid-based components. The in situ chemical reactions dissolve, disperse, or otherwise disrupt one or more components of the raw material.

Without wishing to be limited by any theory, upon application of a papermaking additive composition in an aqueous environment, highly reactive, uniquely structured, ultra-fine microbubbles are spontaneously formed. These "functionalized" microbubbles comprise an outer "highly reactive" shell composed of one or more nonionic surfactants and components from the treated fermented microbial supernatant and an inner core containing air. The "highly reactive" shell enables a dramatic increase in the mass transfer of oxygen in an aqueous environment and an accelerated bio-catalysis of the molecular structures of compounds, which in combination provide a synergistic functionality. With respect to mass transfer of oxygen, this functionality increases transfer rates of oxygen and raises the level of dissolved oxygen in an aqueous environment which far exceeding the solubility limits anticipated by Henry's Law, and, are at levels that simply cannot be achieved through mechanical aeration systems. It appears that components from the treated fermented microbial supernatant interfere with the ability of the nonionic surfactants to create a well-organized micellar shell. The result is a loose molecular packing of these fermentation components and surfactants that "functionalized" the shell to be more gas permeable, thereby creating more favorable conditions for mass gas transfer. As such, this oxygen transfer function increases the availability of oxygen in an aqueous environment. With respect to accelerated bio-catalysis, this functionality lowers the transition of energy required for a catalytic reaction to occur by providing a reaction platform that increases localized concentrations of reactants, enables donation of electrons and facilitate chemical reactions at electron poor sites. As such, this bio-catalysis function mediates cleavage of chemical bonds, including glycosidic and ester bonds, present in a compound. As such, the "functionalized" shell of the microbubbles have catalytic activities that like conventional enzyme systems, but without the need of any enzymes. Thus, application of a papermaking additive composition disclosed herein creates "functionalized: microbubbles that increase oxygen dispersion resulting in higher dissolved oxygen levels and accelerate molecular interactions resulting in catalytic breakdown of compounds.

When in contact with raw material used to make pulp, the "functionalized" shell chemically interacts with lignin and the lipid-based components of the material in a manner that enables donation of electrons or reactions at electron poor sites that mediates cleavage of chemical bonds, including glycosidic and ester bonds, present in lignin and other extractives. Similarly, when in contact with impurities or contaminants including ink the "functionalized" shell chemically interacts with the impurities and contaminants in a manner that enables donation of electrons or reactions at electron poor sites that mediates cleavage of chemical bonds, including glycosidic and ester bonds, present in the impurities and contaminants. These interactions appears to be a form of hydrolysis using beta-oxidation where, in addition to relying on components of the "functionalized" shell, oxygen present in the core of the microbubble is also utilized. Thus, the properties present in the "functionalized" shell works synergistically with the oxygen transfer capabilities of the core to enhance the in situ breaking of chemical bonds, including glycosidic and ester bonds, present in lignin, extractives, impurities and contaminants.

Application of a papermaking additive composition disclosed herein can be by any method that exposes a raw material, an impurity and/or a contaminant to the disclosed papermaking additive compositions in a manner that provides adequate breakage of bonds one or more components of the raw material, the impurity and/or the contaminant. For example, exposure can be by applying a papermaking additive composition to pulp contained in a holding tank during the pulping phase, to the furnish being stored in a holding tank, or to the furnish during the forming phase.

An undiluted form of the papermaking additive composition disclosed herein can be used in the methods and uses disclosed herein. Alternatively, it may desirable to dilute the papermaking additive composition disclosed herein, and those skilled in the art are aware that dilutions of such compositions can be used. Dilution of a papermaking additive composition disclosed herein is typically done using water, although other appropriate diluents may be used so long as they are compatible with the formation of microbubbles as disclosed herein. In aspects of this embodiment, a papermaking additive composition is diluted to a ratio of, e.g., 1:10, 1:25, 1:50, 1:75, 1:100, 1:200, 1:300, 1:400, 1:500, 1:600, 1:700, 1:800, 1:900, 1:1000, 1:2000, 1:3000, 1:4000, 1:5000, 1:6000, 1:7000, 1:8000, 1:9000, 1:10000, 1:20000, 1:30000, 1:40000, 1:50000, 1:60000, 1:70000, 1:80000, 1:90000 or 1:100000. In other aspects of this embodiment, a papermaking additive composition is diluted to a ratio of, e.g., at least 1:10, at least 1:25, at least 1:50, at least 1:75, at least 1:100, at least 1:200, at least 1:300, at least 1:400, at least 1:500, at least 1:600, at least 1:700, at least 1:800, at least 1:900, at least 1:1000, at least 1:2000, at least 1:3000, at least 1:4000, at least 1:5000, at least 1:6000, at least 1:7000, at least 1:8000, at least 1:9000, at least 1:10000, at least 1:20000, at least 1:30000, at least 1:40000, at least 1:50000, at least 1:60000, at least 1:70000, at least 1:80000, at least 1:90000 or at least 1:100000. In yet other aspects of this embodiment, a papermaking additive composition is diluted to a ratio of, e.g., at most 1:10, at most 1:25, at most 1:50, at most 1:75, at most 1:100, at most 1:200, at most 1:300, at most 1:400, at most 1:500, at most 1:600, at most 1:700, at most 1:800, at most 1:900, at most 1:1000, at most 1:2000, at most 1:3000, at most 1:4000, at most 1:5000, at most 1:6000, at most 1:7000, at most 1:8000, at most 1:9000, at most 1:10000, at most 1:20000, at most 1:30000, at most 1:40000, at most 1:50000, at most 1:60000, at most 1:70000, at most 1:80000, at most 1:90000 or at most 1:100000.

In still other aspects of this embodiment, a papermaking additive composition is diluted to a ratio of, e.g., about 1:1 to about 1:10, about 1:1 to about 1:25, about 1:1 to about 1:50, about 1:1 to about 1:75, about 1:1 to about 1:100, about 1:2 to about 1:10, about 1:2 to about 1:25, about 1:2 to about 1:50, about 1:2 to about 1:75, about 1:2 to about 1:100, about 1:10 to about 1:25, about 1:10 to about 1:50, about 1:10 to about 1:75, about 1:10 to about 1:100, about 1:10 to about 1:125, about 1:10 to about 1:150, about 1:10 to about 1:175, about 1:10 to about 1:200, about 1:10 to about 1:225, about 1:10 to about 1:250, about 1:50 to about 1:100, about 1:50 to about 1:200, about 1:50 to about 1:300, about 1:50 to about 1:400, about 1:50 to about 1:500, about 1:50 to about 1:600, about 1:50 to about 1:700, about 1:50 to about 1:800, about 1:50 to about 1:900, about 1:50 to about 1:1000, about 1:100 to about 1:200, about 1:100 to about 1:300, about 1:100 to about 1:400, about 1:100 to about 1:500, about 1:100 to about 1:600, about 1:100 to about 1:700, about 1:100 to about 1:800, about 1:100 to about 1:900, about 1:100 to about 1:1000, about 1:500 to about 1:1000, about 1:500 to about 1:2000, about 1:500 to about 1:3000, about 1:500 to about 1:4000, about 1:500 to about 1:5000, about 1:500 to about 1:6000, about 1:500 to about 1:7000, about 1:500 to about 1:8000, about 1:500 to about 1:9000, about 1:500 to about 1:10000, about 1:1000 to about 1:2000, about 1:1000 to about 1:3000, about 1:1000 to about 1:4000, about 1:1000 to about 1:5000, about 1:1000 to about 1:6000, about 1:1000 to about 1:7000, about 1:1000 to about 1:8000, about 1:1000 to about 1:9000, about 1:1000 to about 1:10000, about 1:5000 to about 1:10000, about 1:5000 to about 1:20000, about 1:5000 to about 1:30000, about 1:5000 to about 1:40000, about 1:5000 to about 1:50000, about 1:5000 to about 1:60000, about 1:5000 to about 1:70000, about 1:5000 to about 1:80000, about 1:5000 to about 1:90000, about 1:5000 to about 1:100000, about 1:10000 to about 1:20000, about 1:10000 to about 1:30000, about 1:10000 to about 1:40000, about 1:10000 to about 1:50000, about 1:10000 to about 1:60000, about 1:10000 to about 1:70000, about 1:10000 to about 1:80000, about 1:10000 to about 1:90000, about 1:10000 to about 1:100000.

Application of a papermaking additive composition disclosed herein is in an effective amount. An effective amount of a disclosed papermaking additive composition can be an amount sufficient achieve a high fiber purity and quality. In aspects of this embodiment, an effective amount causes an increase in cellulose fiber separation, an increase in the surface area of fibers, removal of an ink, an adhesive and/or other impurity or contaminant, or any combination thereof. Preferentially, such an effective amount will not harm fiber integrity and strength. The actual effective amount of a disclosed papermaking additive composition is determined by routine screening procedures employed to evaluate controlling activity and efficacy of a papermaking additive composition disclosed herein. Such screening procedures are well known by those skilled in the art. It is expected that a papermaking additive composition disclosed herein having a higher level of activity can be used in smaller amounts and concentrations, while those having a lower level of activity may require larger amounts or concentrations in order to achieve the same controlling effect.

An effective amount of a papermaking additive composition disclosed herein can be assessed by the purity and quality of pulp and paper products produced. The Technical Association of Pulp and Paper Industry (TAPPI) and the International Organization for Standardization (ISO) have established standard methods of evaluating processed pulp purity and quality, see, e.g., TAPPI Standard T 203 cm-99 Alpha-, Beta- and Gamma-Cellulose in Pulp; TAPPI Standard T 235 cm-85 Alkali Solubility R10 and R18; TAPPI Standard T 430 cm-09 Copper Number of Pulp, Paper and Paperboard; TAPPI Standard T 236 cm-99 Kappa Number of Pulp; TAPPI Standard T 230 om-99 Viscosity of Pulp; TAPPI Standard T 452 om-08 Brightness of Pulp, Paper, and Paperboard; TAPPI Standard T 235 cm-85 Carboxyl Content; TAPPI Standard T 204 cm-97 Solvent Extractives of Wood and Pulp; and TAPPI Standard T 211 om-93 Ash in Wood Pulp, Paper and Paperboard: Combustion at 525° C.

One aspect of high fiber purity and quality is pulp yield. Generally, the higher the yield of cellulosic material from the raw material the better the fiber purity and quality. Typical woods are comprised of about 40%-50% cellulose and 25%-35% hemicellulose. Extraction of over 70% cellulosic material is generally considered a high pulp yield.

In an embodiment, an effective amount of a disclosed papermaking additive composition is an amount sufficient to cause a high pulp yield. In aspects of this embodiment, an effective amount of a disclosed papermaking additive composition is an amount sufficient to cause a pulp yield of, e.g., about 70%, about 75%, about 80%, about 85%, about 86%, about 87%, about 88%, about 89%, about 90%, about 91%, about 92%, about 93%, about 94%, about 95%, about 96%, about 97%, about 98% or about 99%. In other aspects of this embodiment, an effective amount of a disclosed papermaking additive composition is an amount sufficient to cause a pulp yield of, e.g., at least 70%, at least 75%, at least 80%, at least 85%, at least 86%, at least 87%, at least 88%, at least 89%, at least 90%, at least 91%, at least 92%, at least 93%, at least 94%, at least 95%, at least 96%, at least 97%, at least 98% or at least 99%. In yet other aspects of this embodiment, an effective amount of a disclosed papermaking additive composition is an amount sufficient to cause a pulp yield of, e.g., at most 70%, at most 75%, at most 80%, at most 85%, at most 86%, at most 87%, at most 88%, at most 89%, at most 90%, at most 91%, at most 92%, at most 93%, at most 94%, at most 95%, at most 96%, at most 97%, at most 98% or at most 99%. In yet other aspects of this embodiment, a method or use disclosed herein results in a pulp yield of, e.g., about 70% to about 80%, about 70% to about 85%, about 70% to about 90%, about 70% to about 95%, about 70% to about 99%, about 75% to about 85%, about 75% to about 90%, about 75% to about 95%, about 75% to about 99%, about 80% to about 90%, about 80% to about 95%, about 80% to about 99%, about 85% to about 93%, about 85% to about 95%, about 85% to about 97%, about 85% to about 99%, about 90% to about 93%, about 90% to about 95%, about 90% to about 97%, about 90% to about 99%, about 93% to about 95%, about 93% to about 97%, about 93% to about 99%, about 95% to about 97% or about 95% to about 99%.

In another embodiment, a method or use disclosed herein results in a high pulp yield. In aspects of this embodiment, a method or use disclosed herein results in a pulp yield of, e.g., about 70%, about 75%, about 80%, about 85%, about 86%, about 87%, about 88%, about 89%, about 90%, about 91%, about 92%, about 93%, about 94%, about 95%, about 96%, about 97%, about 98% or about 99%. In other aspects of this embodiment, a method or use disclosed herein results in a pulp yield of, e.g., at least 70%, at least 75%, at least 80%, at least 85%, at least 86%, at least 87%, at least 88%, at least 89%, at least 90%, at least 91%, at least 92%, at least 93%, at least 94%, at least 95%, at least 96%, at least 97%, at least 98% or at least 99%. In yet other aspects of this embodiment, a method or use disclosed herein results in a pulp yield of, e.g., at most 70%, at most 75%, at most 80%, at most 85%, at most 86%, at most 87%, at most 88%, at most 89%, at most 90%, at most 91%, at most 92%, at most 93%, at most 94%, at most 95%, at most 96%, at most 97%, at most 98% or at most 99%. In yet other aspects of this embodiment, a method or use disclosed herein results in a pulp yield of, e.g., about 70% to about 80%, about 70% to about 85%, about 70% to about 90%, about 70% to about 95%, about 70% to about 99%, about 75% to about 85%, about 75% to about 90%, about 75% to about 95%, about 75% to about 99%, about 80% to about 90%, about 80% to about 95%, about 80% to about 99%, about 85% to about 93%, about 85% to about 95%, about 85% to about 97%, about 85% to about 99%, about 90% to about 93%, about 90% to about 95%, about 90% to about 97%, about 90% to about 99%, about 93% to about 95%, about 93% to about 97%, about 93% to about 99%, about 95% to about 97% or about 95% to about 99%.

Another aspect of high fiber purity and quality is the amount of alpha-, beta- and gamma-cellulose content present in the processed pulp or paper product produced. In general, alpha-cellulose is an indicator of intact, higher-molecular-weight cellulose content in pulp, beta-cellulose is an indicator of degraded cellulose, and the gamma-cellulose is an indicator of hemicellulose. There are several assays which measure cellulosic material content in processed pulp.

In a cellulose content assay, alpha-, beta- and gamma-cellulose fractions are separated using a mercerizing caustic solution where alpha-cellulose remains insoluble, beta-cellulose is precipitated out of solution upon acid addition, and gamma-cellulose remains in solution. For example, alpha-cellulose is the pulp fraction resistant to 17.5% and 9.45% sodium hydroxide solution under conditions of the test. Beta-cellulose is the soluble fraction which is reprecipitated on acidification of the solution; gamma-cellulose is that fraction remaining in the solution. The soluble fractions containing beta-cellulose and gamma cellulose are determined volumetrically by oxidation with potassium dichromate and the alpha-cellulose, as the insoluble fraction, is derived by difference using the following formulas: AC %=100−[6.85($V_2$−$V_1$)×N×20]/A×W, where AC % is the percent alpha-cellulose, Vi is the titration, in milliliters, of the pulp filtrate, $V_2$ is the titration, in milliliters, of the blank, N is the exact normality of the ferrous ammonium sulfate solution, A is the volume, in milliliters, of the pulp filtrate used in the oxidation, and W is the oven-dry weight, in grams, of the pulp specimen. GC %=[6.85 (V4−V3)×N×20]/(25×W), where GC % is the percent gamma-cellulose, $V_3$ is the titration, in milliliters, of the solution after precipitation of beta-cellulose, $V_4$ is the titration, in milliliters, of the blank, N is the exact normality of the ferrous ammonium sulfate solution and W is the oven-dry weight, in grams, of the pulp specimen. BC %=100−(AC %+GC %), where BC % is the percent beta-cellulose, where AC % is the percent alpha-cellulose and where GC % is the percent gamma-cellulose. A standardized cellulose content assay is described in, e.g., TAPPI Standard T 203 cm-99 Alpha-, Beta- and Gamma-Cellulose in Pulp, the content of which is hereby incorporated by reference in its entirety.

In an alkali resistance assay, retention of cellulosic material using at least two different percent alkali solutions provide information on high molecular weight carbohydrates (intact cellulose or alpha-cellulose) in processed pulp. The alkali is typically sodium hydroxide and the concentrations most frequently used are 18%, 10%, and 5% (m/m). For example, a 10% sodium hydroxide solution dissolves both degraded cellulose and hemicellulose which provides an indication on the total amount of insoluble cellulosic material (retention in 10% alkali or $R_{10}$ value). As such, the $R_{10}$ value includes the amount of alpha-cellulose (intact cellulose). However, only hemicellulose is soluble in an 18% sodium hydroxide solution which provides an estimate on the amount of both alpha- and beta-cellulose that remains in the insoluble fraction (retention in 18% alkali or $R_{15}$ value). To perform the alkali solubility assay, pulp, a known mass of oven-dried processed pulp is treated with sodium hydroxide solution for 60 minutes at 20° C., washed in acetic acid and the insoluble cellulosic material is dried and weighed. Alkali resistance, $R_c$, is expressed as a percentage by mass using the following formula: $m_1 \times 100/m_0$, where $R_c$ is alkali resistance, $m_0$ is the mass in grams of the test portion calculated on an oven dry basis, and $m_1$ is the oven dry mass in grams of the alkali-insoluble fraction. When the alkali resistance assay is performed using 10% alkali solutions, $R_c$ is referred to as $R_{10}$, when performed using 18% alkali solutions, $R_c$ is referred to as $R_{18}$. A standardized alkali solubility assay is described in, e.g., ISO Standard 699:2015 Pulps—Determination of Alkali Resistance, the content of which is hereby incorporated by reference in its entirety.

In an alkali solubility assay, solubility of cellulosic material at two different percent alkali solutions provide information on low molecular weight carbohydrates (degraded cellulose or beta-cellulose) and hemicellulose in processed pulp. The alkali is typically sodium hydroxide and the concentrations most frequently used are 18% and 10% (m/m). For example, a 10% sodium hydroxide solution dissolves both degraded cellulose and hemicellulose which provides an indication on the total amounts of soluble cellulosic material in basic solutions (solubility in 10% alkali or $S_{10}$ value). As such, the $S_{10}$ value includes the sum of hemicellulose and beta-cellulose (degraded cellulose). However, hemicellulose is soluble in an 18% sodium hydroxide solution which provides an estimate on the amount of residual hemicellulose present in the pulp (solubility in 18% alkali or $S_{18}$ value). As such, beta-cellulose (degraded cellulose) can be determined by subtracting the $S_{10}$ value from the $S_{18}$ value ($S_{18}$ minus $S_{10}$). In addition, alpha-cellulose content can be calculated based on the alkali solubility assay by determining the total amount of cellulosic material and subtracting the $S_{10}$ value. To perform the alkali solubility assay, pulp is treated with sodium hydroxide solution and oxidation of the dissolved organic matter with potassium dichromate. Ammonium iron(II) sulphate is used to titrate excess potassium dichromate and the amount of potassium dichromate consumed is used to calculate the cellulose equivalent. The soluble fraction of cellulose is expressed as a percentage by mass of the oven-dry pulp using the following formula: $S_c = 6.85 (V_2 - V_1) \times c \times 100/m \times V$, where $S_c$ is alkali solubility, V is the volume, in milliliters, of filtrate used in the oxidation, $V_1$ is the volume, in milliliters, of ammonium iron(II) sulphate solution consumed in the titration of the test solution, $V_2$ is the volume, in milliliters, of ammonium iron(II) sulphate solution consumed in the blank test, c is the concentration, in moles per liter, of the ammonium iron(II) sulphate solution, m is the mass, in grams, of the test portion calculated on an oven-dry basis; and 6.85 is the empirical factor, in milligrams, indicating the amount of cellulose equivalent to ⅙ mol of potassium dichromate. When the alkali solubility assay is performed using 10% alkali solutions, $S_c$ is referred to as $S_{10}$, when performed using 18% alkali solutions, $S_c$ is referred to as $S_{18}$. Standardized alkali solubility assays are described in, e.g., TAPPI Standard T 235 cm-09 Alkali Solubility of Pulp at 25° C. and ISO Standard 692 Pulps—Determination of Alkali Solubility, the content of each of which is hereby incorporated by reference in its entirety.

In a pulp viscosity assay, the viscosity of processed pulp is determined. The viscosity of a pulp is an indicator of the average degree of polymerization of the cellulose. Higher pulp viscosity is an indicator of longer cellulose chain length and lesser degradation. As such, the higher the pulp viscosity the more intact, higher-molecular-weight cellulose (alpha-cellulose) is present in the processed pulp and, conversely, the less degraded cellulose (beta-cellulose) that is present in the pulp. A standardized pulp viscosity assay is described in, e.g., TAPPI Standard T 230 om-99 Viscosity of Pulp, the content of which is hereby incorporated by reference in its entirety.

In an embodiment, an effective amount of a disclosed papermaking additive composition is an amount sufficient to result in a high alpha-cellulose content of the processed pulp. In aspects of this embodiment, an effective amount of a disclosed papermaking additive composition is an amount sufficient to result in an alpha-cellulose content of the processed pulp of, e.g., about 70%, about 75%, about 80%, about 85%, about 86%, about 87%, about 88%, about 89%, about 90%, about 91%, about 92%, about 93%, about 94%, about 95%, about 96%, about 97%, about 98% or about 99%. In aspects of this embodiment, an effective amount of a disclosed papermaking additive composition is an amount sufficient to result in an alpha-cellulose content of the processed pulp of, e.g., at least 70%, at least 75%, at least 80%, at least 85%, at least 86%, at least 87%, at least 88%, at least 89%, at least 90%, at least 91%, at least 92%, at least 93%, at least 94%, at least 95%, at least 96%, at least 97%, at least 98% or at least 99%. In yet other aspects of this embodiment, an effective amount of a disclosed papermaking additive composition is an amount sufficient to result in an alpha-cellulose content of the processed pulp of, e.g., at most 70%, at most 75%, at most 80%, at most 85%, at most 86%, at most 87%, at most 88%, at most 89%, at most 90%, at most 91%, at most 92%, at most 93%, at most 94%, at most 95%, at most 96%, at most 97%, at most 98% or at most 99%. In yet other aspects of this embodiment, an effective amount of a disclosed papermaking additive composition is an amount sufficient to result in an alpha-cellulose content of the processed pulp of, e.g., about 70% to about 80%, about 70% to about 85%, about 70% to about 90%, about 70% to about 95%, about 70% to about 99%, about 75% to about 85%, about 75% to about 90%, about 75% to about 95%, about 75% to about 99%, about 80% to about 90%, about 80% to about 95%, about 80% to about 99%, about 85% to about 93%, about 85% to about 95%, about 85% to about 97%, about 85% to about 99%, about 90% to about 93%, about 90% to about 95%, about 90% to about 97%, about 90% to about 99%, about 93% to about 95%, about 93% to about 97%, about 93% to about 99%, about 95% to about 97% or about 95% to about 99%.

In an embodiment, an effective amount of a disclosed papermaking additive composition is an amount sufficient to result in a low beta-cellulose content of the processed pulp. In aspects of this embodiment, an effective amount of a disclosed papermaking additive composition is an amount sufficient to result in a beta-cellulose content of the processed pulp of, e.g., about 5%, about 10%, about 15%, about 20%, about 25%, about 30% or about 35%. In aspects of this embodiment, an effective amount of a disclosed papermaking additive composition is an amount sufficient to result in a beta-cellulose content of the processed pulp of, e.g., at most 5%, at most 10%, at most 15%, at most 20%, at most 25%, at most 30% or at most 35%. In aspects of this embodiment, an effective amount of a disclosed papermaking additive composition is an amount sufficient to result in a beta-cellulose content of the processed pulp of, e.g., about 5% to about 10%, about 5% to about 15%, about 5% to about 20%, about 5% to about 25%, about 5% to about 30%, about 5% to about 35%, about 10% to about 15%, about 10% to about 20%, about 10% to about 25%, about 10% to about 30%, about 10% to about 35%, about 15% to about 20%, about 15% to about 25%, about 15% to about 30%, about 15% to about 35%, about 20% to about 25%, about 20% to about 30%, about 20% to about 35%, about 25% to about 30%, about 25% to about 35% or about 30% to about 35%.

In an embodiment, an effective amount of a disclosed papermaking additive composition is an amount sufficient to result in a low gamma-cellulose content of the processed pulp. In aspects of this embodiment, an effective amount of a disclosed papermaking additive composition is an amount sufficient to result in a gamma-cellulose content of the processed pulp of, e.g., about 5%, about 10%, about 15%, about 20%, about 25%, about 30% or about 35%. In aspects of this embodiment, an effective amount of a disclosed papermaking additive composition is an amount sufficient to result in a gamma-cellulose content of the processed pulp of, e.g., at most 5%, at most 10%, at most 15%, at most 20%, at most 25%, at most 30% or at most 35%. In aspects of this embodiment, an effective amount of a disclosed papermaking additive composition is an amount sufficient to result in a gamma-cellulose content of the processed pulp of, e.g., about 5% to about 10%, about 5% to about 15%, about 5% to about 20%, about 5% to about 25%, about 5% to about 30%, about 5% to about 35%, about 10% to about 15%, about 10% to about 20%, about 10% to about 25%, about 10% to about 30%, about 10% to about 35%, about 15% to about 20%, about 15% to about 25%, about 15% to about 30%, about 15% to about 35%, about 20% to about 25%, about 20% to about 30%, about 20% to about 35%, about 25% to about 30%, about 25% to about 35% or about 30% to about 35%.

In an embodiment, an effective amount of a disclosed papermaking additive composition is an amount sufficient to result in a high viscosity of a processed pulp. In aspects of this embodiment, an effective amount of a disclosed papermaking additive composition is an amount sufficient to result in a viscosity of a processed pulp of, e.g., about 5 mPa·s, about 10 mPa·s, about 15 mPa·s, about 20 mPa·s, about 25 mPa·s, about 30 mPa·s, about 35 mPa·s, about 40 mPa·s, about 45 mPa·s or about 50 mPa·s. In aspects of this embodiment, an effective amount of a disclosed papermaking additive composition is an amount sufficient to result in a viscosity of a processed pulp of, e.g., at least 5 mPa·s, at least 10 mPa·s, at least 15 mPa·s, at least 20 mPa·s, at least 25 mPa·s, at least 30 mPa·s, at least 35 mPa·s, at least 40 mPa·s, at least 45 mPa·s or at least 50 mPa·s. In yet aspects of this embodiment, an effective amount of a disclosed papermaking additive composition is an amount sufficient to result in a viscosity of a processed pulp of, e.g., at most 5 mPa·s, at most 10 mPa·s, at most 15 mPa·s, at most 20 mPa·s, at most 25 mPa·s, at most 30 mPa·s, at most 35 mPa·s, at most 40 mPa·s, at most 45 mPa·s or at most 50 mPa·s. In yet aspects of this embodiment, an effective amount of a disclosed papermaking additive composition is an amount sufficient to result in a viscosity of a processed pulp of, e.g., about 5 mPa·s to about 10 mPa·s, about 5 mPa·s to about 15 mPa·s, about 5 mPa·s to about 20 mPa·s, about 5 mPa·s to about 25 mPa·s, about 5 mPa·s to about 30 mPa·s, about 5 mPa·s to about 35 mPa·s, about 5 mPa·s to about 40 mPa·s, about 5 mPa·s to about 45 mPa·s, about 5 mPa·s to about 50 mPa·s, about 10 mPa·s to about 15 mPa·s, about 10 mPa·s to about 20 mPa·s, about 10 mPa·s to about 25 mPa·s, about 10 mPa·s to about 30 mPa·s, about 10 mPa·s to about 35 mPa·s, about 10 mPa·s to about 40 mPa·s, about 10 mPa·s to about 45 mPa·s, about 10 mPa·s to about 50 mPa·s, about 15 mPa·s to about 20 mPa·s, about 15 mPa·s to about 25 mPa·s, about 15 mPa·s to about 30 mPa·s, about 15 mPa·s to about 35 mPa·s, about 15 mPa·s to about 40 mPa·s, about 15 mPa·s to about 45 mPa·s, about 15 mPa·s to about 50 mPa·s, about 20 mPa·s to about 25 mPa·s, about 20 mPa·s to about 30 mPa·s, about 20 mPa·s to about 35 mPa·s, about 20 mPa·s to about 40 mPa·s, about 20 mPa·s to about 45 mPa·s, about 20 mPa·s to about 50 mPa·s, about 25 mPa·s to about 30 mPa·s, about 25 mPa·s to about 35 mPa·s, about 25 mPa·s to about 40 mPa·s, about 25 mPa·s to about 45 mPa·s, about 25 mPa·s to about 50 mPa·s, about 30 mPa·s to about 35 mPa·s, about 30 mPa·s to about 40 mPa·s, about 30 mPa·s to about 45 mPa·s, about 30 mPa·s to about 50 mPa·s, about 35 mPa·s to about 40 mPa·s, about 35 mPa·s to about 45 mPa·s, about 35 mPa·s to about 50 mPa·s, about 40 mPa·s to about 45 mPa·s, about 40 mPa·s to about 50 mPa·s or about 45 mPa·s to about 50 mPa·s.

In an embodiment, a method or use disclosed herein results in a processed pulp having a high alpha-cellulose content. In aspects of this embodiment, a method or use disclosed herein results in a processed pulp having an alpha-cellulose content of, e.g., about 70%, about 75%, about 80%, about 85%, about 86%, about 87%, about 88%, about 89%, about 90%, about 91%, about 92%, about 93%, about 94%, about 95%, about 96%, about 97%, about 98% or about 99%. In aspects of this embodiment, a method or use disclosed herein results in a processed pulp having an alpha-cellulose content of, e.g., at least 70%, at least 75%, at least 80%, at least 85%, at least 86%, at least 87%, at least 88%, at least 89%, at least 90%, at least 91%, at least 92%, at least 93%, at least 94%, at least 95%, at least 96%, at least 97%, at least 98% or at least 99%. In yet other aspects of this embodiment, a method or use disclosed herein results in a processed pulp having an alpha-cellulose content of, e.g., at most 70%, at most 75%, at most 80%, at most 85%, at most 86%, at most 87%, at most 88%, at most 89%, at most 90%, at most 91%, at most 92%, at most 93%, at most 94%, at most 95%, at most 96%, at most 97%, at most 98% or at most 99%. In yet other aspects of this embodiment, a method or use disclosed herein results in a processed pulp having an alpha-cellulose content of, e.g., about 70% to about 80%, about 70% to about 85%, about 70% to about 90%, about 70% to about 95%, about 70% to about 99%, about 75% to about 85%, about 75% to about 90%, about 75% to about 95%, about 75% to about 99%, about 80% to about 90%, about 80% to about 95%, about 80% to about 99%, about 85% to about 93%, about 85% to about 95%, about 85% to about 97%, about 85% to about 99%, about 90% to about 93%, about 90% to about 95%, about 90% to about 97%, about 90% to about 99%, about 93% to about 95%, about 93% to about 97%, about 93% to about 99%, about 95% to about 97% or about 95% to about 99%.

In an embodiment, a method or use disclosed herein results in a processed pulp having a low beta-cellulose content. In aspects of this embodiment, a method or use disclosed herein results in a processed pulp having a beta-cellulose content of, e.g., about 5%, about 10%, about 15%, about 20%, about 25%, about 30% or about 35%. In aspects of this embodiment, a method or use disclosed herein results in a processed pulp having a beta-cellulose content of, e.g., at most 5%, at most 10%, at most 15%, at most 20%, at most 25%, at most 30% or at most 35%. In aspects of this embodiment, a method or use disclosed herein results in a processed pulp having a beta-cellulose content of, e.g., about 5% to about 10%, about 5% to about 15%, about 5% to about 20%, about 5% to about 25%, about 5% to about 30%, about 5% to about 35%, about 10% to about 15%, about 10% to about 20%, about 10% to about 25%, about 10% to about 30%, about 10% to about 35%, about 15% to about 20%, about 15% to about 25%, about 15% to about 30%, about 15% to about 35%, about 20% to about 25%, about 20% to about 30%, about 20% to about 35%, about 25% to about 30%, about 25% to about 35% or about 30% to about 35%.

In an embodiment, a method or use disclosed herein results in a processed pulp having a low gamma-cellulose content. In aspects of this embodiment, a method or use disclosed herein results in a processed pulp having a gamma-cellulose content of, e.g., about 5%, about 10%, about 15%, about 20%, about 25%, about 30% or about 35%. In aspects of this embodiment, a method or use disclosed herein results in a processed pulp having a gamma-cellulose content of, e.g., at most 5%, at most 10%, at most 15%, at most 20%, at most 25%, at most 30% or at most 35%. In aspects of this embodiment, a method or use disclosed herein results in a processed pulp having a gamma-cellulose content of, e.g., about 5% to about 10%, about 5% to about 15%, about 5% to about 20%, about 5% to about 25%, about 5% to about 30%, about 5% to about 35%, about 10% to about 15%, about 10% to about 20%, about 10% to about 25%, about 10% to about 30%, about 10% to about 35%, about 15% to about 20%, about 15% to about 25%, about 15% to about 30%, about 15% to about 35%, about 20% to about 25%, about 20% to about 30%, about 20% to about 35%, about 25% to about 30%, about 25% to about 35% or about 30% to about 35%.

In an embodiment, a method or use disclosed herein results in a processed pulp having a high viscosity. In aspects of this embodiment, a method or use disclosed herein results in a processed pulp having a viscosity of, e.g., about 5 mPa·s, about 10 mPa·s, about 15 mPa·s, about 20 mPa·s, about 25 mPa·s, about 30 mPa·s, about 35 mPa·s, about 40 mPa·s, about 45 mPa·s or about 50 mPa·s. In aspects of this embodiment, a method or use disclosed herein results in a processed pulp having a viscosity of, e.g., at least 5 mPa·s, at least 10 mPa·s, at least 15 mPa·s, at least 20 mPa·s, at least 25 mPa·s, at least 30 mPa·s, at least 35 mPa·s, at least 40 mPa·s, at least 45 mPa·s or at least 50 mPa·s. In yet aspects of this embodiment, a method or use disclosed herein results in a processed pulp having a viscosity of, e.g., at most 5 mPa·s, at most 10 mPa·s, at most 15 mPa·s, at most 20 mPa·s, at most 25 mPa·s, at most 30 mPa·s, at most 35 mPa·s, at most 40 mPa·s, at most 45 mPa·s or at most 50 mPa·s. In yet aspects of this embodiment, a method or use disclosed herein results in a processed pulp having a viscosity of, e.g., about 5 mPa·s to about 10 mPa·s, about 5 mPa·s to about 15 mPa·s, about 5 mPa·s to about 20 mPa·s, about 5 mPa·s to about 25 mPa·s, about 5 mPa·s to about 30 mPa·s, about 5 mPa·s to about 35 mPa·s, about 5 mPa·s to about 40 mPa·s, about 5 mPa·s to about 45 mPa·s, about 5 mPa·s to about 50 mPa·s, about 10 mPa·s to about 15 mPa·s, about 10 mPa·s to about 20 mPa·s, about 10 mPa·s to about 25 mPa·s, about 10 mPa·s to about 30 mPa·s, about 10 mPa·s to about 35 mPa·s, about 10 mPa·s to about 40 mPa·s, about 10 mPa·s to about 45 mPa·s, about 10 mPa·s to about 50 mPa·s, about 15 mPa·s to about 20 mPa·s, about 15 mPa·s to about 25 mPa·s, about 15 mPa·s to about 30 mPa·s, about 15 mPa·s to about 35 mPa·s, about 15 mPa·s to about 40 mPa·s, about 15 mPa·s to about 45 mPa·s, about 15 mPa·s to about 50 mPa·s, about 20 mPa·s to about 25 mPa·s, about 20 mPa·s to about 30 mPa·s, about 20 mPa·s to about 35 mPa·s, about 20 mPa·s to about 40 mPa·s, about 20 mPa·s to about 45 mPa·s, about 20 mPa·s to about 50 mPa·s, about 25 mPa·s to about 30 mPa·s, about 25 mPa·s to about 35 mPa·s, about 25 mPa·s to about 40 mPa·s, about 25 mPa·s to about 45 mPa·s, about 25 mPa·s to about 50 mPa·s, about 30 mPa·s to about 35 mPa·s, about 30 mPa·s to about 40 mPa·s, about 30 mPa·s to about 45 mPa·s, about 30 mPa·s to about 50 mPa·s, about 35 mPa·s to about 40 mPa·s, about 35 mPa·s to about 45 mPa·s, about 35 mPa·s to about 50 mPa·s, about 40 mPa·s to about 45 mPa·s, about 40 mPa·s to about 50 mPa·s or about 45 mPa·s to about 50 mPa·s.

Another aspect of high fiber purity and quality is the amount of lignin, extractives and other impurities present in the processed pulp or paper product produced. In general, the lower the amount of lignin, extractives and other impurities in pulp, the higher the purity and integrity of cellulosic material in processed pulp. Typical woods are comprised of about 15%-30% lignin and 2%-10% extractives. There are several assays which measure lignin content in processed pulp.

In the Kappa number assay, the kappa number is an indicator of the hardness, bleachability and delignification of the processed pulp. The kappa number is defined as the volume in milliliters of 0.1 N potassium permanganate ($KMnO_4$) consumed by one gram of moisture-free pulp in an acidic medium under defined time and temperature conditions. The Kappa number has a range of 1 to 100 and is an assessment of how much lignin is present in pulp, which determines the amount of bleach that needs to be added to it if the goal is a white processed paper product. High Kappa numbers require more bleach, while lower numbers have less lignin and need less bleach. To perform the Kappa number assay, a known quantity of processed pulp is allowed to react with equal amounts of 4 N sulfuric acid and 0.1 N potassium permanganate solution for a given time. The amount of pulp is chosen so that about 50% of the total oxidation capacity of the permanganate is left unconsumed at the end of the reaction time. Potassium iodine solution is added to the test solution and sodium thiosulphate is then used to titrate excess iodine and the amount of potassium permanganate consumed is used to calculate the lignin equivalent. Kappa number, K, is determined using the following formula: $K = p \times f/w$ and $p = (b-a)N/0.1$, where K is the Kappa number, f is a factor for correction to a 50% permanganate consumption, dependent on the value of p, w is the weight, in grams, of moisture-free pulp in the specimen, p is the amount, in milliliters, of 0.1 N permanganate actually consumed by the test specimen, b is the amount, in milliliters, of the thiosulfate consumed in the blank determination, a is the amount, in milliliters, of the thiosulfate consumed by the test specimen, and N is the normality of the thiosulfate. The Kappa number for bleachable pulps are in the range of 25-30, sack paper pulps in the range 45-55 and pulps for corrugated fiberboard are in the range 60-90. The Kappa number can also monitor the effectiveness of the lignin-extraction from processed pulp because the number is approximately proportional to the residual lignin content of the pulp. The following formula can be used: $K=cl$, where K is the Kappa number, c is a constant having the value of about 6.57, depending on process and raw material used, and l is the lignin content in percent. Standardized kappa number assays are described in, e.g., TAPPI Standard T 236 cm-99 Kappa Number of Pulp, ISO Standard 302:2015 Determination of Kappa Number and Chai and Zhu, Rapid Pulp Kappa Number Determination Using Spectrophotometry, J. Pulp Paper Sci. 25(11): 387-394 (1999), the content of each of which is hereby incorporated by reference in its entirety.

In the copper number assay, the copper number is an indicator of the reducing groups of cellulosic material and impurities possessing reducing properties that are present in the processed pulp. Hydrolyzed or oxidized cellulose is capable of reducing certain metallic ions to lower valence states, and reactions of this type have served to detect damage to cellulose and to estimate the quantity of reducing groups. Thus, the copper number can be regarded as an index of those impurities in cellulose such as oxycellulose, hydrocellulose, lignin, and sugars which possess reducing properties. As such, this assay is valuable for detecting changes accompanying deterioration and may, therefore, be considered as a test for indicating the permanence of paper. Copper number is defined as the number of grams of metallic copper (as $Cu_2O$) resulting from the reduction of $CuSO_4$ by 100.00 g of pulp fibers. To perform the copper number assay, pulp, a known mass of oven-dried processed pulp is treated with a $CuSO_4$ solution and a carbonate-bicarbonate solution heated at 100° C. for three hours with occasional shaking and then washed in in 5% $Na_2CO_3$ and then hot water. The treated cellulosic material is then incubated with phosphomolybdic acid, macerated, washed with water until the blue color of the fibers is removed, and the filtrate diluted to an appropriate volume and then titrated with 0.05 N $KMnO_4$ to a faint pink end point. The copper number, C, is calculated using the following formula: $C=6.357 \times (V-B) \times N/W$, where C is the copper number, V is the volume, in milliliters, of $KMnO_4$ solution to titrate the filtrate from the specimen, B is the volume, in milliliters, of $KMnO_4$ solution to titrate the blank filtrate, N is the normality of 0.05 N $KMnO_4$, W is the weight, in grams, of the oven-dried pulp. A standardized alkali solubility assay is described in, e.g., TAPPI Standard T 430 cm-09 Copper Number of Pulp, Paper and Paperboard, the content of which is hereby incorporated by reference in its entirety.

In an embodiment, an effective amount of a disclosed papermaking additive composition is an amount sufficient to result in a processed pulp having a low lignin content. In aspects of this embodiment, an effective amount of a disclosed papermaking additive composition is an amount sufficient to result in a processed pulp having a low lignin content with a Kappa number of, e.g., about 5, about 10, about 15, about 20, about 25, about 30, about 35, about 40, about or about 50. In aspects of this embodiment, an effective amount of a disclosed papermaking additive composition is an amount sufficient to result in a processed pulp having a low lignin content with a Kappa number of, e.g., at least 5, at least 10, at least 15, at least 20, at least 25, at least 30, at least 35, at least 40, at least 45 or at least 50. In yet aspects of this embodiment, an effective amount of a disclosed papermaking additive composition is an amount sufficient to result in a processed pulp having a low lignin content with a Kappa number of, e.g., at most 5, at most 10, at most 15, at most 20, at most 25, at most 30, at most 35, at most 40, at most 45 or at most 50. In yet aspects of this embodiment, an effective amount of a disclosed papermaking additive composition is an amount sufficient to result in a processed pulp having a low lignin content with a Kappa number of, e.g., about 5 to about 10, about 5 to about 15, about 5 to about 20, about 5 to about 25, about 5 to about 30, about 5 to about 35, about 5 to about 40, about 5 to about 45, about 5 to about 50, about 10 to about 15, about 10 to about 20, about 10 to about 25, about 10 to about 30, about 10 to about 35, about 10 to about 40, about 10 to about 45, about 10 to about 50, about 15 to about 20, about 15 to about 25, about 15 to about 30, about 15 to about 35, about 15 to about 40, about 15 to about 45, about 15 to about 50, about 20 to about 25, about 20 to about 30, about 20 to about 35, about 20 to about 40, about 20 to about 45, about 20 to about 50, about 25 to about 30, about 25 to about 35, about 25 to about 40, about 25 to about 45, about 25 to about 50, about 30 to about 35, about 30 to about 40, about 30 to about 45, about 30 to about 50, about 35 to about 40, about 35 to about 45, about 35 to about 50, about 40 to about 45, about 40 to about 50 or about 45 to about 50.

In an embodiment, a method or use disclosed herein results in a processed pulp having a low lignin content. In aspects of this embodiment, a method or use disclosed herein results in a processed pulp having a low lignin content with a Kappa number of, e.g., about 5, about 10, about 15, about 20, about 25, about 30, about 35, about 40, about or about 50. In aspects of this embodiment, a method or use disclosed herein results in a processed pulp having a low lignin content with a Kappa number of, e.g., at least 5, at least 10, at least 15, at least 20, at least 25, at least 30, at least 35, at least 40, at least 45 or at least 50. In yet aspects of this embodiment, a method or use disclosed herein results in a processed pulp having a low lignin content with a Kappa number of, e.g., at most 5, at most 10, at most 15, at most 20, at most 25, at most 30, at most 35, at most 40, at most 45 or at most 50. In yet aspects of this embodiment, a method or use disclosed herein results in a processed pulp having a low lignin content with a Kappa number of, e.g., about 5 to about 10, about 5 to about 15, about 5 to about 20, about 5 to about 25, about 5 to about 30, about 5 to about 35, about 5 to about 40, about 5 to about 45, about 5 to about 50, about 10 to about 15, about 10 to about 20, about 10 to about 25, about 10 to about 30, about 10 to about 35, about 10 to about 40, about 10 to about 45, about 10 to about 50, about 15 to about 20, about 15 to about 25, about 15 to about 30, about 15 to about 35, about 15 to about 40, about 15 to about 45, about 15 to about 50, about 20 to about 25, about 20 to about 30, about 20 to about 35, about 20 to about 40, about 20 to about 45, about 20 to about 50, about 25 to about 30, about 25 to about 35, about 25 to about 40, about 25 to about 45, about 25 to about 50, about 30 to about 35, about 30 to about 40, about 30 to about 45, about 30 to about 50, about 35 to about 40, about 35 to about 45, about 35 to about 50, about 40 to about 45, about 40 to about 50 or about 45 to about 50.

In an embodiment, an effective amount of a disclosed papermaking additive composition is an amount sufficient to result in a processed pulp having a low impurities. In aspects of this embodiment, an effective amount of a disclosed papermaking additive composition is an amount sufficient to result in a processed pulp having a low impurities content with a copper number of, e.g., about 0.5, about 0.75, about 1.0, about 1.25, about 1.5, about 1.75, about 2.0, about 2.25, about 2.5, about 2.75, about 3.0, about 3.25, about 3.5, about 3.75, about 4.0, about 4.25, about 4.5, about 4.75, about 5.0, about 5.25, about 5.5, about 5.75, about 6.0, about 6.25, about 6.5, about 6.75 or about 7.0. In other aspects of this embodiment, an effective amount of a disclosed papermaking additive composition is an amount sufficient to result in a processed pulp having a low impurities content with a copper number of, e.g., at least 0.5, at least 0.75, at least 1.0, at least 1.25, at least 1.5, at least 1.75, at least 2.0, at least 2.25, at least 2.5, at least 2.75, at least 3.0, at least 3.25, at least 3.5, at least 3.75, at least 4.0, at least 4.25, at least 4.5, at least 4.75, at least 5.0, at least 5.25, at least 5.5, at least 5.75, at least 6.0, at least 6.25, at least 6.5, at least 6.75 or at least 7.0. In yet other aspects of this embodiment, an effective amount of a disclosed papermaking additive composition is an amount sufficient to result in a processed pulp having a low impurities content with a copper number of, e.g., at most 0.5, at most 0.75, at most 1.0, at most 1.25, at most 1.5, at most 1.75, at most 2.0, at most 2.25, at most 2.5, at most 2.75, at most 3.0, at most 3.25, at most 3.5, at most 3.75, at most 4.0, at most 4.25, at most 4.5, at most 4.75, at most 5.0, at most 5.25, at most 5.5, at most 5.75, at most 6.0, at most 6.25, at most 6.5, at most 6.75 or at most 7.0. In still other aspects of this embodiment, an effective amount of a disclosed papermaking additive composition is an amount sufficient to result in a processed pulp having a low impurities content with a copper number of, e.g., about 0.5 to about 1.0, about 0.5 to about 2.0, about 0.5 to about 3.0, about 0.5 to about 4.0, about 0.5 to about 5.0, about 0.5 to about 6.0, about 0.5 to about 7.0, about 0.75 to about 1.0, about 0.75 to about 2.0, about 0.75 to about 3.0, about 0.75 to about 4.0, about 0.75 to about 5.0, about 0.75 to about 6.0, about 0.75 to about 7.0, about 1.0 to about 2.0, about 1.0 to about 3.0, about 1.0 to about 4.0, about 1.0 to about 5.0, about 1.0 to about 6.0, about 1.0 to about 7.0, about 1.25 to about 2.0, about 1.25 to about 3.0, about 1.25 to about 4.0, about 1.25 to about 5.0, about 1.25 to about 6.0, about 1.25 to about 7.0, about 1.5 to about 2.0, about 1.5 to about 3.0, about 1.5 to about 4.0, about 1.5 to about 5.0, about 1.5 to about 6.0, about 1.5 to about 7.0, about 1.75 to about 2.0, about 1.75 to about 3.0, about 1.75 to about 4.0, about 1.75 to about 5.0, about 1.75 to about 6.0, about 1.75 to about 7.0, about 2 to about 3.0, about 2 to about 4.0, about 2 to about 5.0, about 2 to about 6.0 or about 2 to about 7.0.

In an embodiment, a method or use disclosed herein results in a processed pulp having a low impurities. In aspects of this embodiment, a method or use disclosed herein results in a processed pulp having a low impurities content with a copper number of, e.g., about 0.5, about 0.75, about 1.0, about 1.25, about 1.5, about 1.75, about 2.0, about 2.25, about 2.5, about 2.75, about 3.0, about 3.25, about 3.5, about 3.75, about 4.0, about 4.25, about 4.5, about 4.75, about 5.0, about 5.25, about 5.5, about 5.75, about 6.0, about 6.25, about 6.5, about 6.75 or about 7.0. In other aspects of this embodiment, a method or use disclosed herein results in a processed pulp having a low impurities content with a copper number of, e.g., at least 0.5, at least 0.75, at least 1.0, at least 1.25, at least 1.5, at least 1.75, at least 2.0, at least 2.25, at least 2.5, at least 2.75, at least 3.0, at least 3.25, at least 3.5, at least 3.75, at least 4.0, at least 4.25, at least 4.5, at least 4.75, at least 5.0, at least 5.25, at least 5.5, at least 5.75, at least 6.0, at least 6.25, at least 6.5, at least 6.75 or at least 7.0. In yet other aspects of this embodiment, a method or use disclosed herein results in a processed pulp having a low impurities content with a copper number of, e.g., at most 0.5, at most 0.75, at most 1.0, at most 1.25, at most 1.5, at most 1.75, at most 2.0, at most 2.25, at most 2.5, at most 2.75, at most 3.0, at most 3.25, at most 3.5, at most 3.75, at most 4.0, at most 4.25, at most 4.5, at most 4.75, at most 5.0, at most 5.25, at most 5.5, at most 5.75, at most 6.0, at most 6.25, at most 6.5, at most 6.75 or at most 7.0. In still other aspects of this embodiment, a method or use disclosed herein results in a processed pulp having a low impurities content with a copper number of, e.g., about 0.5 to about 1.0, about 0.5 to about 2.0, about 0.5 to about 3.0, about 0.5 to about 4.0, about 0.5 to about 5.0, about 0.5 to about 6.0, about 0.5 to about 7.0, about 0.75 to about 1.0, about 0.75 to about 2.0, about 0.75 to about 3.0, about 0.75 to about 4.0, about 0.75 to about 5.0, about 0.75 to about 6.0, about 0.75 to about 7.0, about 1.0 to about 2.0, about 1.0 to about 3.0, about 1.0 to about 4.0, about 1.0 to about 5.0, about 1.0 to about 6.0, about 1.0 to about 7.0, about 1.25 to about 2.0, about 1.25 to about 3.0, about 1.25 to about 4.0, about 1.25 to about 5.0, about 1.25 to about 6.0, about 1.25 to about 7.0, about 1.5 to about 2.0, about 1.5 to about 3.0, about 1.5 to about 4.0, about 1.5 to about 5.0, about 1.5 to about 6.0, about 1.5 to about 7.0, about 1.75 to about 2.0, about 1.75 to about 3.0, about 1.75 to about 4.0, about 1.75 to about 5.0, about 1.75 to about 6.0, about 1.75 to about 7.0, about 2 to about 3.0, about 2 to about 4.0, about 2 to about 5.0, about 2 to about 6.0 or about 2 to about 7.0.

Another aspect of high fiber purity and quality is the content of carboxyl groups present in the processed pulp. In general, the higher the number carboxyl groups, the higher the purity and integrity of cellulosic material in processed pulp. There are several assays which measure number of carboxyl groups in cellulosic material from processed pulp.

In the carboxyl content assay, the carboxyl content of processed pulp is determined, which is an indicator of paper strength, delignification and the number of times the cellulose fiber could be recycled. Carboxyl groups are beneficial in the bonding of pulp fibers in paper, which contributes to paper strength. The higher the carboxyl group content, the greater the paper strength will be. To perform the carboxyl content assay, dried processed pulp is mixed with 0.1 M HCl for 60 minutes and then filtered and washed with water. The treated cellulosic material is then added to a 250 mL of 1 mM NaCl solution which is acidified with 1.5 mL 0.1 M HCl, and then titrated conductometrically with 0.05 N NaOH at 0.2 mL increments. The titration data was plotted as conductivity versus volume to determine the milli-equivalent of acid groups per kilogram of pulp. The carboxyl group content, $C_0$, is calculated using the following formula: $C_0 = N \times V \times 100/M$, where $C_0$ is carboxyl group content (meq/100 g pulp), N is the titrant concentration, V is the volume, in milliliters at the equivalence point, and M is the mass, in grams, of the oven-dried pulp. Standardized alkali solubility assays are described in, e.g., TAPPI Standard T 237 cm-08 Carboxyl Content of Pulp and Chen, et al., Fiber Properties of Eucalyptus Kraft Pulp with Different Carboxyl Group Contents, Cellulose 20: 2839-2846 (2013), AST™ D 1926-00 Standard Test Methods for Carboxyl Content if Cellulose, and Barbosa, et al., A Rapid Method for Quantification of Carboxyl Croups in Cellulose Pulp, BioResources 8(1): 1043-1054 (2013), the content of each of which is hereby incorporated by reference in its entirety.

In an embodiment, an effective amount of a disclosed papermaking additive composition is an amount sufficient to result in a processed pulp having a high carboxyl content. In aspects of this embodiment, an effective amount of a disclosed papermaking additive composition is an amount sufficient to result in a processed pulp having a carboxyl content of, e.g., about 4 meq/100 g pulp, about 4.5 meq/100 g pulp, about 5 meq/100 g pulp, about 5.5 meq/100 g pulp, about 6 meq/100 g pulp, about 6.5 meq/100 g pulp, about 7 meq/100 g pulp, about 7.5 meq/100 g pulp, about 8 meq/100 g pulp, about 8.5 meq/100 g pulp, about 9 meq/100 g pulp, about 9.5 meq/100 g pulp or about 10 meq/100 g pulp. In other aspects of this embodiment, an effective amount of a disclosed papermaking additive composition is an amount sufficient to result in a processed pulp having a carboxyl content of, e.g., at least 4 meq/100 g pulp, at least 4.5 meq/100 g pulp, at least 5 meq/100 g pulp, at least 5.5 meq/100 g pulp, at least 6 meq/100 g pulp, at least 6.5 meq/100 g pulp, at least 7 meq/100 g pulp, at least 7.5 meq/100 g pulp, at least 8 meq/100 g pulp, at least 8.5 meq/100 g pulp, at least 9 meq/100 g pulp, at least 9.5 meq/100 g pulp or at least 10 meq/100 g pulp. In yet other aspects of this embodiment, an effective amount of a disclosed papermaking additive composition is an amount sufficient to result in a processed pulp having a carboxyl content of, e.g., at most 4 meq/100 g pulp, at most 4.5 meq/100 g pulp, at most 5 meq/100 g pulp, at most 5.5 meq/100 g pulp, at most 6 meq/100 g pulp, at most 6.5 meq/100 g pulp, at most 7 meq/100 g pulp, at most 7.5 meq/100 g pulp, at most 8 meq/100 g pulp, at most 8.5 meq/100 g pulp, at most 9 meq/100 g pulp, at most 9.5 meq/100 g pulp or at most 10 meq/100 g pulp. In still other aspects of this embodiment, a method or use disclosed herein results in a processed pulp having a carboxyl content of, e.g., about 4 meq/100 g pulp to about 5 meq/100 g pulp, about 4 meq/100 g pulp to about 6 meq/100 g pulp, about 4 meq/100 g pulp to about 7 meq/100 g pulp, about 4 meq/100 g pulp to about 8 meq/100 g pulp, about 4 meq/100 g pulp to about 9 meq/100 g pulp, about 4 meq/100 g pulp to about 10 meq/100 g pulp, about 5 meq/100 g pulp to about 6 meq/100 g pulp, about 5 meq/100 g pulp to about 7 meq/100 g pulp, about 5 meq/100 g pulp to about 8 meq/100 g pulp, about 5 meq/100 g pulp to about 9 meq/100 g pulp, about 5 meq/100 g pulp to about 10 meq/100 g pulp, about 6 meq/100 g pulp to about 7 meq/100 g pulp, about 6 meq/100 g pulp to about 8 meq/100 g pulp, about 6 meq/100 g pulp to about 9 meq/100 g pulp, about 6 meq/100 g pulp to about 10 meq/100 g pulp, about 7 meq/100 g pulp to about 8 meq/100 g pulp, about 7 meq/100 g pulp to about 9 meq/100 g pulp, about 7 meq/100 g pulp to about 10 meq/100 g pulp, about 8 meq/100 g pulp to about 9 meq/100 g pulp, about 8 meq/100 g pulp to about 10 meq/100 g pulp or about 9 meq/100 g pulp to about 10 meq/100 g pulp.

In an embodiment, a method or use disclosed herein results in a processed pulp having a high carboxyl content. In aspects of this embodiment, a method or use disclosed herein results in a processed pulp having a carboxyl content of, e.g., about 4 meq/100 g pulp, about 4.5 meq/100 g pulp, about 5 meq/100 g pulp, about 5.5 meq/100 g pulp, about 6 meq/100 g pulp, about 6.5 meq/100 g pulp, about 7 meq/100 g pulp, about 7.5 meq/100 g pulp, about 8 meq/100 g pulp, about 8.5 meq/100 g pulp, about 9 meq/100 g pulp, about 9.5 meq/100 g pulp or about 10 meq/100 g pulp. In other aspects of this embodiment, a method or use disclosed herein results in a processed pulp having a carboxyl content of, e.g., at least 4 meq/100 g pulp, at least 4.5 meq/100 g pulp, at least 5 meq/100 g pulp, at least 5.5 meq/100 g pulp, at least 6 meq/100 g pulp, at least 6.5 meq/100 g pulp, at least 7 meq/100 g pulp, at least 7.5 meq/100 g pulp, at least 8 meq/100 g pulp, at least 8.5 meq/100 g pulp, at least 9 meq/100 g pulp, at least 9.5 meq/100 g pulp or at least 10 meq/100 g pulp. In yet other aspects of this embodiment, a method or use disclosed herein results in a processed pulp having a carboxyl content of, e.g., at most 4 meq/100 g pulp, at most 4.5 meq/100 g pulp, at most 5 meq/100 g pulp, at most 5.5 meq/100 g pulp, at most 6 meq/100 g pulp, at most 6.5 meq/100 g pulp, at most 7 meq/100 g pulp, at most 7.5 meq/100 g pulp, at most 8 meq/100 g pulp, at most 8.5 meq/100 g pulp, at most 9 meq/100 g pulp, at most 9.5 meq/100 g pulp or at most 10 meq/100 g pulp. In still other aspects of this embodiment, a method or use disclosed herein results in a processed pulp having a carboxyl content of, e.g., about 4 meq/100 g pulp to about 5 meq/100 g pulp, about 4 meq/100 g pulp to about 6 meq/100 g pulp, about 4 meq/100 g pulp to about 7 meq/100 g pulp, about 4 meq/100 g pulp to about 8 meq/100 g pulp, about 4 meq/100 g pulp to about 9 meq/100 g pulp, about 4 meq/100 g pulp to about 10 meq/100 g pulp, about 5 meq/100 g pulp to about 6 meq/100 g pulp, about 5 meq/100 g pulp to about 7 meq/100 g pulp, about 5 meq/100 g pulp to about 8 meq/100 g pulp, about 5 meq/100 g pulp to about 9 meq/100 g pulp, about 5 meq/100 g pulp to about 10 meq/100 g pulp, about 6 meq/100 g pulp to about 7 meq/100 g pulp, about 6 meq/100 g pulp to about 8 meq/100 g pulp, about 6 meq/100 g pulp to about 9 meq/100 g pulp, about 6 meq/100 g pulp to about 10 meq/100 g pulp, about 7 meq/100 g pulp to about 8 meq/100 g pulp, about 7 meq/100 g pulp to about 9 meq/100 g pulp, about 7 meq/100 g pulp to about 10 meq/100 g pulp, about 8 meq/100 g pulp to about 9 meq/100 g pulp, about 8 meq/100 g pulp to about 10 meq/100 g pulp or about 9 meq/100 g pulp to about 10 meq/100 g pulp.

Another aspect of high fiber purity and quality is the brightness of the processed pulp or paper product produced. In general, the higher the brightness, the higher the purity and integrity of cellulosic material in processed pulp or paper product produced. There are several assays which measure number of carboxyl groups in cellulosic material from processed pulp.

Brightness is a numerical value of the reflectance factor of a sample with respect to blue light of specific spectral and geometric characteristics. Blue-light reflectance measurements were originally designed to provide an indication of the amount of bleaching that has taken place in the manufacture of pulp. This procedure is applicable to all naturally-colored pulps, and papers and board made therefrom.

Brightness is based on a scale of zero to 100, with a higher blue-light reflectance number indicating the whiter the paper products will appear. To perform a brightness assay, a paper sample is exposed to a laser with a wavelength of 457 nm and a width of 44 nm and the amount of blue light having a wavelength of 457 nm reflected from the surface of a paper is measured. Standardized brightness assays are described in, e.g., TAPPI Standard T 452 om-08 Brightness of Pulp, Paper, and Paperboard (directional reflectance at 457 nm) and ISO 2470: 2009 Measurement of Diffuse Blue Reflectance Factor (ISO Brightness), the content of which is hereby incorporated by reference in its entirety.

In an embodiment, an effective amount of a disclosed papermaking additive composition is an amount sufficient to result in a processed pulp or paper product derived from such pulp to have a high brightness. In aspects of this embodiment, an effective amount of a disclosed papermaking additive composition is an amount sufficient to result in a processed pulp or paper product derived from such pulp to have a brightness of, e.g., about 70%, about 75%, about 80%, about 85%, about 86%, about 87%, about 88%, about 89%, about 90%, about 91%, about 92%, about 93%, about 94%, about 95%, about 96%, about 97%, about 98% or about 99%. In aspects of this embodiment, an effective amount of a disclosed papermaking additive composition is an amount sufficient to result in a processed pulp or paper product derived from such pulp to have a brightness of, e.g., at least 70%, at least 75%, at least 80%, at least 85%, at least 86%, at least 87%, at least 88%, at least 89%, at least 90%, at least 91%, at least 92%, at least 93%, at least 94%, at least 95%, at least 96%, at least 97%, at least 98% or at least 99%. In yet other aspects of this embodiment, an effective amount of a disclosed papermaking additive composition is an amount sufficient to result in a processed pulp or paper product derived from such pulp to have a brightness of, e.g., at most 70%, at most 75%, at most 80%, at most 85%, at most 86%, at most 87%, at most 88%, at most 89%, at most 90%, at most 91%, at most 92%, at most 93%, at most 94%, at most 95%, at most 96%, at most 97%, at most 98% or at most 99%. In yet other aspects of this embodiment, a method or use disclosed herein results in a processed pulp having an alpha-cellulose content of, e.g., about 70% to about 80%, about 70% to about 85%, about 70% to about 90%, about 70% to about 95%, about 70% to about 99%, about 75% to about 85%, about 75% to about 90%, about 75% to about 95%, about 75% to about 99%, about 80% to about 90%, about 80% to about 95%, about 80% to about 99%, about 85% to about 93%, about 85% to about 95%, about 85% to about 97%, about 85% to about 99%, about 90% to about 93%, about 90% to about 95%, about 90% to about 97%, about 90% to about 99%, about 93% to about 95%, about 93% to about 97%, about 93% to about 99%, about 95% to about 97% or about 95% to about 99%.

In an embodiment, a method or use disclosed herein results in a processed pulp or paper product derived from such pulp to have a high brightness. In aspects of this embodiment, a method or use disclosed herein results in a processed pulp or paper product derived from such pulp to have a brightness of, e.g., about 70%, about 75%, about 80%, about 85%, about 86%, about 87%, about 88%, about 89%, about 90%, about 91%, about 92%, about 93%, about 94%, about 95%, about 96%, about 97%, about 98% or about 99%. In aspects of this embodiment, a method or use disclosed herein results in a processed pulp or paper product derived from such pulp to have a brightness of, e.g., at least 70%, at least 75%, at least 80%, at least 85%, at least 86%, at least 87%, at least 88%, at least 89%, at least 90%, at least 91%, at least 92%, at least 93%, at least 94%, at least 95%, at least 96%, at least 97%, at least 98% or at least 99%. In yet other aspects of this embodiment, a method or use disclosed herein results in a processed pulp or paper product derived from such pulp to have a brightness of, e.g., at most 70%, at most 75%, at most 80%, at most 85%, at most 86%, at most 87%, at most 88%, at most 89%, at most 90%, at most 91%, at most 92%, at most 93%, at most 94%, at most 95%, at most 96%, at most 97%, at most 98% or at most 99%. In yet other aspects of this embodiment, a method or use disclosed herein results in a processed pulp having an alpha-cellulose content of, e.g., about 70% to about 80%, about 70% to about 85%, about 70% to about 90%, about 70% to about 95%, about 70% to about 99%, about 75% to about 85%, about 75% to about 90%, about 75% to about 95%, about 75% to about 99%, about 80% to about 90%, about 80% to about 95%, about 80% to about 99%, about 85% to about 93%, about 85% to about 95%, about 85% to about 97%, about 85% to about 99%, about 90% to about 93%, about 90% to about 95%, about 90% to about 97%, about 90% to about 99%, about 93% to about 95%, about 93% to about 97%, about 93% to about 99%, about 95% to about 97% or about 95% to about 99%.

Another aspect of high fiber purity and quality is the amount of impurity and/or contaminate content of the processed pulp or paper product produced. In general, the lower the impurity and/or contaminate content, the higher the purity and integrity of cellulosic material in processed pulp or paper product produced. There are several assays which measure number of carboxyl groups in cellulosic material from processed pulp.

Another aspect of high fiber purity and quality is the ink content of the processed pulp or paper product produced. In general, the lower the ink content, the higher the purity and integrity of cellulosic material in processed pulp or paper product produced. There are several assays which measure number of ink content in cellulosic material from processed pulp or paper product produced.

Since the pulping phase usually removes most water-soluble and volatile compounds soluble in organic solvents, impurities and/or contaminates typically comprise resin and fatty acids and their esters, waxes and unsaponifiable substances as well as impurities and/or contaminates of reclaimed paper products such as inks, plastics and other additives. Such impurities and/or contaminates are generally referred to as extractives.

In a solvent extractive assay, the extractive content of processed pulp is determined, which is an indicator of paper strength, delignification and the number of times the cellulose fiber could be recycled. Solvent extractive assays include a dichloromethane-based assay and an ethanol-benzene assay. The dichloromethane-extractable content of a processed pulp is a measure of waxes, fats, resins, phosterols and non-volatile hydrocarbons. The ethanol-benzene extractable content of a processed pulp include dichloromethane-insoluble components including low-molecular weight carbohydrates, salts and other water-soluble substances in addition to waxes, fats, resins, photosterols and non-volatile hydrocarbons. To perform a solvent extractive assay, dried processed pulp is mixed with the appropriate solvent and the sample is heated in an extraction apparatus for not less than 24 extraction cycles over a period of about 4 to about 5 hours. The sample is removed from the apparatus and any remaining solvent is evaporated and the sample is then oven dried. The extractive content, E %, is calculated using the following formula: $E\% = [(W_e - W_b)/W_p] \times 100$, where E % is extractive content, $W_e$ is the oven-dry weight, in grams, of extract, $W_b$ is the oven-dry weight, in grams, of blank residue, and $W_p$ is the oven-dry weight, in grams, of the initial pulp sample. Standardized solvent extractive assays are described in, e.g., TAPPI Standard T 204 cm-97 Solvent Extractives of Wood and Pulp, the content of each of which is hereby incorporated by reference in its entirety.

In an embodiment, an effective amount of a disclosed papermaking additive composition is an amount sufficient to result in a processed pulp having a low extractives content. In aspects of this embodiment, an effective amount of a disclosed papermaking additive composition is an amount sufficient to result in a processed pulp having an extractives content of, e.g., about 0.01%, about 0.02%, about 0.03%, about 0.04%, about 0.05%, about 0.06%, about 0.07%, about 0.08%, about 0.09%, about 0.1%, about 0.2%, about 0.3%, about 0.4%, about 0.5%, about 0.6%, about 0.7%, about 0.8%, about 0.9%, about 1%, about 2%, about 3%, about 4% or about 5%. In other aspects of this embodiment, an effective amount of a disclosed papermaking additive composition is an amount sufficient to result in a processed pulp having an extractives content of, e.g., at most 0.01%, at most 0.02%, at most 0.03%, at most 0.04%, at most 0.05%, at most 0.06%, at most 0.07%, at most 0.08%, at most 0.09%, at most 0.1%, at most 0.2%, at most 0.3%, at most 0.4%, at most 0.5%, at most 0.6%, at most 0.7%, at most 0.8%, at most 0.9%, at most 1%, at most 2%, at most 3%, at most 4% or at most 5%. In other aspects of this embodiment, an effective amount of a disclosed papermaking additive composition is an amount sufficient to result in a processed pulp having an extractives content of, e.g., about 0.001% to about 0.005%, about 0.001% to about 0.01%, about 0.001% to about 0.05%, about 0.001% to about 0.1%, about 0.001% to about 0.5%, about 0.001% to about 1%, about 0.001% to about 5%, about 0.005% to about 0.01%, about 0.005% to about 0.05%, about 0.005% to about 0.1%, about 0.005% to about 0.5%, about 0.005% to about 1%, about 0.005% to about 5%, about 0.01% to about 0.05%, about 0.01% to about 0.1%, about 0.01% to about 0.5%, about 0.01% to about 1%, about 0.01% to about 5%, about 0.05% to about 0.1%, about 0.05% to about 0.5%, about 0.05% to about 1%, about 0.05% to about 5%, about 0.1% to about 0.5%, about 0.1% to about 1%, about 0.1% to about 5%, about 0.5% to about 1%, about 0.5% to about 5% or about 1% to about 5%.

In an embodiment, a method or use disclosed herein results in a processed pulp having a low extractives content. In aspects of this embodiment, a method or use disclosed herein results in a processed pulp having an extractives content of, e.g., about 0.01%, about 0.02%, about 0.03%, about 0.04%, about 0.05%, about 0.06%, about 0.07%, about 0.08%, about 0.09%, about 0.1%, about 0.2%, about 0.3%, about 0.4%, about 0.5%, about 0.6%, about 0.7%, about 0.8%, about 0.9%, about 1%, about 2%, about 3%, about 4% or about 5%. In other aspects of this embodiment, a method or use disclosed herein results in a processed pulp having an extractives content of, e.g., at most 0.01%, at most 0.02%, at most 0.03%, at most 0.04%, at most 0.05%, at most 0.06%, at most 0.07%, at most 0.08%, at most 0.09%, at most 0.1%, at most 0.2%, at most 0.3%, at most 0.4%, at most 0.5%, at most 0.6%, at most 0.7%, at most 0.8%, at most 0.9%, at most 1%, at most 2%, at most 3%, at most 4% or at most 5%. In other aspects of this embodiment, a method or use disclosed herein results in a processed pulp having an extractives content of, e.g., about 0.001% to about 0.005%, about 0.001% to about 0.01%, about 0.001% to about 0.05%, about 0.001% to about 0.1%, about 0.001% to about 0.5%, about 0.001% to about 1%, about 0.001% to about 5%, about 0.005% to about 0.01%, about 0.005% to about 0.05%, about 0.005% to about 0.1%, about 0.005% to about 0.5%, about 0.005% to about 1%, about 0.005% to about 5%, about 0.01% to about 0.05%, about 0.01% to about 0.1%, about 0.01% to about 0.5%, about 0.01% to about 1%, about 0.01% to about 5%, about 0.05% to about 0.1%, about 0.05% to about 0.5%, about 0.05% to about 1%, about 0.05% to about 5%, about 0.1% to about 0.5%, about 0.1% to about 1%, about 0.1% to about 5%, about 0.5% to about 1%, about 0.5% to about 5% or about 1% to about 5%.

An effective amount of a disclosed papermaking additive composition can be a dilution of a papermaking additive composition disclosed herein. In aspects of this embodiment, an effective amount of a disclosed papermaking additive composition is a papermaking additive composition:dilutant ratio of, e.g., about 1:50, about 1:75, about 1:100, about 1:125, about 1:150, about 1:175, about 1:200, about 1:225, about 1:250, about 1:275, about 1:300, about 1:325, about 1:350, about 1:375, about 1:400, about 1:425, about 1:450, about 1:475, about 1:500, about 1:525, about 1:550, about 1:575 or about 1:600. In other aspects of this embodiment, an effective amount of a disclosed papermaking additive composition is a papermaking additive composition:dilutant ratio of, e.g., at least 1:50, at least 1:75, at least 1:100, at least 1:125, at least 1:150, at least 1:175, at least 1:200, at least 1:225, at least 1:250, at least 1:275, at least 1:300, at least 1:325, at least 1:350, at least 1:375, at least 1:400, at least 1:425, at least 1:450, at least 1:475, at least 1:500, at least 1:525, at least 1:550, at least 1:575 or at least 1:600. In yet other aspects of this embodiment, an effective amount of a disclosed papermaking additive composition is a papermaking additive composition:dilutant ratio of, e.g., at most 1:50, at most 1:75, at most 1:100, at most 1:125, at most 1:150, at most 1:175, at most 1:200, at most 1:225, at most 1:250, at most 1:275, at most 1:300, at most 1:325, at most 1:350, at most 1:375, at most 1:400, at most 1:425, at most 1:450, at most 1:475, at most 1:500, at most 1:525, at most 1:550, at most 1:575 or at most 1:600. In other aspects of this embodiment, an effective amount of a disclosed papermaking additive composition is a papermaking additive composition:dilutant ratio of, e.g., about 1:50 to about 1:100, about 1:50 to about 1:200, about 1:50 to about 1:300, about 1:50 to about 1:400, about 1:50 to about 1:500, about 1:50 to about 1:600, about 1:100 to about 1:200, about 1:100 to about 1:300, about 1:100 to about 1:400, about 1:100 to about 1:500, about 1:100 to about 1:600, about 1:200 to about 1:300, about 1:200 to about 1:400, about 1:200 to about 1:500, about 1:200 to about 1:600, about 1:300 to about 1:400, about 1:300 to about 1:500, about 1:300 to about 1:600, about 1:400 to about 1:500, about 1:400 to about 1:600 or about 1:500 to about 1:600.

In aspects of this embodiment, an effective amount of a disclosed papermaking additive composition is a papermaking additive composition:dilutant ratio of, e.g., about 1:500, about 1:750, about 1:1000, about 1:1250, about 1:1500, about 1:1750, about 1:2000, about 1:2250, about 1:2500, about 1:2750, about 1:3000, about 1:3250, about 1:3500, about 1:3750, about 1:4000, about 1:4250, about 1:4500, about 1:4750, about 1:5000, about 1:5250, about 1:5500, about 1:5750, about 1:6000 about 1:7000, about 1:8000, about 1:9000 or about 1:10000. In other aspects of this embodiment, an effective amount of a disclosed papermaking additive composition is a papermaking additive composition:dilutant ratio of, e.g., at least 1:500, at least 1:750, at least 1:1000, at least 1:1250, at least 1:1500, at least 1:1750, at least 1:2000, at least 1:2250, at least 1:2500, at least 1:2750, at least 1:3000, at least 1:3250, at least 1:3500, at least 1:3750, at least 1:4000, at least 1:4250, at least 1:4500, at least 1:4750, at least 1:5000, at least 1:5250, at least 1:5500, at least 1:5750, at least 1:6000, at least 1:7000, at least 1:8000, at least 1:9000 or at least 1:10000. In yet other aspects of this embodiment, an effective amount of a disclosed papermaking additive composition is a papermaking additive composition:dilutant ratio of, e.g., at most 1:500, at most 1:750, at most 1:1000, at most 1:1250, at most 1:1500, at most 1:1750, at most 1:2000, at most 1:2250, at most 1:2500, at most 1:2750, at most 1:3000, at most 1:3250, at most 1:3500, at most 1:3750, at most 1:4000, at most 1:4250, at most 1:4500, at most 1:4750, at most 1:5000, at most 1:5250, at most 1:5500, at most 1:5750, at most 1:6000 at most 1:7000, at most 1:8000, at most 1:9000 or at most 1:10000. In other aspects of this embodiment, an effective amount of a disclosed papermaking additive composition is a papermaking additive composition:dilutant ratio of, e.g., about 1:500 to about 1:1000, about 1:500 to about 1:2000, about 1:500 to about 1:3000, about 1:500 to about 1:4000, about 1:500 to about 1:5000, about 1:500 to about 1:6000, about 1:500 to about 1:7000, about 1:500 to about 1:8000, about 1:500 to about 1:9000, about 1:500 to about 1:10000, about 1:1000 to about 1:2000, about 1:1000 to about 1:3000, about 1:1000 to about 1:4000, about 1:1000 to about 1:5000, about 1:1000 to about 1:6000, about 1:1000 to about 1:7000, about 1:1000 to about 1:8000, about 1:1000 to about 1:9000, about 1:1000 to about 1:10000, about 1:2000 to about 1:3000, about 1:2000 to about 1:4000, about 1:2000 to about 1:5000, about 1:2000 to about 1:6000, about 1:2000 to about 1:7000, about 1:2000 to about 1:8000, about 1:2000 to about 1:9000, about 1:2000 to about 1:10000, about 1:3000 to about 1:4000, about 1:3000 to about 1:5000, about 1:3000 to about 1:6000, about 1:3000 to about 1:7000, about 1:3000 to about 1:8000, about 1:3000 to about 1:9000, about 1:3000 to about 1:10000, about 1:4000 to about 1:5000, about 1:4000 to about 1:6000, about 1:4000 to about 1:7000, about 1:4000 to about 1:8000, about 1:4000 to about 1:9000, about 1:4000 to about 1:10000, about 1:5000 to about 1:6000, about 1:5000 to about 1:7000, about 1:5000 to about 1:8000, about 1:5000 to about 1:9000, about 1:5000 to about 1:10000, about 1:6000 to about 1:7000, about 1:6000 to about 1:8000, about 1:6000 to about 1:9000, about 1:6000 to about 1:10000, about 1:7000 to about 1:8000, about 1:7000 to about 1:9000, about 1:7000 to about 1:10000, about 1:8000 to about 1:9000, about 1:8000 to about 1:10000 or about 1:9000 to about 1:10000.

In aspects of this embodiment, an effective amount of a disclosed papermaking additive composition has a final concentration of, e.g., about 0.0001%, about 0.0002%, about 0.0003%, about 0.0004%, about 0.0005%, about 0.0006%, about 0.0007%, about 0.0008%, about 0.0009%, about 0.001%, about 0.002%, about 0.003%, about 0.004%, about 0.005%, about 0.006%, about 0.007%, about 0.008%, about 0.009%, about 0.01%, about 0.02%, about 0.03%, about 0.04%, about 0.05%, about 0.06%, about 0.07%, about 0.08%, about 0.09%, about 0.1%, about 0.2%, about 0.3%, about 0.4%, about 0.5%, about 0.6%, about 0.7%, about 0.8%, about 0.9%, about 1%, about 2%, about 3%, about 4%, about 5%, about 6%, about 7%, about 8%, about 9% or about 10%. In other aspects of this embodiment, an effective amount of a disclosed papermaking additive composition has a final concentration of, e.g., at least 0.0001%, at least 0.0002%, at least 0.0003%, at least 0.0004%, at least 0.0005%, at least 0.0006%, at least 0.0007%, at least 0.0008%, at least 0.0009%, at least 0.001%, at least 0.002%, at least 0.003%, at least 0.004%, at least 0.005%, at least 0.006%, at least 0.007%, at least 0.008%, at least 0.009%, at least 0.01%, at least 0.02%, at least 0.03%, at least 0.04%, at least 0.05%, at least 0.06%, at least 0.07%, at least 0.08%, at least 0.09%, at least 0.1%, at least 0.2%, at least 0.3%, at least 0.4%, at least 0.5%, at least 0.6%, at least 0.7%, at least 0.8%, at least 0.9%, at least 1%, at least 2%, at least 3%, at least 4%, at least 5%, at least 6%, at least 7%, at least 8%, at least 9% or at least 10%. In yet other aspects of this embodiment, an effective amount of a disclosed papermaking additive composition has a final concentration of, e.g., at most 0.0001%, at most 0.0002%, at most 0.0003%, at most 0.0004%, at most 0.0005%, at most 0.0006%, at most 0.0007%, at most 0.0008%, at most 0.0009%, at most 0.001%, at most 0.002%, at most 0.003%, at most 0.004%, at most 0.005%, at most 0.006%, at most 0.007%, at most 0.008%, at most 0.009%, at most 0.01%, at most 0.02%, at most 0.03%, at most 0.04%, at most 0.05%, at most 0.06%, at most 0.07%, at most 0.08%, at most 0.09%, at most 0.1%, at most 0.2%, at most 0.3%, at most 0.4%, at most 0.5%, at most 0.6%, at most 0.7%, at most 0.8%, at most 0.9%, at most 1%, at most 2%, at most 3%, at most 4%, at most 5%, at most 6%, at most 7%, at most 8%, at most 9% or at most 10%. In still other aspects of this embodiment, an effective amount of a disclosed papermaking additive composition has a final concentration of, e.g., about 0.0001% to about 0.0005%, about 0.0001% to about 0.001%, about 0.0001% to about 0.005%, about 0.0001% to about 0.01%, about 0.0001% to about 0.05%, about 0.0001% to about 0.1%, about 0.0001% to about 0.5%, about 0.0001% to about 1%, about 0.0001% to about 5%, about 0.0001% to about 10%, about 0.0005% to about 0.001%, about 0.0005% to about 0.005%, about 0.0005% to about 0.01%, about 0.0005% to about 0.05%, about 0.0005% to about 0.1%, about 0.0005% to about 0.5%, about 0.0005% to about 1%, about 0.0005% to about 5%, about 0.0005% to about 10%, about 0.001% to about 0.005%, about 0.001% to about 0.01%, 0.001% to about 0.05%, about 0.001% to about 0.1%, 0.001% to about 0.5%, 0.001% to about 1%, 0.001% to about 5%, about 0.001% to about 10%, about 0.005% to about 0.01%, about 0.005% to about 0.05%, about 0.005% to about 0.1%, about 0.005% to about 0.5%, about 0.005% to about 1%, about 0.005% to about 5%, about 0.005% to about 10%, about 0.01% to about 0.05%, about 0.01% to about 0.1%, about 0.01% to about 0.5%, about 0.01% to about 1%, about 0.01% to about 5%, about 0.01% to about 10%, about 0.05% to about 0.1%, about 0.05% to about 0.5%, about 0.05% to about 1%, about 0.05% to about 5%, about 0.05% to about 10%, about 0.1% to about 0.5%, about 0.1% to about 1%, about 0.1% to about 5%, about 0.1% to about 10%, about 0.5% to about 1%, about 0.5% to about 5%, about 0.5% to about 10%, about 1% to about 5%, about 1% to about 10% or about 5% to about 10%.

Application of a papermaking additive composition disclosed herein can be achieved by any process that effectively creates microbubbles as disclosed herein. The microbubbles formed with the papermaking additive composition disclosed herein appear to increase the mass transfer of oxygen in liquids. Without being bound by scientific theory, there are several possible explanations for this difference. First, the surfactants formulated into a papermaking additive composition disclosed herein include nonionic surfactants and/or biosurfactants which significantly alter the properties of bubble behavior. Second, a papermaking additive composition disclosed herein requires a much lower concentration of surfactants for microbubble formation. It has been suggested that surfactant concentrations must approach the critical micelles concentration (CMS) of a surfactant system. In a papermaking additive composition disclosed herein, microbubbles are formed below estimated CMCs for the surfactants used. This suggests that the microbubbles are the result of aggregates of surfactant molecules with a loose molecular packing more favorable to gas mass transfer characteristics. A surface containing fewer surfactant molecules would be more gas permeable than a well-organized micelle containing gas. Regardless of the mechanism, the tendency of a papermaking additive composition disclosed herein to organizes into clusters, aggregates, or gas-filled bubbles provides a platform for reactions to occur by increasing localized concentrations of reactants, lowering the transition of energy required for a catalytic reaction to occur, or some other mechanism which has not yet been described.

In aspects of this embodiment, a microbubbles disclosed herein have a mean diameter of, e.g., about 5 µm, about 10 µm, about 15 µm, about 20 µm, about 25 µm, about 30 µm, about 40 μm, about 50 μm, about 75 μm, about 100 μm, about 150 μm, about 200 μm, about 250 μm, about 300 μm, about 350 μm, about 400 μm, about 450 μm, about 500 μm, about 550 μm, about 600 μm, about 650 μm, about 700 μm, about 750 μm, about 800 μm, about 850 μm, about 900 μm, about 950 μm or about 1000 μm. In other aspects of this embodiment, a microbubbles disclosed herein have a mean diameter of, e.g., at least 5 μm, at least 10 μm, at least 15 μm, at least 20 μm, at least 25 μm, at least 30 μm, at least 40 μm, at least 50 μm, at least 100 μm, at least 150 μm, at least 200 μm, at least 250 μm, at least 300 μm, at least 350 μm, at least 400 μm, at least 450 μm, at least 500 μm, at least 550 μm, at least 600 μm, at least 650 μm, at least 700 μm, at least 750 μm, at least 800 μm, at least 850 μm, at least 900 μm, at least 950 μm or at least 1000 μm. In other aspects of this embodiment, a microbubbles disclosed herein have a mean diameter of, e.g., at most 5 μm, at most 10 μm, at most 15 μm, at most 20 μm, at most 25 μm, at most 30 μm, at most 40 μm, at most 50 μm, at most 100 μm, at most 150 μm, at most 200 μm, at most 250 μm, at most 300 μm, at most 350 μm, at most 400 μm, at most 450 μm, at most 500 μm, at most 550 μm, at most 600 μm, at most 650 μm, at most 700 μm, at most 750 μm, at most 800 μm, at most 850 μm, at most 900 μm, at most 950 μm or at most 1000 μm.

In aspects of this embodiment, a microbubbles disclosed herein have a mean diameter of, e.g., about 5 μm to about 10 μm, about 5 μm to about 15 μm, about 5 μm to about 20 μm, about 5 μm to about 25 μm, about 5 μm to about 30 μm, about 5 μm to about 40 μm, about 5 μm to about 50 μm, about 5 μm to about 75 μm, about 5 μm to about 100 μm, about 10 μm to about 15 μm, about 10 μm to about 20 μm, about 10 μm to about 25 μm, about 10 μm to about 30 μm, about 10 μm to about 40 μm, about 10 μm to about 50 μm, about 10 μm to about 75 μm, about 10 μm to about 100 μm, about 15 μm to about 20 μm, about 15 μm to about 25 μm, about 15 μm to about 30 μm, about 15 μm to about 40 μm, about 15 μm to about 50 μm, about 15 μm to about 75 μm, about 15 μm to about 100 μm, about 20 μm to about 25 μm, about 20 μm to about 30 μm, about 20 μm to about 40 μm, about 20 μm to about 50 μm, about 20 μm to about 75 μm, about 20 μm to about 100 μm, about 25 μm to about 30 μm, about 25 μm to about 40 μm, about 25 μm to about 50 μm, about 25 μm to about 75 μm, about 25 μm to about 100 μm, about 30 μm to about 40 μm, about 30 μm to about 50 μm, about 30 μm to about 75 μm, about 30 μm to about 100 μm, about 40 μm to about 50 μm, about 40 μm to about 75 μm, about 40 μm to about 100 μm, about 50 μm to about 75 μm, about 50 μm to about 100 μm, about 50 μm to about 150 μm, about 50 μm to about 200 μm, about 50 μm to about 250 μm, about 50 μm to about 300 μm, about 50 μm to about 350 μm, about 50 μm to about 400 μm, about 50 μm to about 450 μm, about 50 μm to about 500 μm, about 50 μm to about 550 μm, about 50 μm to about 600 μm, about 50 μm to about 650 μm, about 50 μm to about 700 μm, about 50 μm to about 750 μm, about 50 μm to about 800 μm, about 50 μm to about 850 μm, about 50 μm to about 900 μm, about 50 μm to about 950 μm, about 50 μm to about 1000 μm, about 100 μm to about 150 μm, about 100 μm to about 200 μm, about 100 μm to about 250 μm, about 100 μm to about 300 μm, about 100 μm to about 350 μm, about 100 μm to about 400 μm, about 100 μm to about 450 μm, about 100 μm to about 500 μm, about 100 μm to about 550 μm, about 100 μm to about 600 μm, about 100 μm to about 650 μm, about 100 μm to about 700 μm, about 100 μm to about 750 μm, about 100 μm to about 800 μm, about 100 μm to about 850 μm, about 100 μm to about 900 μm, about 100 μm to about 950 μm, about 100 μm to about 1000 μm, about 150 μm to about 200 μm, about 150 μm to about 250 μm, about 150 μm to about 300 μm, about 150 μm to about 350 μm, about 150 μm to about 400 μm, about 150 μm to about 450 μm, about 150 μm to about 500 μm, about 150 μm to about 550 μm, about 150 μm to about 600 μm, about 150 μm to about 650 μm, about 150 μm to about 700 μm, about 150 μm to about 750 μm, about 150 μm to about 800 μm, about 150 μm to about 850 μm, about 150 μm to about 900 μm, about 150 μm to about 950 μm, about 150 μm to about 1000 μm, about 200 μm to about 250 μm, about 200 μm to about 300 μm, about 200 μm to about 350 μm, about 200 μm to about 400 μm, about 200 μm to about 450 μm, about 200 μm to about 500 μm, about 200 μm to about 550 μm, about 200 μm to about 600 μm, about 200 μm to about 650 μm, about 200 μm to about 700 μm, about 200 μm to about 750 μm, about 200 μm to about 800 μm, about 200 μm to about 850 μm, about 200 μm to about 900 μm, about 200 μm to about 950 μm, about 200 μm to about 1000 μm, about 250 μm to about 300 μm, about 250 μm to about 350 μm, about 250 μm to about 400 μm, about 250 μm to about 450 μm, about 250 μm to about 500 μm, about 250 μm to about 550 μm, about 250 μm to about 600 μm, about 250 μm to about 650 μm, about 250 μm to about 700 μm, about 250 μm to about 750 μm, about 250 μm to about 800 μm, about 250 μm to about 850 μm, about 250 μm to about 900 μm, about 250 μm to about 950 μm, about 250 μm to about 1000 μm, about 300 μm to about 350 μm, about 300 μm to about 400 μm, about 300 μm to about 450 μm, about 300 μm to about 500 μm, about 300 μm to about 550 μm, about 300 μm to about 600 μm, about 300 μm to about 650 μm, about 300 μm to about 700 μm, about 300 μm to about 750 μm, about 300 μm to about 800 μm, about 300 μm to about 850 μm, about 300 μm to about 900 μm, about 300 μm to about 950 μm, about 300 μm to about 1000 μm, about 350 μm to about 400 μm, about 350 μm to about 450 μm, about 350 μm to about 500 μm, about 350 μm to about 550 μm, about 350 μm to about 600 μm, about 350 μm to about 650 μm, about 350 μm to about 700 μm, about 350 μm to about 750 μm, about 350 μm to about 800 μm, about 350 μm to about 850 μm, about 350 μm to about 900 μm, about 350 μm to about 950 μm, about 350 μm to about 1000 μm, about 400 μm to about 450 μm, about 400 μm to about 500 μm, about 400 μm to about 550 μm, about 400 μm to about 600 μm, about 400 μm to about 650 μm, about 400 μm to about 700 μm, about 400 μm to about 750 μm, about 400 μm to about 800 μm, about 400 μm to about 850 μm, about 400 μm to about 900 μm, about 400 μm to about 950 μm, about 400 μm to about 1000 μm, about 450 μm to about 500 μm, about 450 μm to about 550 μm, about 450 μm to about 600 μm, about 450 μm to about 650 μm, about 450 μm to about 700 μm, about 450 μm to about 750 μm, about 450 μm to about 800 μm, about 450 μm to about 850 μm, about 450 μm to about 900 μm, about 450 μm to about 950 μm, about 450 μm to about 1000 μm, about 500 μm to about 550 μm, about 500 μm to about 600 μm, about 500 μm to about 650 μm, about 500 μm to about 700 μm, about 500 μm to about 750 μm, about 500 μm to about 800 μm, about 500 μm to about 850 μm, about 500 μm to about 900 μm, about 500 μm to about 950 μm, about 500 μm to about 1000 μm, about 550 μm to about 600 μm, about 550 μm to about 650 μm, about 550 μm to about 700 μm, about 550 μm to about 750 μm, about 550 μm to about 800 μm, about 550 μm to about 850 μm, about 550 μm to about 900 μm, about 550 μm to about 950 μm, about 550 μm to about 1000 μm, about 600 μm to about 650 μm, about 600 μm to about 700 μm, about 600 μm to about 750 μm, about 600 μm to about 800 μm, about 600 μm to about 850 μm, about 600 μm to about 900 μm, about 600 μm to about 950 μm, about 600 μm to about 1000 μm, about 650 μm to about 700 µm, about 650 µm to about 750 µm, about 650 µm to about 800 µm, about 650 µm to about 850 µm, about 650 µm to about 900 µm, about 650 µm to about 950 µm, about 650 µm to about 1000 µm, about 700 µm to about 750 µm, about 700 µm to about 800 µm, about 700 µm to about 850 µm, about 700 µm to about 900 µm, about 700 µm to about 950 µm, about 700 µm to about 1000 µm, about 750 µm to about 800 µm, about 750 µm to about 850 µm, about 750 µm to about 900 µm, about 750 µm to about 950 µm, about 750 µm to about 1000 µm, about 800 µm to about 850 µm, about 800 µm to about 900 µm, about 800 µm to about 950 µm, about 800 µm to about 1000 µm, about 850 µm to about 900 µm, about 850 µm to about 950 µm, about 850 µm to about 1000 µm, about 900 µm to about 950 µm, about 900 µm to about 1000 µm or about 950 µm to about 1000 µm.

The papermaking additive compositions, method and uses described herein will most likely not harm mammals or the environment and are non-phytotoxic and can be safely applied to a paper making process. Furthermore, the papermaking additive compositions, method and uses described herein can be used indoors and outdoors and will not soften, dissolve, or otherwise adversely affect treated surfaces.

Aspects of the present specification can also be described as follows:

1. A method of separating fibers from a pulp, the method comprising applying an effective amount of a papermaking additive composition to the pulp during a pulping and/or a paper production phase, wherein the application results in increased separation of cellulose fibers from raw materials present in the pulp, the composition comprising a treated, fermented microbial supernatant and one or more nonionic surfactants, wherein the composition lacks any active enzymes or live bacteria, and wherein the composition has a pH of at most 5.0.
2. A method of removing one or more impurities and/or one or more contaminates from a pulp and/or a paper material, the method comprising applying an effective amount of a papermaking additive composition to the pulp during a pulping and/or a paper production phase, wherein the application results in removal of the one or more impurities and/or the one or more contaminates from the pulp and/or paper material, the composition comprising a treated, fermented microbial supernatant and one or more nonionic surfactants, wherein the composition lacks any active enzymes or live bacteria, and wherein the composition has a pH of at most 5.0.
3. A method of removing an ink from a pulp and/or a paper material, the method comprising applying an effective amount of a papermaking additive composition to the pulp during a pulping and/or a paper production phase, wherein the application results in removal of the ink from the pulp and/or paper material, the composition comprising a treated, fermented microbial supernatant and one or more nonionic surfactants, wherein the composition lacks any active enzymes or live bacteria, and wherein the composition has a pH of at most 5.0.
4. Use of an effective amount of a papermaking additive composition for separating fibers from a pulp slurry, wherein the composition comprises a treated, fermented microbial supernatant and one or more nonionic surfactants, wherein the composition lacks any active enzymes or live bacteria, and wherein the composition has a pH of at most 5.0.
5. Use of an effective amount of a papermaking additive composition for removing one or more impurities and/or one or more contaminates from a pulp and/or a paper material, wherein the composition comprises a treated, fermented microbial supernatant and one or more nonionic surfactants, wherein the composition lacks any active enzymes or live bacteria, and wherein the composition has a pH of at most 5.0.
6. Use of an effective amount of a papermaking additive composition for removing ink from a pulp and/or a paper material, wherein the composition comprises a treated, fermented microbial supernatant and one or more nonionic surfactants, wherein the composition lacks any active enzymes or live bacteria, and wherein the composition has a pH of at most 5.0.
7. The method according to embodiments 1-3 or use according to embodiments 4-6, wherein the treated, fermented microbial supernatant is from a fermented yeast supernatant, a fermented bacterial supernatant, a fermented mold supernatant, or any combination thereof.
8. The method or use according to embodiment 6, wherein the fermented yeast supernatant is produced from a species of yeast belonging to the genera *Brettanomyces, Candida, Cyberlindnera, Cystofilobasidium, Debaryomyces, Dekkera, Fusarium, Geotrichum, Issatchenkia, Kazachstania, Kloeckera, Kluyveromyces, Lecanicillium, Mucor, Neurospora, Pediococcus, Penicillium, Pichia, Rhizopus, Rhodosporidium, Rhodotorula, Saccharomyces, Schizosaccharomyces, Thrichosporon, Torulaspora, Torulopsis, Verticillium, Yarrowia, Zygosaccharomyces* or *Zygotorulaspora*.
9. The method or use according to embodiment 6, wherein the fermented yeast supernatant is produced from the yeast *Saccharomyces cerevisiae*.
10. The method or use according to embodiment 6, wherein the fermented bacterial supernatant is produced from a species of bacteria belonging to the genera *Acetobacter, Arthrobacter, Aerococcus, Bacillus, Bifidobacterium, Brachybacterium, Brevibacterium, Barnobacterium, Carnobacterium, Corynebacterium, Enterococcus, Escherichia, Gluconacetobacter, Gluconobacter, Hafnia, Halomonas, Kocuria, Lactobacillus, Lactococcus, Leuconostoc, Macrococcus, Microbacterium, Micrococcus, Neisseria, Oenococcus, Pediococcus, Propionibacterium, Proteus, Pseudomonas, Psychrobacter, Salmonella, Sporolactobacillus, Staphylococcus, Streptococcus, Streptomyces, Tetragenococcus, Vagococcus, Weissells* or *Zymomonas*.
11. The method or use according to embodiment 6, wherein the fermented bacterial supernatant is produced from a species of bacteria belonging to the genus *Aspergillus*.
12. The method according to embodiments 1-3 or 7-11 or use according to embodiments 4-11, wherein the papermaking additive composition comprises at least 35% by weight of the treated fermented microbial supernatant.
13. The method according to embodiments 1-3 or 7-12 or use according to embodiments 4-12, wherein the papermaking additive composition comprises at most 50% by weight of the treated fermented microbial supernatant.
14. The method according to embodiments 1-3 or 7-13 or use according to embodiments 4-13, wherein the nonionic surfactant comprises a polyether nonionic surfactant, a polyhydroxyl nonionic surfactant, and/or a nonionic biosurfactant.
15. The method or use according to embodiment 14, wherein the polyhydroxyl nonionic surfactant comprising a sucrose ester, an ethoxylated sucrose ester, a sorbital ester, an ethoxylated sorbital ester, an alkyl glucoside, an ethoxylated alkyl glucoside, a polyglycerol ester, or an ethoxylated polyglycerol ester.

16. The method according to embodiments 1-3 or 7-15 or use according to embodiments 4-15, wherein the nonionic surfactant comprises an amine oxide, an ethoxylated alcohol, an ethoxylated aliphatic alcohol, an alkylamine, an ethoxylated alkylamine, an ethoxylated alkyl phenol, an alkyl polysaccharide, an ethoxylated alkyl polysaccharide, an ethoxylated fatty acid, an ethoxylated fatty alcohol, or an ethoxylated fatty amine, or a nonionic surfactant having the general formula of $H(OCH_2CH_2)_xOC_6H_4R^1$, $H(OCH_2CH_2)_xOR^2$, or $H(OCH_2CH_2)_xOC(O)R^2$, wherein x represents the number of moles of ethylene oxide added to an alkyl phenol and/or a fatty alcohol or a fatty acid, $R^1$ represents a long chain alkyl group and, $R^2$ represents a long chain aliphatic group.

17. The method or use according to embodiment 16, wherein $R^1$ is a $C_7$-$C_{10}$ normal-alkyl group and/or wherein $R^2$ is a $C_{12}$-$C_{20}$ aliphatic group.

18. The method according to embodiments 1-3 or 7-17 or use according to embodiments 4-17, wherein the nonionic surfactant is an ethoxylated nonyl phenol, an ethoxylated octyl phenol, an ethoxylated ceto-oleyl alcohol, an ethoxylated ceto-stearyl alcohol, an ethoxylated decyl alcohol, an ethoxylated dodecyl alcohol, an ethoxylated tridecyl alcohol, or an ethoxylated castor oil.

19. The method according to embodiments 1-3 or 7-18 or use according to embodiments 4-18, wherein the papermaking additive composition comprises from about 1% to about 15% by weight of the one or more nonionic surfactants.

20. The method according to embodiment 19, wherein the papermaking additive composition comprises from about 5% to about 13% by weight of the one or more nonionic surfactants.

21. The method according to embodiment 20, wherein the papermaking additive composition comprises from about 7% to about 11% by weight of the one or more nonionic surfactants.

22. The method according to embodiments 1-3 or 7-21 or use according to embodiments 4-21, wherein the papermaking additive composition further comprises one or more anionic surfactants.

23. The method or use according to embodiment 22, wherein the papermaking additive composition comprises from about 0.5% to about 10% by weight of the one or more anionic surfactants.

24. The method or use according to embodiment 23, wherein the papermaking additive composition comprises from about 1% to about 8% by weight of the one or more anionic surfactants.

25. The method or use according to embodiment 24, wherein the papermaking additive composition comprises from about 2% to about 6% by weight of the one or more anionic surfactants.

26. The method according to embodiments 1-3 or 7-25 or use according to embodiments 4-25, wherein the pH is at most 4.5.

27. The method or use according to embodiment 26, wherein the pH about 3.7 to about 4.2.

28. The method according to embodiments 1-3 or 7-27 or use according to embodiments 4-27, wherein the papermaking additive composition is substantially non-toxic to humans, mammals, plants and the environment.

29. The method according to embodiments 1-3 or 7-28 or use according to embodiments 4-28, wherein the papermaking additive composition is biodegradable.

30. The method according to embodiments 1-3 or 7-29 or use according to embodiments 4-29, further comprising applying an enzymatic composition comprising an enzyme that digests lignin, boosts bleaching, increases deinking, modifies cellulose fiber structure, increases effluent control, removes pitch and stickies (adhesives) and modifies starch.

31. The method or use according to embodiment 30, wherein the enzyme is a cellulase, a xylanase, a lipase, an esterase, an amylase, a pectinase, a catalase, a laccase, a peroxidase, a pulpase DI, a pulpase RF and a pulpase BL.

32. The method according to embodiments 1-3 or 7-31 or use according to embodiments 4-31, wherein the effective amount of the papermaking additive composition results in a high pulp yield.

33. The method or use according to embodiment 32, wherein the effective amount of the papermaking additive composition results in a pulp yield of about 70%, about 75%, about 80%, about 85%, about 86%, about 87%, about 88%, about 89%, about 90%, about 91%, about 92%, about 93%, about 94%, about 95%, about 96%, about 97%, about 98% or about 99%; or at least 70%, at least 75%, at least 80%, at least 85%, at least 86%, at least 87%, at least 88%, at least 89%, at least 90%, at least 91%, at least 92%, at least 93%, at least 94%, at least 95%, at least 96%, at least 97%, at least 98% or at least 99%; or at most 70%, at most 75%, at most 80%, at most 85%, at most 86%, at most 87%, at most 88%, at most 89%, at most 90%, at most 91%, at most 92%, at most 93%, at most 94%, at most 95%, at most 96%, at most 97%, at most 98% or at most 99%; or about 70% to about 80%, about 70% to about 85%, about 70% to about 90%, about 70% to about 95%, about 70% to about 99%, about 75% to about 85%, about 75% to about 90%, about 75% to about 95%, about 75% to about 99%, about 80% to about 90%, about 80% to about 95%, about 80% to about 99%, about 85% to about 93%, about 85% to about 95%, about 85% to about 97%, about 85% to about 99%, about 90% to about 93%, about 90% to about 95%, about 90% to about 97%, about 90% to about 99%, about 93% to about 95%, about 93% to about 97%, about 93% to about 99%, about 95% to about 97% or about 95% to about 99%.

34. The method according to embodiments 1-3 or 7-33 or use according to embodiments 4-33, resulting in a high pulp yield.

35. The method or use according to embodiment 34, resulting in a pulp yield of about 70%, about 75%, about 80%, about 85%, about 86%, about 87%, about 88%, about 89%, about 90%, about 91%, about 92%, about 93%, about 94%, about 95%, about 96%, about 97%, about 98% or about 99%; or at least 70%, at least 75%, at least 80%, at least 85%, at least 86%, at least 87%, at least 88%, at least 89%, at least 90%, at least 91%, at least 92%, at least 93%, at least 94%, at least 95%, at least 96%, at least 97%, at least 98% or at least 99%; or at most 70%, at most 75%, at most 80%, at most 85%, at most 86%, at most 87%, at most 88%, at most 89%, at most 90%, at most 91%, at most 92%, at most 93%, at most 94%, at most 95%, at most 96%, at most 97%, at most 98% or at most 99%; or about 70% to about 80%, about 70% to about 85%, about 70% to about 90%, about 70% to about 95%, about 70% to about 99%, about 75% to about 85%, about 75% to about 90%, about 75% to about 95%, about 75% to about 99%, about 80% to about 90%, about 80% to about 95%, about 80% to about 99%, about 85% to about 93%, about 85% to about 95%, about 85% to about 97%, about 85% to about 99%, about 90% to about 93%, about 90% to about 95%, about 90% to about 97%, about 90% to about 99%, about 93% to about 95%, about 93% to about 97%, about 93% to about 99%, about 95% to about 97% or about 95% to about 99%.

36. The method according to embodiments 1-3 or 7-35 or use according to embodiments 4-35, wherein the effective amount of the papermaking additive composition results in a high alpha-cellulose content of the processed pulp.

37. The method or use according to embodiment 36, wherein the effective amount of the papermaking additive composition results in an alpha-cellulose content of the processed pulp of about 70%, about 75%, about 80%, about 85%, about 86%, about 87%, about 88%, about 89%, about 90%, about 91%, about 92%, about 93%, about 94%, about 95%, about 96%, about 97%, about 98% or about 99%; or at least 70%, at least 75%, at least 80%, at least 85%, at least 86%, at least 87%, at least 88%, at least 89%, at least 90%, at least 91%, at least 92%, at least 93%, at least 94%, at least 95%, at least 96%, at least 97%, at least 98% or at least 99%; or at most 70%, at most 75%, at most 80%, at most 85%, at most 86%, at most 87%, at most 88%, at most 89%, at most 90%, at most 91%, at most 92%, at most 93%, at most 94%, at most 95%, at most 96%, at most 97%, at most 98% or at most 99%; or about 70% to about 80%, about 70% to about 85%, about 70% to about 90%, about 70% to about 95%, about 70% to about 99%, about 75% to about 85%, about 75% to about 90%, about 75% to about 95%, about 75% to about 99%, about 80% to about 90%, about 80% to about 95%, about 80% to about 99%, about 85% to about 93%, about 85% to about 95%, about 85% to about 97%, about 85% to about 99%, about 90% to about 93%, about 90% to about 95%, about 90% to about 97%, about 90% to about 99%, about 93% to about 95%, about 93% to about 97%, about 93% to about 99%, about 95% to about 97% or about 95% to about 99%.

38. The method according to embodiments 1-3 or 7-37 or use according to embodiments 4-37, wherein the effective amount of the papermaking additive composition results in a low beta-cellulose content of the processed pulp.

39. The method or use according to embodiment 38, wherein the effective amount of the papermaking additive composition results in a beta-cellulose content of the processed pulp of about 5%, about 10%, about 15%, about 20%, about 25%, about 30% or about 35%; or at most 5%, at most 10%, at most 15%, at most 20%, at most 25%, at most 30% or at most 35%; or about 5% to about 10%, about 5% to about 15%, about 5% to about 20%, about 5% to about 25%, about 5% to about 30%, about 5% to about 35%, about 10% to about 15%, about 10% to about 20%, about 10% to about 25%, about 10% to about 30%, about 10% to about 35%, about 15% to about 20%, about 15% to about 25%, about 15% to about 30%, about 15% to about 35%, about 20% to about 25%, about 20% to about 30%, about 20% to about 35%, about 25% to about 30%, about 25% to about 35% or about 30% to about 35%.

40. The method according to embodiments 1-3 or 7-39 or use according to embodiments 4-39, wherein the effective amount of the papermaking additive composition results in a low gamma-cellulose content of the processed pulp.

41. The method or use according to embodiment 40, wherein the effective amount of the papermaking additive composition results in a gamma-cellulose content of the processed pulp of about 5%, about 10%, about 15%, about 20%, about 25%, about 30% or about 35%; or at most 5%, at most 10%, at most 15%, at most 20%, at most 25%, at most 30% or at most 35%; or about 5% to about 10%, about 5% to about 15%, about 5% to about 20%, about 5% to about 25%, about 5% to about 30%, about 5% to about 35%, about 10% to about 15%, about 10% to about 20%, about 10% to about 25%, about 10% to about 30%, about 10% to about 35%, about 15% to about 20%, about 15% to about 25%, about 15% to about 30%, about 15% to about 35%, about 20% to about 25%, about 20% to about 30%, about 20% to about 35%, about 25% to about 30%, about 25% to about 35% or about 30% to about 35%.

42. The method according to embodiments 1-3 or 7-41 or use according to embodiments 4-41, wherein the effective amount of the papermaking additive composition results in a high viscosity of the processed pulp.

43. The method or use according to embodiment 42, wherein the effective amount of the papermaking additive composition results in a viscosity of the processed pulp of about 5 mPa·s, about 10 mPa·s, about 15 mPa·s, about 20 mPa·s, about 25 mPa·s, about 30 mPa·s, about 35 mPa·s, about 40 mPa·s, about 45 mPa·s or about 50 mPa·s; or at least 5 mPa·s, at least 10 mPa·s, at least 15 mPa·s, at least 20 mPa·s, at least 25 mPa·s, at least 30 mPa·s, at least 35 mPa·s, at least 40 mPa·s, at least 45 mPa·s or at least 50 mPa·s; or at most 5 mPa·s, at most 10 mPa·s, at most 15 mPa·s, at most 20 mPa·s, at most 25 mPa·s, at most 30 mPa·s, at most 35 mPa·s, at most 40 mPa·s, at most 45 mPa·s or at most 50 mPa·s; or about 5 mPa·s to about 10 mPa·s, about 5 mPa·s to about 15 mPa·s, about 5 mPa·s to about 20 mPa·s, about 5 mPa·s to about 25 mPa·s, about 5 mPa·s to about 30 mPa·s, about 5 mPa·s to about 35 mPa·s, about 5 mPa·s to about 40 mPa·s, about 5 mPa·s to about 45 mPa·s, about 5 mPa·s to about 50 mPa·s, about 10 mPa·s to about 15 mPa·s, about 10 mPa·s to about 20 mPa·s, about 10 mPa·s to about 25 mPa·s, about 10 mPa·s to about 30 mPa·s, about 10 mPa·s to about 35 mPa·s, about 10 mPa·s to about 40 mPa·s, about 10 mPa·s to about 45 mPa·s, about 10 mPa·s to about 50 mPa·s, about 15 mPa·s to about 20 mPa·s, about 15 mPa·s to about 25 mPa·s, about 15 mPa·s to about 30 mPa·s, about 15 mPa·s to about 35 mPa·s, about 15 mPa·s to about 40 mPa·s, about 15 mPa·s to about 45 mPa·s, about 15 mPa·s to about 50 mPa·s, about 20 mPa·s to about 25 mPa·s, about 20 mPa·s to about 30 mPa·s, about 20 mPa·s to about 35 mPa·s, about 20 mPa·s to about 40 mPa·s, about 20 mPa·s to about 45 mPa·s, about 20 mPa·s to about 50 mPa·s, about 25 mPa·s to about 30 mPa·s, about 25 mPa·s to about 35 mPa·s, about 25 mPa·s to about 40 mPa·s, about 25 mPa·s to about 45 mPa·s, about 25 mPa·s to about 50 mPa·s, about 30 mPa·s to about 35 mPa·s, about 30 mPa·s to about 40 mPa·s, about 30 mPa·s to about 45 mPa·s, about 30 mPa·s to about 50 mPa·s, about 35 mPa·s to about 40 mPa·s, about 35 mPa·s to about 45 mPa·s, about 35 mPa·s to about 50 mPa·s, about 40 mPa·s to about 45 mPa·s, about 40 mPa·s to about 50 mPa·s or about 45 mPa·s to about 50 mPa·s.

44. The method according to embodiments 1-3 or 7-43 or use according to embodiments 4-43, resulting in a high alpha-cellulose content of the processed pulp.

45. The method or use according to embodiment 44, resulting in an alpha-cellulose content of the processed pulp of about 70%, about 75%, about 80%, about 85%, about 86%, about 87%, about 88%, about 89%, about 90%, about 91%, about 92%, about 93%, about 94%, about 95%, about 96%, about 97%, about 98% or about 99%; or at least 70%, at least 75%, at least 80%, at least 85%, at least 86%, at least 87%, at least 88%, at least 89%, at least 90%, at least 91%, at least 92%, at least 93%, at least 94%, at least 95%, at least 96%, at least 97%, at least 98% or at least 99%; or at most 70%, at most 75%, at most 80%, at most 85%, at most 86%, at most 87%, at most 88%, at most 89%, at most 90%, at most 91%, at most 92%, at most 93%, at most 94%, at most 95%, at most 96%, at most 97%, at most 98% or at most 99%; or about 70% to about 80%, about 70% to about 85%, about 70% to about 90%, about 70% to about 95%, about 70% to about 99%, about 75% to about 85%, about 75% to about 90%, about 75% to about 95%, about 75% to about 99%, about 80% to about 90%, about 80% to about 95%, about 80% to about 99%, about 85% to about 93%, about 85% to about 95%, about 85% to about 97%, about 85% to about 99%, about 90% to about 93%, about 90% to about 95%, about 90% to about 97%, about 90% to about 99%, about 93% to about 95%, about 93% to about 97%, about 93% to about 99%, about 95% to about 97% or about 95% to about 99%.

46. The method according to embodiments 1-3 or 7-45 or use according to embodiments 4-45, resulting in a low beta-cellulose content of the processed pulp.

47. The method or use according to embodiment 46, resulting in a beta-cellulose content of the processed pulp of about 5%, about 10%, about 15%, about 20%, about 25%, about 30% or about 35%; or at most 5%, at most 10%, at most 15%, at most 20%, at most 25%, at most 30% or at most 35%; or about 5% to about 10%, about 5% to about 15%, about 5% to about 20%, about 5% to about 25%, about 5% to about 30%, about 5% to about 35%, about 10% to about 15%, about 10% to about 20%, about 10% to about 25%, about 10% to about 30%, about 10% to about 35%, about 15% to about 20%, about 15% to about 25%, about 15% to about 30%, about 15% to about 35%, about 20% to about 25%, about 20% to about 30%, about 20% to about 35%, about 25% to about 30%, about 25% to about 35% or about 30% to about 35%.

48. The method according to embodiments 1-3 or 7-47 or use according to embodiments 4-47, resulting in a low gamma-cellulose content of the processed pulp.

49. The method or use according to embodiment 48, resulting in a gamma-cellulose content of the processed pulp of about 5%, about 10%, about 15%, about 20%, about 25%, about 30% or about 35%; or at most 5%, at most 10%, at most 15%, at most 20%, at most 25%, at most 30% or at most 35%; or about 5% to about 10%, about 5% to about 15%, about 5% to about 20%, about 5% to about 25%, about 5% to about 30%, about 5% to about 35%, about 10% to about 15%, about 10% to about 20%, about 10% to about 25%, about 10% to about 30%, about 10% to about 35%, about 15% to about 20%, about 15% to about 25%, about 15% to about 30%, about 15% to about 35%, about 20% to about 25%, about 20% to about 30%, about 20% to about 35%, about 25% to about 30%, about 25% to about 35% or about 30% to about 35%.

50. The method according to embodiments 1-3 or 7-49 or use according to embodiments 4-49, resulting in a high viscosity of the processed pulp.

51. The method or use according to embodiment 50, resulting in a viscosity of the processed pulp of about 5 mPa·s, about 10 mPa·s, about 15 mPa·s, about 20 mPa·s, about 25 mPa·s, about 30 mPa·s, about 35 mPa·s, about 40 mPa·s, about 45 mPa·s or about 50 mPa·s; or at least 5 mPa·s, at least 10 mPa·s, at least 15 mPa·s, at least 20 mPa·s, at least 25 mPa·s, at least 30 mPa·s, at least 35 mPa·s, at least 40 mPa·s, at least 45 mPa·s or at least 50 mPa·s; or at most 5 mPa·s, at most 10 mPa·s, at most 15 mPa·s, at most 20 mPa·s, at most 25 mPa·s, at most 30 mPa·s, at most 35 mPa·s, at most 40 mPa·s, at most 45 mPa·s or at most 50 mPa·s; or about 5 mPa·s to about 10 mPa·s, about 5 mPa·s to about 15 mPa·s, about 5 mPa·s to about 20 mPa·s, about 5 mPa·s to about 25 mPa·s, about 5 mPa·s to about 30 mPa·s, about 5 mPa·s to about 35 mPa·s, about 5 mPa·s to about 40 mPa·s, about 5 mPa·s to about 45 mPa·s, about 5 mPa·s to about 50 mPa·s, about 10 mPa·s to about 15 mPa·s, about 10 mPa·s to about 20 mPa·s, about 10 mPa·s to about 25 mPa·s, about 10 mPa·s to about 30 mPa·s, about 10 mPa·s to about 35 mPa·s, about 10 mPa·s to about 40 mPa·s, about 10 mPa·s to about 45 mPa·s, about 10 mPa·s to about 50 mPa·s, about 15 mPa·s to about 20 mPa·s, about 15 mPa·s to about 25 mPa·s, about 15 mPa·s to about 30 mPa·s, about 15 mPa·s to about 35 mPa·s, about 15 mPa·s to about 40 mPa·s, about 15 mPa·s to about 45 mPa·s, about 15 mPa·s to about 50 mPa·s, about 20 mPa·s to about 25 mPa·s, about 20 mPa·s to about 30 mPa·s, about 20 mPa·s to about 35 mPa·s, about 20 mPa·s to about 40 mPa·s, about 20 mPa·s to about 45 mPa·s, about 20 mPa·s to about 50 mPa·s, about 25 mPa·s to about 30 mPa·s, about 25 mPa·s to about 35 mPa·s, about 25 mPa·s to about 40 mPa·s, about 25 mPa·s to about 45 mPa·s, about 25 mPa·s to about 50 mPa·s, about 30 mPa·s to about 35 mPa·s, about 30 mPa·s to about 40 mPa·s, about 30 mPa·s to about 45 mPa·s, about 30 mPa·s to about 50 mPa·s, about 35 mPa·s to about 40 mPa·s, about 35 mPa·s to about 45 mPa·s, about 35 mPa·s to about 50 mPa·s, about 40 mPa·s to about 45 mPa·s, about 40 mPa·s to about 50 mPa·s or about 45 mPa·s to about 50 mPa·s.

52. The method according to embodiments 1-3 or 7-51 or use according to embodiments 4-51, wherein the effective amount of the papermaking additive composition results in a low lignin content of the processed pulp.

53. The method or use according to embodiment 52, wherein the effective amount of the papermaking additive composition results in a lignin content of the processed pulp with a Kappa number of about 5, about 10, about 15, about 20, about 25, about 30, about 35, about 40, about or about 50; or at least 5, at least 10, at least 15, at least 20, at least 25, at least 30, at least 35, at least 40, at least 45 or at least 50; or at most 5, at most 10, at most 15, at most 20, at most 25, at most 30, at most 35, at most 40, at most 45 or at most 50; or about 5 to about 10, about 5 to about 15, about 5 to about 20, about 5 to about 25, about 5 to about 30, about 5 to about 35, about 5 to about 40, about 5 to about 45, about 5 to about 50, about 10 to about 15, about 10 to about 20, about 10 to about 25, about 10 to about 30, about 10 to about 35, about 10 to about 40, about 10 to about 45, about 10 to about 50, about 15 to about 20, about 15 to about 25, about 15 to about 30, about 15 to about 35, about 15 to about 40, about 15 to about 45, about 15 to about 50, about 20 to about 25, about 20 to about 30, about 20 to about 35, about 20 to about 40, about 20 to about 45, about 20 to about 50, about 25 to about 30, about 25 to about 35, about 25 to about 40, about 25 to about 45, about 25 to about 50, about 30 to about 35, about 30 to about 40, about 30 to about 45, about 30 to about 50, about 35 to about 40, about 35 to about 45, about 35 to about 50, about 40 to about 45, about 40 to about 50 or about 45 to about 50.

54. The method according to embodiments 1-3 or 7-53 or use according to embodiments 4-53, resulting in a low lignin content of the processed pulp.

55. The method or use according to embodiment 54, resulting in a lignin content of the processed pulp with a Kappa number of about 5, about 10, about 15, about 20, about 25, about 30, about 35, about 40, about or about 50; or at least 5, at least 10, at least 15, at least 20, at least 25, at least 30, at least 35, at least 40, at least 45 or at least 50; or at most 5, at most 10, at most 15, at most 20, at most 25, at most 30, at most 35, at most 40, at most 45 or at most 50; or about 5 to about 10, about 5 to about 15, about 5 to about 20, about 5 to about 25, about 5 to about 30, about 5 to about 35, about 5 to about 40, about 5 to about 45, about 5 to about 50, about 10 to about 15, about 10 to about 20, about 10 to about 25, about 10 to about 30, about 10 to about 35, about 10 to about 40, about 10 to about 45, about 10 to about 50, about 15 to about 20, about 15 to about 25, about 15 to about 30, about 15 to about 35, about 15 to about 40, about 15 to about 45, about 15 to about 50, about 20 to about 25, about 20 to about 30, about 20 to about 35, about 20 to about 40, about 20 to about 45, about 20 to about 50, about 25 to about 30, about 25 to about 35, about 25 to about 40, about 25 to about 45, about 25 to about 50, about 30 to about 35, about 30 to about 40, about 30 to about 45, about 30 to about 50, about 35 to about 40, about 35 to about 45, about 35 to about 50, about 40 to about 45, about 40 to about 50 or about 45 to about 50.

56. The method according to embodiments 1-3 or 7-55 or use according to embodiments 4-55, wherein the effective amount of the papermaking additive composition results in low impurities content of the processed pulp.

57. The method or use according to embodiment 56, wherein the effective amount of the papermaking additive composition results in a low impurities content of the processed pulp with a copper number of about 0.5, about 0.75, about 1.0, about 1.25, about 1.5, about 1.75, about 2.0, about 2.25, about 2.5, about 2.75, about 3.0, about 3.25, about 3.5, about 3.75, about 4.0, about 4.25, about 4.5, about 4.75, about 5.0, about 5.25, about 5.5, about 5.75, about 6.0, about 6.25, about 6.5, about 6.75 or about 7.0; or at least 0.5, at least 0.75, at least 1.0, at least 1.25, at least 1.5, at least 1.75, at least 2.0, at least 2.25, at least 2.5, at least 2.75, at least 3.0, at least 3.25, at least 3.5, at least 3.75, at least 4.0, at least 4.25, at least 4.5, at least 4.75, at least 5.0, at least 5.25, at least 5.5, at least 5.75, at least 6.0, at least 6.25, at least 6.5, at least 6.75 or at least 7.0; or at most 0.5, at most 0.75, at most 1.0, at most 1.25, at most 1.5, at most 1.75, at most 2.0, at most 2.25, at most 2.5, at most 2.75, at most 3.0, at most 3.25, at most 3.5, at most 3.75, at most 4.0, at most 4.25, at most 4.5, at most 4.75, at most 5.0, at most 5.25, at most 5.5, at most 5.75, at most 6.0, at most 6.25, at most 6.5, at most 6.75 or at most 7.0; or about 0.5 to about 1.0, about 0.5 to about 2.0, about 0.5 to about 3.0, about 0.5 to about 4.0, about 0.5 to about 5.0, about 0.5 to about 6.0, about 0.5 to about 7.0, about 0.75 to about 1.0, about 0.75 to about 2.0, about 0.75 to about 3.0, about 0.75 to about 4.0, about 0.75 to about 5.0, about 0.75 to about 6.0, about 0.75 to about 7.0, about 1.0 to about 2.0, about 1.0 to about 3.0, about 1.0 to about 4.0, about 1.0 to about 5.0, about 1.0 to about 6.0, about 1.0 to about 7.0, about 1.25 to about 2.0, about 1.25 to about 3.0, about 1.25 to about 4.0, about 1.25 to about 5.0, about 1.25 to about 6.0, about 1.25 to about 7.0, about 1.5 to about 2.0, about 1.5 to about 3.0, about 1.5 to about 4.0, about 1.5 to about 5.0, about 1.5 to about 6.0, about 1.5 to about 7.0, about 1.75 to about 2.0, about 1.75 to about 3.0, about 1.75 to about 4.0, about 1.75 to about 5.0, about 1.75 to about 6.0, about 1.75 to about 7.0, about 2 to about 3.0, about 2 to about 4.0, about 2 to about 5.0, about 2 to about 6.0 or about 2 to about 7.0.

58. The method according to embodiments 1-3 or 7-57 or use according to embodiments 4-57, resulting in low impurities content of the processed pulp.

59. The method or use according to embodiment 58, resulting in a low impurities content of the processed pulp with a copper number of about 0.5, about 0.75, about 1.0, about 1.25, about 1.5, about 1.75, about 2.0, about 2.25, about 2.5, about 2.75, about 3.0, about 3.25, about 3.5, about 3.75, about 4.0, about 4.25, about 4.5, about 4.75, about 5.0, about 5.25, about 5.5, about 5.75, about 6.0, about 6.25, about 6.5, about 6.75 or about 7.0; or at least 0.5, at least 0.75, at least 1.0, at least 1.25, at least 1.5, at least 1.75, at least 2.0, at least 2.25, at least 2.5, at least 2.75, at least 3.0, at least 3.25, at least 3.5, at least 3.75, at least 4.0, at least 4.25, at least 4.5, at least 4.75, at least 5.0, at least 5.25, at least 5.5, at least 5.75, at least 6.0, at least 6.25, at least 6.5, at least 6.75 or at least 7.0; or at most 0.5, at most 0.75, at most 1.0, at most 1.25, at most 1.5, at most 1.75, at most 2.0, at most 2.25, at most 2.5, at most 2.75, at most 3.0, at most 3.25, at most 3.5, at most 3.75, at most 4.0, at most 4.25, at most 4.5, at most 4.75, at most 5.0, at most 5.25, at most 5.5, at most 5.75, at most 6.0, at most 6.25, at most 6.5, at most 6.75 or at most 7.0; or about 0.5 to about 1.0, about 0.5 to about 2.0, about 0.5 to about 3.0, about 0.5 to about 4.0, about 0.5 to about 5.0, about 0.5 to about 6.0, about 0.5 to about 7.0, about 0.75 to about 1.0, about 0.75 to about 2.0, about 0.75 to about 3.0, about 0.75 to about 4.0, about 0.75 to about 5.0, about 0.75 to about 6.0, about 0.75 to about 7.0, about 1.0 to about 2.0, about 1.0 to about 3.0, about 1.0 to about 4.0, about 1.0 to about 5.0, about 1.0 to about 6.0, about 1.0 to about 7.0, about 1.25 to about 2.0, about 1.25 to about 3.0, about 1.25 to about 4.0, about 1.25 to about 5.0, about 1.25 to about 6.0, about 1.25 to about 7.0, about 1.5 to about 2.0, about 1.5 to about 3.0, about 1.5 to about 4.0, about 1.5 to about 5.0, about 1.5 to about 6.0, about 1.5 to about 7.0, about 1.75 to about 2.0, about 1.75 to about 3.0, about 1.75 to about 4.0, about 1.75 to about 5.0, about 1.75 to about 6.0, about 1.75 to about 7.0, about 2 to about 3.0, about 2 to about 4.0, about 2 to about 5.0, about 2 to about 6.0 or about 2 to about 7.0.

60. The method according to embodiments 1-3 or 7-59 or use according to embodiments 4-59, wherein the effective amount of the papermaking additive composition results in a high carboxyl content of the processed pulp.

61. The method or use according to embodiment 60, wherein the effective amount of the papermaking additive composition results in a carboxyl content of the processed pulp about 4 meq/100 g pulp, about 4.5 meq/100 g pulp, about 5 meq/100 g pulp, about 5.5 meq/100 g pulp, about 6 meq/100 g pulp, about 6.5 meq/100 g pulp, about 7 meq/100 g pulp, about 7.5 meq/100 g pulp, about 8 meq/100 g pulp, about 8.5 meq/100 g pulp, about 9 meq/100 g pulp, about 9.5 meq/100 g pulp or about 10 meq/100 g pulp; or at least 4 meq/100 g pulp, at least 4.5 meq/100 g pulp, at least 5 meq/100 g pulp, at least 5.5 meq/100 g pulp, at least 6 meq/100 g pulp, at least 6.5 meq/100 g pulp, at least 7 meq/100 g pulp, at least 7.5 meq/100 g pulp, at least 8 meq/100 g pulp, at least 8.5 meq/100 g pulp, at least 9 meq/100 g pulp, at least 9.5 meq/100 g pulp or at least 10 meq/100 g pulp; or at most 4 meq/100 g pulp, at most 4.5 meq/100 g pulp, at most 5 meq/100 g pulp, at most 5.5 meq/100 g pulp, at most 6 meq/100 g pulp, at most 6.5 meq/100 g pulp, at most 7 meq/100 g pulp, at most 7.5 meq/100 g pulp, at most 8 meq/100 g pulp, at most 8.5 meq/100 g pulp, at most 9 meq/100 g pulp, at most 9.5 meq/100 g pulp or at most 10 meq/100 g pulp; or about 4 meq/100 g pulp to about 5 meq/100 g pulp, about 4 meq/100 g pulp to about 6 meq/100 g pulp, about 4 meq/100 g pulp to about 7 meq/100 g pulp, about 4 meq/100 g pulp to about 8 meq/100 g pulp, about 4 meq/100 g pulp to about 9 meq/100 g pulp, about 4 meq/100 g pulp to about 10 meq/100 g pulp, about 5 meq/100 g pulp to about 6 meq/100 g pulp, about 5 meq/100 g pulp to about 7 meq/100 g pulp, about 5 meq/100 g pulp to about 8 meq/100 g pulp, about 5 meq/100 g pulp to about 9 meq/100 g pulp, about 5 meq/100 g pulp to about 10 meq/100 g pulp, about 6 meq/100 g pulp to about 7 meq/100 g pulp, about 6 meq/100 g pulp to about 8 meq/100 g pulp, about 6 meq/100 g pulp to about 9 meq/100 g pulp, about 6 meq/100 g pulp to about 10 meq/100 g pulp, about 7 meq/100 g pulp to about 8 meq/100 g pulp, about 7 meq/100 g pulp to about 9 meq/100 g pulp, about 7 meq/100 g pulp to about 10 meq/100 g pulp, about 8 meq/100 g pulp to about 9 meq/100 g pulp, about 8 meq/100 g pulp to about 10 meq/100 g pulp or about 9 meq/100 g pulp to about 10 meq/100 g pulp.

62. The method according to embodiments 1-3 or 7-61 or use according to embodiments 4-61, resulting in a high carboxyl content of the processed pulp.

63. The method or use according to embodiment 62, resulting in a carboxyl content of the processed pulp about 4 meq/100 g pulp, about 4.5 meq/100 g pulp, about 5 meq/100 g pulp, about 5.5 meq/100 g pulp, about 6 meq/100 g pulp, about 6.5 meq/100 g pulp, about 7 meq/100 g pulp, about 7.5 meq/100 g pulp, about 8 meq/100 g pulp, about 8.5 meq/100 g pulp, about 9 meq/100 g pulp, about 9.5 meq/100 g pulp or about 10 meq/100 g pulp; or at least 4 meq/100 g pulp, at least 4.5 meq/100 g pulp, at least 5 meq/100 g pulp, at least 5.5 meq/100 g pulp, at least 6 meq/100 g pulp, at least 6.5 meq/100 g pulp, at least 7 meq/100 g pulp, at least 7.5 meq/100 g pulp, at least 8 meq/100 g pulp, at least 8.5 meq/100 g pulp, at least 9 meq/100 g pulp, at least 9.5 meq/100 g pulp or at least 10 meq/100 g pulp; or at most 4 meq/100 g pulp, at most 4.5 meq/100 g pulp, at most 5 meq/100 g pulp, at most 5.5 meq/100 g pulp, at most 6 meq/100 g pulp, at most 6.5 meq/100 g pulp, at most 7 meq/100 g pulp, at most 7.5 meq/100 g pulp, at most 8 meq/100 g pulp, at most 8.5 meq/100 g pulp, at most 9 meq/100 g pulp, at most 9.5 meq/100 g pulp or at most 10 meq/100 g pulp; or about 4 meq/100 g pulp to about 5 meq/100 g pulp, about 4 meq/100 g pulp to about 6 meq/100 g pulp, about 4 meq/100 g pulp to about 7 meq/100 g pulp, about 4 meq/100 g pulp to about 8 meq/100 g pulp, about 4 meq/100 g pulp to about 9 meq/100 g pulp, about 4 meq/100 g pulp to about 10 meq/100 g pulp, about 5 meq/100 g pulp to about 6 meq/100 g pulp, about 5 meq/100 g pulp to about 7 meq/100 g pulp, about 5 meq/100 g pulp to about 8 meq/100 g pulp, about 5 meq/100 g pulp to about 9 meq/100 g pulp, about 5 meq/100 g pulp to about 10 meq/100 g pulp, about 6 meq/100 g pulp to about 7 meq/100 g pulp, about 6 meq/100 g pulp to about 8 meq/100 g pulp, about 6 meq/100 g pulp to about 9 meq/100 g pulp, about 6 meq/100 g pulp to about 10 meq/100 g pulp, about 7 meq/100 g pulp to about 8 meq/100 g pulp, about 7 meq/100 g pulp to about 9 meq/100 g pulp, about 7 meq/100 g pulp to about 10 meq/100 g pulp, about 8 meq/100 g pulp to about 9 meq/100 g pulp, about 8 meq/100 g pulp to about 10 meq/100 g pulp or about 9 meq/100 g pulp to about 10 meq/100 g pulp.

64. The method according to embodiments 1-3 or 7-63 or use according to embodiments 4-63, wherein the effective amount of the papermaking additive composition results in a high brightness of the processed pulp or paper material.

65. The method or use according to embodiment 64, wherein the effective amount of the papermaking additive composition results in a brightness of the processed pulp or paper material about 70%, about 75%, about 80%, about 85%, about 86%, about 87%, about 88%, about 89%, about 90%, about 91%, about 92%, about 93%, about 94%, about 95%, about 96%, about 97%, about 98% or about 99%; or at least 70%, at least 75%, at least 80%, at least 85%, at least 86%, at least 87%, at least 88%, at least 89%, at least 90%, at least 91%, at least 92%, at least 93%, at least 94%, at least 95%, at least 96%, at least 97%, at least 98% or at least 99%; or at most 70%, at most 75%, at most 80%, at most 85%, at most 86%, at most 87%, at most 88%, at most 89%, at most 90%, at most 91%, at most 92%, at most 93%, at most 94%, at most 95%, at most 96%, at most 97%, at most 98% or at most 99%; or about 70% to about 80%, about 70% to about 85%, about 70% to about 90%, about 70% to about 95%, about 70% to about 99%, about 75% to about 85%, about 75% to about 90%, about 75% to about 95%, about 75% to about 99%, about 80% to about 90%, about 80% to about 95%, about 80% to about 99%, about 85% to about 93%, about 85% to about 95%, about 85% to about 97%, about 85% to about 99%, about 90% to about 93%, about 90% to about 95%, about 90% to about 97%, about 90% to about 99%, about 93% to about 95%, about 93% to about 97%, about 93% to about 99%, about 95% to about 97% or about 95% to about 99%.

66. The method according to embodiments 1-3 or 7-65 or use according to embodiments 4-65, resulting in a high brightness of the processed pulp or paper material.

67. The method or use according to embodiment 66, resulting in a brightness of the processed pulp or paper material about 70%, about 75%, about 80%, about 85%, about 86%, about 87%, about 88%, about 89%, about 90%, about 91%, about 92%, about 93%, about 94%, about 95%, about 96%, about 97%, about 98% or about 99%; or at least 70%, at least 75%, at least 80%, at least 85%, at least 86%, at least 87%, at least 88%, at least 89%, at least 90%, at least 91%, at least 92%, at least 93%, at least 94%, at least 95%, at least 96%, at least 97%, at least 98% or at least 99%; or at most 70%, at most 75%, at most 80%, at most 85%, at most 86%, at most 87%, at most 88%, at most 89%, at most 90%, at most 91%, at most 92%, at most 93%, at most 94%, at most 95%, at most 96%, at most 97%, at most 98% or at most 99%; or about 70% to about 80%, about 70% to about 85%, about 70% to about 90%, about 70% to about 95%, about 70% to about 99%, about 75% to about 85%, about 75% to about 90%, about 75% to about 95%, about 75% to about 99%, about 80% to about 90%, about 80% to about 95%, about 80% to about 99%, about 85% to about 93%, about 85% to about 95%, about 85% to about 97%, about 85% to about 99%, about 90% to about 93%, about 90% to about 95%, about 90% to about 97%, about 90% to about 99%, about 93% to about 95%, about 93% to about 97%, about 93% to about 99%, about 95% to about 97% or about 95% to about 99%.

68. The method according to embodiments 1-3 or 7-67 or use according to embodiments 4-67, wherein the effective amount of the papermaking additive composition results in a low extractives content of the processed pulp or paper material.

69. The method or use according to embodiment 68, wherein the effective amount of the papermaking additive composition results in an extractives content of the processed pulp or paper material of about 0.01%, about 0.02%, about 0.03%, about 0.04%, about 0.05%, about 0.06%, about 0.07%, about 0.08%, about 0.09% about 0.1%, about 0.2% about 0.3% about 0.4% about 0.5% about 0.6% about 0.7%, about 0.8%, about 0.9%, about 1%, about 2%, about 3%, about 4% or about 5%; or at most 0.01%, at most 0.02%, at most 0.03%, at most 0.04%, at most 0.05%, at most 0.06%, at most 0.07%, at most 0.08%, at most 0.09%, at most 0.1%, at most 0.2%, at most 0.3%, at most 0.4%, at most 0.5%, at most 0.6%, at most 0.7%, at most 0.8%, at most 0.9%, at most 1%, at most 2%, at most 3%, at most 4% or at most 5%; or about 0.001% to about 0.005%, about 0.001% to about 0.01%, about 0.001% to about 0.05%, about 0.001% to about 0.1%, about 0.001% to about 0.5%, about 0.001% to about 1%, about 0.001% to about 5%, about 0.005% to about 0.01%, about 0.005% to about 0.05%, about 0.005% to about 0.1%, about 0.005% to about 0.5%, about 0.005% to about 1%, about 0.005% to about 5%, about 0.01% to about 0.05%, about 0.01% to about 0.1%, about 0.01% to about 0.5%, about 0.01% to about 1%, about 0.01% to about 5%, about 0.05% to about 0.1%, about 0.05% to about 0.5%, about 0.05% to about 1%, about 0.05% to about 5%, about 0.1% to about 0.5%, about 0.1% to about 1%, about 0.1% to about 5%, about 0.5% to about 1%, about 0.5% to about 5% or about 1% to about 5%.

70. The method according to embodiments 1-3 or 7-69 or use according to embodiments 4-69, resulting in a low extractives content of the processed pulp or paper material.

71. The method or use according to embodiment 70, resulting in an extractives content of the processed pulp or paper material of about 0.01%, about 0.02%, about 0.03%, about 0.04%, about 0.05%, about 0.06%, about 0.07%, about 0.08%, about 0.09%, about 0.1%, about 0.2%, about 0.3%, about 0.4%, about 0.5%, about 0.6%, about 0.7%, about 0.8%, about 0.9%, about 1%, about 2%, about 3%, about 4% or about 5%; or at most 0.01%, at most 0.02%, at most 0.03%, at most 0.04%, at most 0.05%, at most 0.06%, at most 0.07%, at most 0.08%, at most 0.09%, at most 0.1%, at most 0.2%, at most 0.3%, at most 0.4%, at most 0.5%, at most 0.6%, at most 0.7%, at most 0.8%, at most 0.9%, at most 1%, at most 2%, at most 3%, at most 4% or at most 5%; or about 0.001% to about 0.005%, about 0.001% to about 0.01%, about 0.001% to about 0.05%, about 0.001% to about 0.1%, about 0.001% to about 0.5%, about 0.001% to about 1%, about 0.001% to about 5%, about 0.005% to about 0.01%, about 0.005% to about 0.05%, about 0.005% to about 0.1%, about 0.005% to about 0.5%, about 0.005% to about 1%, about 0.005% to about 5%, about 0.01% to about 0.05%, about 0.01% to about 0.1%, about 0.01% to about 0.5%, about 0.01% to about 1%, about 0.01% to about 5%, about 0.05% to about 0.1%, about 0.05% to about 0.5%, about 0.05% to about 1%, about 0.05% to about 5%, about 0.1% to about 0.5%, about 0.1% to about 1%, about 0.1% to about 5%, about 0.5% to about 1%, about 0.5% to about 5% or about 1% to about 5%.

72. The method according to embodiments 1-3 or 7-71 or use according to embodiments 4-71, wherein the effective amount of the papermaking additive composition is a papermaking additive composition:dilutant ratio of about 1:50, about 1:75, about 1:100, about 1:125, about 1:150, about 1:175, about 1:200, about 1:225, about 1:250, about 1:275, about 1:300, about 1:325, about 1:350, about 1:375, about 1:400, about 1:425, about 1:450, about 1:475, about 1:500, about 1:525, about 1:550, about 1:575 or about 1:600; or at least 1:50, at least 1:75, at least 1:100, at least 1:125, at least 1:150, at least 1:175, at least 1:200, at least 1:225, at least 1:250, at least 1:275, at least 1:300, at least 1:325, at least 1:350, at least 1:375, at least 1:400, at least 1:425, at least 1:450, at least 1:475, at least 1:500, at least 1:525, at least 1:550, at least 1:575 or at least 1:600; or at most 1:50, at most 1:75, at most 1:100, at most 1:125, at most 1:150, at most 1:175, at most 1:200, at most 1:225, at most 1:250, at most 1:275, at most 1:300, at most 1:325, at most 1:350, at most 1:375, at most 1:400, at most 1:425, at most 1:450, at most 1:475, at most 1:500, at most 1:525, at most 1:550, at most 1:575 or at most 1:600; or about 1:50 to about 1:100, about 1:50 to about 1:200, about 1:50 to about 1:300, about 1:50 to about 1:400, about 1:50 to about 1:500, about 1:50 to about 1:600, about 1:100 to about 1:200, about 1:100 to about 1:300, about 1:100 to about 1:400, about 1:100 to about 1:500, about 1:100 to about 1:600, about 1:200 to about 1:300, about 1:200 to about 1:400, about 1:200 to about 1:500, about 1:200 to about 1:600, about 1:300 to about 1:400, about 1:300 to about 1:500, about 1:300 to about 1:600, about 1:400 to about 1:500, about 1:400 to about 1:600 or about 1:500 to about 1:600.

73. The method according to embodiments 1-3 or 7-71 or use according to embodiments 4-71, wherein the effective amount of the papermaking additive composition is a papermaking additive composition:dilutant ratio of about 1:500, about 1:750, about 1:1000, about 1:1250, about 1:1500, about 1:1750, about 1:2000, about 1:2250, about 1:2500, about 1:2750, about 1:3000, about 1:3250, about 1:3500, about 1:3750, about 1:4000, about 1:4250, about 1:4500, about 1:4750, about 1:5000, about 1:5250, about 1:5500, about 1:5750, about 1:6000, about 1:7000, about 1:8000, about 1:9000 or about 1:10000; or at least 1:500, at least 1:750, at least 1:1000, at least 1:1250, at least 1:1500, at least 1:1750, at least 1:2000, at least 1:2250, at least 1:2500, at least 1:2750, at least 1:3000, at least 1:3250, at least 1:3500, at least 1:3750, at least 1:4000, at least 1:4250, at least 1:4500, at least 1:4750, at least 1:5000, at least 1:5250, at least 1:5500, at least 1:5750, at least 1:6000, at least 1:7000, at least 1:8000, at least 1:9000 or at least 1:10000; or at most 1:500, at most 1:750, at most 1:1000, at most 1:1250, at most 1:1500, at most 1:1750, at most 1:2000, at most 1:2250, at most 1:2500, at most 1:2750, at most 1:3000, at most 1:3250, at most 1:3500, at most 1:3750, at most 1:4000, at most 1:4250, at most 1:4500, at most 1:4750, at most 1:5000, at most 1:5250, at most 1:5500, at most 1:5750, at most 1:6000 at most 1:7000, at most 1:8000, at most 1:9000 or at most 1:10000; or about 1:500 to about 1:1000, about 1:500 to about 1:2000, about 1:500 to about 1:3000, about 1:500 to about 1:4000, about 1:500 to about 1:5000, about 1:500 to about 1:6000, about 1:500 to about 1:7000, about 1:500 to about 1:8000, about 1:500 to about 1:9000, about 1:500 to about 1:10000, about 1:1000 to about 1:2000, about 1:1000 to about 1:3000, about 1:1000 to about 1:4000, about 1:1000 to about 1:5000, about 1:1000 to about 1:6000, about 1:1000 to about 1:7000, about 1:1000 to about 1:8000, about 1:1000 to about 1:9000, about 1:1000 to about 1:10000, about 1:2000 to about 1:3000, about 1:2000 to about 1:4000, about 1:2000 to about 1:5000, about 1:2000 to about 1:6000, about 1:2000 to about 1:7000, about 1:2000 to about 1:8000, about 1:2000 to about 1:9000, about 1:2000 to about 1:10000, about 1:3000 to about 1:4000, about 1:3000 to about 1:5000, about 1:3000 to about 1:6000, about 1:3000 to about 1:7000, about 1:3000 to about 1:8000, about 1:3000 to about 1:9000, about 1:3000 to about 1:10000, about 1:4000 to about 1:5000, about 1:4000 to about 1:6000, about 1:4000 to about 1:7000, about 1:4000 to about 1:8000, about 1:4000 to about 1:9000, about 1:4000 to about 1:10000, about 1:5000 to about 1:6000, about 1:5000 to about 1:7000, about 1:5000 to about 1:8000, about 1:5000 to about 1:9000, about 1:5000 to about 1:10000, about 1:6000 to about 1:7000, about 1:6000 to about 1:8000, about 1:6000 to about 1:9000, about 1:6000 to about 1:10000, about 1:7000 to about 1:8000, about 1:7000 to about 1:9000, about 1:7000 to about 1:10000, about 1:8000 to about 1:9000, about 1:8000 to about 1:10000 or about 1:9000 to about 1:10000.

74. The method according to embodiments 1-3 or 7-73 or use according to embodiments 4-73, wherein the effective amount of the papermaking additive composition has a final concentration of about 0.0001%, about 0.0002%, about 0.0003%, about 0.0004%, about 0.0005%, about 0.0006%, about 0.0007%, about 0.0008%, about 0.0009%, about 0.001%, about 0.002%, about 0.003%, about 0.004%, about 0.005%, about 0.006%, about 0.007%, about 0.008%, about 0.009%, about 0.01%, about 0.02%, about 0.03%, about 0.04%, about 0.05%, about 0.06%, about 0.07%, about 0.08%, about 0.09%, about 0.1%, about 0.2%, about 0.3%, about 0.4%, about 0.5%, about 0.6%, about 0.7%, about 0.8%, about 0.9%, about 1%, about 2%, about 3%, about 4%, about 5%, about 6%, about 7%, about 8%, about 9% or about 10%; or at least 0.0001%, at least 0.0002%, at least 0.0003%, at least 0.0004%, at least 0.0005%, at least 0.0006%, at least 0.0007%, at least 0.0008%, at least 0.0009%, at least 0.001%, at least 0.002%, at least 0.003%, at least 0.004%, at least 0.005%, at least 0.006%, at least 0.007%, at least 0.008%, at least 0.009%, at least 0.01%, at least 0.02%, at least 0.03%, at least 0.04%, at least 0.05%, at least 0.06%, at least 0.07%, at least 0.08%, at least 0.09%, at least 0.1%, at least 0.2%, at least 0.3%, at least 0.4%, at least 0.5%, at least 0.6%, at least 0.7%, at least 0.8%, at least 0.9%, at least 1%, at least 2%, at least 3%, at least 4%, at least 5%, at least 6%, at least 7%, at least 8%, at least 9% or at least 10%; or at most 0.0001%, at most 0.0002%, at most 0.0003%, at most 0.0004%, at most 0.0005%, at most 0.0006%, at most 0.0007%, at most 0.0008%, at most 0.0009%, at most 0.001%, at most 0.002%, at most 0.003%, at most 0.004%, at most 0.005%, at most 0.006%, at most 0.007%, at most 0.008%, at most 0.009%, at most 0.01%, at most 0.02%, at most 0.03%, at most 0.04%, at most 0.05%, at most 0.06%, at most 0.07%, at most 0.08%, at most 0.09%, at most 0.1%, at most 0.2%, at most 0.3%, at most 0.4%, at most 0.5%, at most 0.6%, at most 0.7%, at most 0.8%, at most 0.9%, at most 1%, at most 2%, at most 3%, at most 4%, at most 5%, at most 6%, at most 7%, at most 8%, at most 9% or at most 10%; or about 0.0001% to about 0.0005%, about 0.0001% to about 0.001%, about 0.0001% to about 0.005%, about 0.0001% to about 0.01%, about 0.0001% to about 0.05%, about 0.0001% to about 0.1%, about 0.0001% to about 0.5%, about 0.0001% to about 1%, about 0.0001% to about 5%, about 0.0001% to about 10%, about 0.0005% to about 0.001%, about 0.0005% to about 0.005%, about 0.0005% to about 0.01%, about 0.0005% to about 0.05%, about 0.0005% to about 0.1%, about 0.0005% to about 0.5%, about 0.0005% to about 1%, about 0.0005% to about 5%, about 0.0005% to about 10%, about 0.001% to about 0.005%, about 0.001% to about 0.01%, 0.001% to about 0.05%, about 0.001% to about 0.1%, 0.001% to about 0.5%, 0.001% to about 1%, 0.001% to about 5%, about 0.001% to about 10%, about 0.005% to about 0.01%, about 0.005% to about 0.05%, about 0.005% to about 0.1%, about 0.005% to about 0.5%, about 0.005% to about 1%, about 0.005% to about 5%, about 0.005% to about 10%, about 0.01% to about 0.05%, about 0.01% to about 0.1%, about 0.01% to about 0.5%, about 0.01% to about 1%, about 0.01% to about 5%, about 0.01% to about 10%, about 0.05% to about 0.1%, about 0.05% to about 0.5%, about 0.05% to about 1%, about 0.05% to about 5%, about 0.05% to about 10%, about 0.1% to about 0.5%, about 0.1% to about 1%, about 0.1% to about 5%, about 0.1% to about 10%, about 0.5% to about 1%, about 0.5% to about 5%, about 0.5% to about 10%, about 1% to about 5%, about 1% to about 10% or about 5% to about 10%.

75. A papermaking additive composition comprising a treated, fermented microbial supernatant and one or more nonionic surfactants, wherein the composition lacks any active enzymes or live bacteria, and wherein the composition has a pH below 5.0.

76. The papermaking additive composition according to embodiment 75, wherein the treated, fermented microbial supernatant is from a fermented yeast supernatant, a fermented bacterial supernatant, a fermented mold supernatant, or any combination thereof.

77. The papermaking additive composition according to embodiment 76, wherein the fermented yeast supernatant is produced from a species of yeast belonging to the genera *Brettanomyces, Candida, Cyberlindnera, Cystofilobasidium, Debaryomyces, Dekkera, Fusarium, Geotrichum, Issatchenkia, Kazachstania, Kloeckera, Kluyveromyces, Lecanicillium, Mucor, Neurospora, Pediococcus, Penicillium, Pichia, Rhizopus, Rhodosporidium, Rhodotorula, Saccharomyces, Schizosaccharomyces, Thrichosporon, Torulaspora, Torulopsis, Verticillium, Yarrowia, Zygosaccharomyces* or *Zygotorulaspora*.

78. The papermaking additive composition according to embodiment 77, wherein the fermented yeast supernatant is produced from the yeast *Saccharomyces cerevisiae*.

79. The papermaking additive composition according to embodiment 78, wherein the fermented bacterial supernatant is produced from a species of bacteria belonging to the genera *Acetobacter, Arthrobacter, Aerococcus, Bacillus, Bifidobacterium, Brachybacterium, Brevibacterium, Barnobacterium, Carnobacterium, Corynebacterium, Enterococcus, Escherichia, Gluconacetobacter, Gluconobacter, Hafnia, Halomonas, Kocuria, Lactobacillus, Lactococcus, Leuconostoc, Macrococcus, Microbacterium, Micrococcus, Neisseria, Oenococcus, Pediococcus, Propionibacterium, Proteus, Pseudomonas, Psychrobacter, Salmonella, Sporolactobacillus, Staphylococcus, Streptococcus, Streptomyces, Tetragenococcus, Vagococcus, Weissells* or *Zymomonas*.

80. The papermaking additive composition according to embodiment 79, wherein the fermented bacterial supernatant is produced from a species of bacteria belonging to the genus *Aspergillus*.

81. The papermaking additive composition according to any one of embodiments 75-80, wherein the papermaking additive composition comprises at least 35% by weight of the treated fermented microbial supernatant.

82. The papermaking additive composition according to any one of embodiments 75-81, wherein the papermaking additive composition comprises at most 50% by weight of the treated fermented microbial supernatant.

83. The papermaking additive composition according to any one of embodiments 75-82, wherein the nonionic surfactant comprises a polyether nonionic surfactant, a polyhydroxyl nonionic surfactant, and/or a biosurfactant.

84. The papermaking additive composition according to embodiment 83, wherein the polyhydroxyl nonionic surfactant comprising a sucrose ester, an ethoxylated sucrose ester, a sorbital ester, an ethoxylated sorbital ester, an alkyl glucoside, an ethoxylated alkyl glucoside, a polyglycerol ester, or an ethoxylated polyglycerol ester.

85. The papermaking additive composition according to any one of embodiments 75-84, wherein the nonionic surfactant comprises an amine oxide, an ethoxylated alcohol, an ethoxylated aliphatic alcohol, an alkylamine, an ethoxylated alkylamine, an ethoxylated alkyl phenol, an alkyl polysaccharide, an ethoxylated alkyl polysaccharide, an ethoxylated fatty acid, an ethoxylated fatty alcohol, or an ethoxylated fatty amine, or a nonionic surfactant having the general formula of $H(OCH_2CH_2)_xOC_6H_4R^1$, $H(OCH_2CH_2)_xOR^2$, or $H(OCH_2CH_2)_xOC(O)R^2$, wherein x represents the number of moles of ethylene oxide added to an alkyl phenol and/or a fatty alcohol or a fatty acid, $R^1$ represents a long chain alkyl group and, $R^2$ represents a long chain aliphatic group.

86. The papermaking additive composition according to embodiment 85, wherein $R^1$ is a $C_7$-$C_{10}$ normal-alkyl group and/or wherein $R^2$ is a $C_{12}$-$C_{20}$ aliphatic group.

87. The papermaking additive composition according to any one of embodiments 75-86, wherein the nonionic surfactant is an ethoxylated nonyl phenol, an ethoxylated octyl phenol, an ethoxylated ceto-oleyl alcohol, an ethoxylated ceto-stearyl alcohol, an ethoxylated decyl alcohol, an ethoxylated dodecyl alcohol, an ethoxylated tridecyl alcohol, or an ethoxylated castor oil.

88. The papermaking additive composition according to any one of embodiments 75-87, wherein the papermaking additive composition comprises from about 1% to about 15% by weight of the one or more nonionic surfactants.

89. The papermaking additive composition according to embodiment 88, wherein the papermaking additive composition comprises from about 5% to about 13% by weight of the one or more nonionic surfactants.

90. The papermaking additive composition according to embodiment 89, wherein the papermaking additive composition comprises from about 7% to about 11% by weight of the one or more nonionic surfactants.

91. The papermaking additive composition according to any one of embodiments 75-90, wherein the papermaking additive composition further comprises one or more anionic surfactants.

92. The papermaking additive composition according to embodiment 91, wherein the papermaking additive composition comprises from about 0.5% to about 10% by weight of the one or more anionic surfactants.

93. The papermaking additive composition according to embodiment 92, wherein the papermaking additive composition comprises from about 1% to about 8% by weight of the one or more anionic surfactants.

94. The papermaking additive composition according to embodiment 93, wherein the papermaking additive composition comprises from about 2% to about 6% by weight of the one or more anionic surfactants.

95. The papermaking additive composition according to any one of embodiments 75-94, wherein the pH is at most 4.5.

96. The papermaking additive composition according to embodiment 95, wherein the pH about 3.7 to about 4.2.

97. The papermaking additive composition according to any one of embodiments 75-96, wherein the papermaking additive composition further comprises an antimicrobial.

98. The papermaking additive composition according to any one of embodiments 75-97, wherein the papermaking additive composition is substantially non-toxic to humans, mammals, plants and the environment.

99. The papermaking additive composition according to any one of embodiments 75-98, wherein the papermaking additive composition is biodegradable.

100. The papermaking additive composition according to embodiments 75-99, wherein the papermaking additive composition further comprises an enzyme that digests lignin, boosts bleaching, increases deinking, modifies cellulose fiber structure, increases effluent control, removes pitch and stickies (adhesives), modifies starch or any combination thereof.

101. The papermaking additive composition according to embodiment 100, wherein the enzyme is a cellulase, a xylanase, a lipase, an esterase, an amylase, a pectinase, a catalase, a laccase, a peroxidase, a pulpase DI, a pulpase RF, a pulpase BL or any combination thereof.

102. A method of separating fibers from a pulp, the method comprising applying an effective amount of a papermaking additive composition as defined in any one of embodiments 75-101 to the pulp during a pulping and/or a paper production phase, wherein the application results in increased separation of cellulose fibers from raw materials present in the pulp.

103. A method of removing one or more impurities and/or one or more contaminates from a pulp and/or a paper material, the method comprising applying an effective amount of a papermaking additive composition as defined in any one of embodiments 75-101 to the pulp during a pulping and/or a paper production phase, wherein the application results in removal of the one or more impurities and/or the one or more contaminates from the pulp and/or paper material.

104. A method of removing an ink from a pulp and/or a paper material, the method comprising applying an effective amount of a papermaking additive composition as defined in any one of embodiments 75-101 to the pulp during a pulping and/or a paper production phase, wherein the application results in removal of the ink from the pulp and/or paper material.

105. Use of an effective amount of a papermaking additive composition as defined in any one of embodiments 75-101 for separating fibers from a pulp slurry.

106. Use of an effective amount of a papermaking additive composition as defined in any one of embodiments 75-101 for removing one or more impurities and/or one or more contaminates from a pulp and/or a paper material.

107. Use of an effective amount of a papermaking additive composition as defined in any one of embodiments 75-101 for removing ink from a pulp and/or a paper material.

EXAMPLES

The following non-limiting examples are provided for illustrative purposes only in order to facilitate a more complete understanding of representative embodiments now contemplated. These examples should not be construed to limit any of the embodiments described in the present specification, including those pertaining to the papermaking additive compositions, or methods or uses of such papermaking additive compositions disclosed herein.

Example 1

Preparation of Treated Fermented Yeast Supernatant 1

To prepare a treated fermented yeast supernatant, a fermentation reaction is set up in which about 1,000 L of warm water having a temperature of between about 29° C. to about 38° C. was placed in a large jacketed mixing kettle. To the water was added about 84.9 kg black untreated cane molasses, about 25.2 kg raw cane sugar and about 1.2 kg magnesium sulfate. The mixture was thoroughly blended, after which about 11.4 kg diastatic malt and about 1.2 kg baker's yeast were added and agitated slightly. The mixture is incubated at about 26° C. to about 42° C. for about 3 days, after which the effervescent reaction had subsided, indicating essentially complete fermentation. At the end of the fermentation the yeast fermentation composition is centrifuged to remove the "sludge" formed during the fermentation. The resulting fermentation supernatant (about 98.59%, by weight) was collected and sterilized by autoclaving. The treated fermented yeast supernatant can then be stored in liquid form for subsequent use. Alternatively, the treated fermented yeast supernatant can be spray dried by methods known in the art to produce a dry powder. The dry powder form can also be stored for subsequent use.

Example 2

Preparation of Treated Fermented Yeast Supernatant 2

To prepare a treated fermented yeast supernatant, a fermentation reaction is set up in which about 1,000 L of warm water having a temperature of between about 29° C. to about 38° C. was placed in a large jacketed mixing kettle. To the water was added about 42.5 kg black untreated cane molasses, about 12.6 kg raw cane sugar and about 1.2 kg magnesium sulfate. The mixture was thoroughly blended, after which about 10.3 kg diastatic malt and about 1.2 kg baker's yeast were added and agitated slightly. The mixture is incubated at about 26° C. to about 42° C. for about 3 days, after which the effervescent reaction had subsided, indicating essentially complete fermentation. At the end of the fermentation the yeast fermentation culture is centrifuged to remove the "sludge" formed during the fermentation. The resulting fermentation yeast supernatant (about 98.59%, by weight) was collected and treated by autoclaving. The treated fermented yeast supernatant can then be stored in liquid form for subsequent use. Alternatively, the treated fermented yeast supernatant can be spray dried by methods known in the art to produce a dry powder. The dry powder form can also be stored for subsequent use.

Example 3

Preparation of Treated Fermented Yeast Supernatant 3

To prepare a treated fermented yeast supernatant, a fermentation reaction is set up in which about 1,000 L of warm water having a temperature of between about 29° C. to about 38° C. was placed in a large jacketed mixing kettle. To the water was added about 21.3 kg black untreated cane molasses, about 6.3 kg raw cane sugar and about 1.2 kg magnesium sulfate. The mixture was thoroughly blended, after which about 9.3 kg diastatic malt and about 1.2 kg baker's yeast were added and agitated slightly. The mixture is incubated at about 26° C. to about 42° C. for about 3 days, after which the effervescent reaction had subsided, indicating essentially complete fermentation. At the end of the fermentation the yeast fermentation culture is centrifuged to remove the "sludge" formed during the fermentation. The resulting fermentation supernatant (about 98.59%, by weight) was collected and treated by autoclaving. The treated fermented yeast supernatant can then be stored in liquid form for subsequent use. Alternatively, the treated fermented yeast supernatant can be spray dried by methods known in the art to produce a dry powder. The dry powder form can also be stored for subsequent use.

Example 4

Preparation of Papermaking Additive Composition

To prepare a papermaking additive composition, 1,000 L of hot sterile water (about 60° C. to about 65° C.) was added to 1,000 L of treated fermented yeast supernatant in a large jacketed mixing kettle. To this mixture was added about 168.8 kg of TERGITOL™ 15-S-7, a linear secondary alcohol ethoxylate, about 168.8 kg of TERGITOL™ 15-S-5, a linear secondary alcohol ethoxylate, about 67.5 kg of DOWFAX™ 2A1, alkyldiphenyloxide disulfonate, and about 67.5 kg of TRITON™ H-66, phosphate polyether ester. This mixture was thoroughly blended to effect solution. Water was then added to bring the volume to about 4,500 L and stirred until complete mixing had been obtained. The pH of the resulting papermaking additive composition was adjusted to from about 3.7 to about 4.2 with phosphoric acid. The pH adjusted papermaking additive composition was then filter sterilized to remove any microbial contamination.

The composition was found to be nonirritating to skin tissue, nontoxic and could be stored in a cool location over periods of months without any discernible loss in effectiveness or deterioration.

DOWFAX™ 2A1 can be substituted with an anionic biosurfactant such as, e.g., STEPONOL® AM 30-KE, an ammonium lauryl sulfate, STEPONOL® EHS, a sodium 2-ethyl hexyl sulfate, or a combination thereof.

Optionally, the resulting papermaking additive composition may then be mixed with preservative or stabilizing agents, such as about 1% by weight sodium benzoate, about 0.01% by weight imidazolidinyl urea, about 0.15% by weight diazolidinyl urea, about 0.25% by weight calcium chloride. With continuous agitation, sodium benzoate, imidazolidinyl urea, diazolidinyl urea and calcium chloride are added. The temperature of the mixture is then slowly raised to about 40° C. and the mixture is agitated continuously. The temperature is maintained at about 40° C. for about one hour to ensure that all the components of the mixture are dissolved. The mixture is then cooled to from about 20° C. to about 25° C. The pH of the resulting papermaking additive composition was adjusted to from about 3.7 to about 4.2 with phosphoric acid. The pH adjusted papermaking additive composition was then filter sterilized to remove any microbial contamination.

Example 5

Preparation of Papermaking Additive Composition

To prepare a papermaking additive composition, 850 L of hot sterile water (about 60° C. to about 65° C.) was placed in a large jacketed mixing kettle. To the water was added about 7.62 g treated fermented yeast supernatant dried powder, about 37.5 kg of TERGITOL™ 15-S-7, a linear secondary alcohol ethoxylate, about 37.5 kg of TERGITOL™ 15-S-5, a linear secondary alcohol ethoxylate, about 15.0 kg of DOWFAX™ 2A1, alkyldiphenyloxide disulfonate, and about 25.0 kg of TRITON™ H-66, phosphate polyether ester. This mixture was thoroughly blended to effect solution. Water was then added to bring the volume to about 1,000 L and stirred until complete mixing had been obtained. The pH of the resulting papermaking additive composition was adjusted to from about 3.7 to about 4.2 with phosphoric acid. The pH adjusted papermaking additive composition was then filter sterilized to remove any microbial contamination.

Optionally, the resulting papermaking additive composition may then be mixed with preservative or stabilizing agents, such as about 1% by weight sodium benzoate, about 0.01% by weight imidazolidinyl urea, about 0.15% by weight diazolidinyl urea, about 0.25% by weight calcium chloride. With continuous agitation, sodium benzoate, imidazolidinyl urea, diazolidinyl urea and calcium chloride are added. The temperature of the mixture is then slowly raised to about 40° C. and the mixture is agitated continuously. The temperature is maintained at about 40° C. for about one hour to ensure that all the components of the mixture are dissolved. The mixture is then cooled to from about 20° C. to about 25° C. The pH of the resulting papermaking additive composition was adjusted to from about 3.7 to about 4.2 with phosphoric acid. The pH adjusted papermaking additive composition was then filter sterilized to remove any microbial contamination.

The composition was found to be nonirritating to skin tissue, nontoxic and could be stored in a cool location over periods of months without any discernible loss in effectiveness or deterioration.

DOWFAX™ 2A1 can be substituted with an anionic biosurfactant such as, e.g., STEPONOL® AM 30-KE, an ammonium lauryl sulfate, STEPONOL® EHS, a sodium 2-ethyl hexyl sulfate, or a combination thereof.

As an alternative to the treated fermented yeast supernatant dried powder disclosed in Examples 1-3, commercially available treated fermented yeast supernatant dried powders can be used, including, e.g., TASTONE® 154, TASTONE® 210 or TASTONE® 900.

Example 6

Pulping Experiment

This example shows an increase in the efficiency of a pulping process by applying a papermaking additive composition as disclosed herein.

Initially, a crude pulp preparation was processed without the addition of a papermaking additive composition in a laboratory minipulper for 45 minutes. The crude pulp preparation comprised 17% raw materials. After pulping, preparation was assessed for freeness using the Canadian Standard. There was no disintegration of the raw materials, so it was not possible to sample or make freeness measurements.

In a subsequent experiment, a 17% crude pulp preparation was processed with a paper additive composition disclosed herein in a laboratory minipulper. The amount of a papermaking additive composition added was 300 mL per ton of raw material. Samples of this preparation were taken at 10 minutes, 20 minutes and 30 minutes. After pulping, preparation was assessed for freeness using the Canadian Standard. A time-dependent improvement in freeness was observed. At 10 minutes pulping although tiggering was observed, more contact time was required to achieve better homogenization of fibers (FIG. 1A). At 20 minutes pulping, continued improvement in tiggering was seen (FIG. 1B), while at 30 minutes pulping, excellent homogenization of fibers was observed (FIG. 1C). These results show that a papermaking additive composition disclosed herein significantly improved the pulping process and resulted in excellent homogenization of fibers.

Subsequent micrographs of fibers treated with a papermaking additive composition disclosed herein show improved internal and external fibrillation on the fiber surface which leads to increase surface area and improved ability to form interfiber and intrafiber bonds (FIG. 2).

These experiments were repeated using the following concentrations: 30 mL papermaking additive composition per ton of raw material, 60 mL papermaking additive composition per ton of raw material and 400 mL papermaking additive composition per ton of raw material. All concentrations gave results similar to the 300 mL papermaking additive composition per ton of raw material concentration.

Example 7

Deinking Experiment

This example shows the effectiveness of a papermaking composition disclosed herein to effectively remove ink and adhesives from recycled paper.

Three groups, each containing 0.8 kg of White 3 broke paper was pulped in 11.5 liters of clean water using a disintegrator for 60 minutes. Group 1 contained White 3 paper alone and serves as a control. Group 2 contained White 3 broke paper and 500 mL of a papermaking additive composition disclosed herein per ton of raw material. Group 3 contained White 3 broke paper and 500 mL of a papermaking additive composition disclosed herein per ton of raw material and also containing a cellulosic enzyme. At 15 minute intervals, a 3.0 g sample was taken from the disintegrator and analyzed for brightness using the ISO Brightness assay. Both samples treated with a papermaking additive composition disclosed herein improved the disintegration of the White 3 broke paper and improved brightness by almost 2 points. The Group 3 treatment which added the cellulosic enzyme to not result in any appreciable different in improvement relative to the Group 2 treatment.

In closing, it is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular compound, composition, article, apparatus, methodology, protocol, and/or reagent, etc., described herein, unless expressly stated as such. In addition, those of ordinary skill in the art will recognize that certain changes, modifications, permutations, alterations, additions, subtractions and sub-combinations thereof can be made in accordance with the teachings herein without departing from the spirit of the present specification. It is therefore intended that the following appended claims and claims hereafter introduced are interpreted to include all such changes, modifications, permutations, alterations, additions, subtractions and sub-combinations as are within their true spirit and scope.

Certain embodiments of the present invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. For instance, as mass spectrometry instruments can vary slightly in determining the mass of a given analyte, the term "about" in the context of the mass of an ion or the mass/charge ratio of an ion refers to +/−0.50 atomic mass unit. At the very least, and not as an attempt to limit the application of the doctrine of equivalents to the scope of the claims, each numerical indication should at least be construed in light of the number of reported significant digits and by applying ordinary rounding techniques.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.—for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising" (and equivalent open-ended transitional phrases thereof like including, containing and having) encompasses all the expressly recited elements, limitations, steps and/or features alone or in combination with unrecited subject matter; the named elements, limitations and/or features are essential, but other unnamed elements, limitations and/or features may be added and still form a construct within the scope of the claim. Specific embodiments disclosed herein may be further limited in the claims using the closed-ended transitional phrases "consisting of" or "consisting essentially of" in lieu of or as an amended for "comprising." When used in the claims, whether as filed or added per amendment, the closed-ended transitional phrase "consisting of" excludes any element, limitation, step, or feature not expressly recited in the claims. The closed-ended transitional phrase "consisting essentially of" limits the scope of a claim to the expressly recited elements, limitations, steps and/or features and any other elements, limitations, steps and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps and/or features specifically recited in the claim whereas the meaning of the closed-ended transitional phrase "consisting essentially of" is being defined as only including those elements, limitations, steps and/or features specifically recited in the claim and those elements, limitations, steps and/or features that do not materially affect the basic and novel characteristic(s) of the claimed subject matter. Therefore, the open-ended transitional phrase "comprising" (and equivalent open-ended transitional phrases thereof) includes within its meaning, as a limiting case, claimed subject matter specified by the closed-ended transitional phrases "consisting of" or "consisting essentially of." As such embodiments described herein or so claimed with the phrase "comprising" are expressly or inherently unambiguously described, enabled and supported herein for the phrases "consisting essentially of" and "consisting of."

All patents, patent publications, and other publications referenced and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

Lastly, the terminology used herein is for the purpose of describing particular embodiments only, and is not intended to limit the scope of the present invention, which is defined solely by the claims. Accordingly, the present invention is not limited to that precisely as shown and described.

The invention claimed is:

1. A liquid composition comprising a treated, fermented yeast supernatant including bio-nutrients, minerals and amino acids, and about 1% to about 15% by weight of one or more nonionic surfactants, wherein the composition lacks active enzymes contributed by yeast during fermentation due to the treatment, and wherein the composition has a pH of about 2.5 to about 5.0.

2. The liquid composition according to claim 1, wherein the treated, fermented yeast supernatant is produced from a culture containing yeast belonging to the genus *Brettanomyces*, *Candida*, *Cyberlindnera*, *Cystofilobasidium*, *Debaryomyces*, *Dekkera*, *Geotrichum*, *Issatchenkia*, *Kazachstania*, *Kloeckera*, *Kluyveromyces*, *Pichia*, *Rhodosporidium*, *Rhodotorula*, *Saccharomyces*, *Schizosaccharomyces*, *Thrichosporon*, *Torulaspora*, *Torulopsis*, *Yarrowia*, *Zygosaccharomyces*, or *Zygotorulaspora*.

3. The liquid composition according to claim 1, comprising at most 95% by weight of the treated, fermented yeast supernatant.

4. The liquid composition according to claim 1, wherein the one or more nonionic surfactants comprises a polyether nonionic surfactant, a polyhydroxyl nonionic surfactant, and/or a biosurfactant.

5. The liquid composition according to claim 4, wherein the polyhydroxyl nonionic surfactant comprises a sucrose ester, an ethoxylated sucrose ester, a sorbital ester, an ethoxylated sorbital ester, an alkyl glucoside, an ethoxylated alkyl glucoside, a polyglycerol ester, or an ethoxylated polyglycerol ester.

6. The liquid composition according to claim 1, wherein the one or more nonionic surfactants comprise an amine oxide, an ethoxylated alcohol, an ethoxylated aliphatic alcohol, an alkylamine, an ethoxylated alkylamine, an ethoxylated alkyl phenol, an alkyl polysaccharide, an ethoxylated alkyl polysaccharide, an ethoxylated fatty acid, an ethoxylated fatty alcohol, or an ethoxylated fatty amine, or a nonionic surfactant having the general formula of $H(OCH_2CH_2)_xOC_6H_4R^1$, $H(OCH_2CH_2)_xOR^2$, or $H(OCH_2CH_2)_xOC(O)R^2$, wherein x represents the number of moles of ethylene oxide added to an alkyl phenol and/or a fatty alcohol or a fatty acid, $R^1$ represents a long chain alkyl group and, $R^2$ represents a long chain aliphatic group.

7. The liquid composition according to claim 1, wherein the one or more nonionic surfactants is an ethoxylated nonyl phenol, an ethoxylated octyl phenol, an ethoxylated ceto-oleyl alcohol, an ethoxylated ceto-stearyl alcohol, an ethoxylated decyl alcohol, an ethoxylated dodecyl alcohol, an ethoxylated tridecyl alcohol, or an ethoxylated castor oil.

8. The liquid composition according to claim 1, comprising from about 5% to about 13% by weight of the one or more nonionic surfactants.

9. The liquid composition according to claim 8, comprising from about 7% to about 11% by weight of the one or more nonionic surfactants.

10. The liquid composition according to claim 1, wherein the pH is at most 4.5.

11. The liquid composition according to claim 1, wherein the treated, fermented yeast supernatant is produced from a culture containing yeast belonging to the genus *Saccharomyces*.

12. The liquid composition according to claim 11, wherein the yeast is *Saccharomyces cerevisiae*.

13. The liquid composition according to claim 11, comprising from about 5% to about 13% by weight of the one or more nonionic surfactants.

14. The liquid composition according to claim 13, comprising from about 7% to about 11% by weight of the one or more nonionic surfactants.

15. The liquid composition according to claim 11, wherein the one or more nonionic surfactants comprise an alkylphenol ethoxylate or a fatty acid ethoxylate.

16. The liquid composition according to claim 11, wherein the one or more nonionic surfactants comprise an ethoxylated nonyl phenol, an ethoxylated octyl phenol, an ethoxylated ceto-oleyl alcohol, an ethoxylated ceto-stearyl alcohol, an ethoxylated decyl alcohol, an ethoxylated dodecyl alcohol, an ethoxylated tridecyl alcohol, or an ethoxylated castor oil.

17. The liquid composition according to claim 11, wherein the one or more nonionic surfactants is a biosurfactant.

18. A method of separating fibers from a pulp, the method comprising applying an effective amount of a liquid composition as defined in claim 1 to the pulp during a pulping and/or a paper production phase, wherein the application results in increased separation of cellulose fibers from raw materials present in the pulp.

19. A method of removing ink from a pulp and/or a paper material, the method comprising applying an effective amount of a papermaking additive composition as defined in claim 1 to the pulp during a pulping and/or a paper production phase, wherein the application results in removal of the ink from the pulp and/or paper material.

* * * * *